(12) United States Patent
Carroll et al.

(10) Patent No.: US 12,511,562 B2
(45) Date of Patent: Dec. 30, 2025

(54) PROTOCOL FOR $T_1$ ESTIMATOR FOR QUBITS

(71) Applicant: International Business Machines Corporation, Armonk, NY (US)

(72) Inventors: Malcolm Scott Carroll, Cranbury, NJ (US); Sami Rosenblatt, White Plains, NY (US); Abhinav Kandala, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 647 days.

(21) Appl. No.: 17/936,262

(22) Filed: Sep. 28, 2022

(65) Prior Publication Data

US 2024/0185106 A1 Jun. 6, 2024

Related U.S. Application Data

(60) Provisional application No. 63/366,885, filed on Jun. 23, 2022.

(51) Int. Cl.
G06F 7/00 (2006.01)
G06N 10/20 (2022.01)

(52) U.S. Cl.
CPC .................... *G06N 10/20* (2022.01)

(58) Field of Classification Search
CPC ..................................................... G06N 10/20
(Continued)

(56) References Cited

U.S. PATENT DOCUMENTS 7,847,615 B2  12/2010  Yorozu et al.
9,432,024 B2   8/2016  Chow et al.
(Continued)

FOREIGN PATENT DOCUMENTS

CN   112215360 A   1/2021
CN   112444714 A   3/2021
(Continued)

OTHER PUBLICATIONS

Chang et al "On Quantum Computing for Mixed-Integer Programming", retrieved from https://arxiv.org/pdf/2010.07852v1 and dated Oct. 15, 2020 (Year: 2020).
(Continued)

*Primary Examiner* — Isaac M Woo
(74) *Attorney, Agent, or Firm* — Amin, Turocy & Watson, LLP

(57) ABSTRACT

One or more systems, devices, computer program products and/or computer-implemented methods of use provided herein relate to determining estimated energy relaxation times of qubits. A system can comprise a memory configured to store computer executable components; and a processor configured to execute the computer executable components stored in the memory, wherein the computer executable components comprise a sampling component configured to sample a plurality of measurements of an energy relaxation time of a qubit at individual shifted qubit frequencies of a plurality of shifted qubit frequencies of the qubit; and an analysis component configured to perform an analysis, based on a protocol, to determine a correlation frequency-length between individual energy relaxation times measured at the individual shifted qubit frequencies.

20 Claims, 34 Drawing Sheets
(28 of 34 Drawing Sheet(s) Filed in Color)

(58) Field of Classification Search
USPC .................................. 707/600–899; 706/62
See application file for complete search history.

(56) References Cited

U.S. PATENT DOCUMENTS

| | | | |
|---|---|---|---|
| 10,282,675 | B2 | 5/2019 | Bloom et al. |
| 10,366,340 | B2 | 7/2019 | Przybysz |
| 10,467,544 | B2 | 11/2019 | Filipp et al. |
| 10,622,536 | B2 | 4/2020 | Chow et al. |
| 10,755,193 | B2 | 8/2020 | Kandala et al. |
| 10,833,680 | B2 | 11/2020 | Mckay et al. |
| 10,892,398 | B2 | 1/2021 | Pollanen et al. |
| 10,900,998 | B1 | 1/2021 | Sandberg et al. |
| 10,924,095 | B1 | 2/2021 | Mckay et al. |
| 11,004,009 | B2 | 5/2021 | Monroe et al. |
| 11,017,310 | B2 | 5/2021 | Chu et al. |
| 11,244,241 | B1 | 2/2022 | Gambetta et al. |
| 11,681,016 | B1 | 6/2023 | Bohaichuk et al. |
| 2019/0165244 | A1 | 5/2019 | Hertzenberg et al. |
| 2020/0274703 | A1 | 8/2020 | Lukens et al. |
| 2021/0036206 | A1 | 2/2021 | Neill et al. |
| 2021/0049494 | A1* | 2/2021 | King ..................... G06N 10/60 |
| 2021/0182096 | A1 | 6/2021 | Walker et al. |
| 2021/0208231 | A1 | 7/2021 | Lachance-Quirion et al. |
| 2021/0272001 | A1 | 9/2021 | Smelyanskiy et al. |
| 2021/0334689 | A1 | 10/2021 | Klimov et al. |
| 2022/0196716 | A1 | 6/2022 | Anderson et al. |
| 2023/0169252 | A1 | 6/2023 | Stehlik et al. |
| 2023/0176935 | A1 | 6/2023 | Earnest-Noble et al. |
| 2023/0289400 | A1 | 9/2023 | Carroll et al. |

FOREIGN PATENT DOCUMENTS

| | | |
|---|---|---|
| WO | 2018/063168 A1 | 4/2018 |
| WO | 2020/263255 A1 | 12/2020 |
| WO | 2021/170164 A1 | 9/2021 |

OTHER PUBLICATIONS

Non-Final Rejection Mailed on Feb. 27, 2025 for U.S. Appl. No. 17/554,994, 12 page(s).

Notice of Allowance and Fees Due (PTOL-85) Mailed on Nov. 13, 2024 for U.S. Appl. No. 17/694,051, 8 page(s).

Notice of Allowance and Fees Due (PTOL-85) Mailed on Oct. 21, 2024 for U.S. Appl. No. 17/694,051, 9 page(s).

International Search Report and Written Opinion received for PCT Application Serial No. PCT/EP2022/086455 dated Mar. 14, 2023, 15 pages.

Wei et al., "Quantum Crosstalk Cancellation for Fast Entangling Gates and Improved Multi-Qubit Performance", Jun. 1, 2021, 16 pages.

Magnard et al., "Fast and Unconditional All-Microwave Reset of a Superconducting Qubit", https://arxiv.org/abs/1801.07689, Jan. 23, 2018, 9 pages.

Egger et al., "Pulsed Reset Protocol for Fixed-Frequency Superconducting Qubits", https://doi.org/10.1103/PhysRevApplied.10.044030, Apr. 1, 2019.

Lisenfeld et al., "Electric Field Spectroscopy of Material Defects in Transmon Qubits", npj Quantum Information, vol. 5, No. 105, 2019, pp. 1-6.

Klimov et al., "Fluctuations of Energy-Relaxation Times in Superconducting Qubits", https://doi.org/10.48550/arXiv.1809.01043, Mar. 2, 2022, 21 pages.

Abdurakhimov et al., "Driven-State Relaxation of a Coupled Qubit-Defect System in Spin-Locking Measurements", Phys. Rev. B 102, 100502(R), 2020.

Jurcevic et al., "Demonstration of Quantum vol. 64 on a Superconducting Quantum Computing System", https://arxiv.org/abs/2008.08571, dated Sep. 4, 2020, 7 pages.

Li, G. et al., "Towards Efficient Superconducting Quantum Processor Architecture Design", ASPLOS'20, Mar. 16-20, 2020.

IBM, IBM ILOG CPLEX Optimizer, Webpage https://www.ibm.com/analytics/cplex-optimizer, last accessed Nov. 14, 2021.

Hertzberg, et al., "Laser-annealing Josephson junctions for yielding scaled-up superconducting quantum processors", npj Quantum Information, vol. 129, arXiv:2009.00781v4, 2021, 8 pages.

Zhang, et al., "High-fidelity superconducting quantum processors via laser-annealing of transmon qubits", arXiv:2012.08475v1, Dec. 15, 2020, 9 pages.

Morvan, et al., "Optimizing frequency allocation for fixed-frequency superconducting quantum processors", arXiv:2112.01634v2, Mar. 23, 2022, 14 pages.

Mell et al., The NIST Definition of Cloud Computing, Recommendations of the National Institute of Standards and Technology, NIST Special Publication 800-145, 2011.

List of IBM Patents and Patent Applications Treated as Related.

Mcrae, et al. | "Reproducible coherence characterization of superconducting quantum devices," arXiv:2106.09864v2 [quant-ph], Aug. 30, 2021, 13 pages.

Burnett, et al. | "Decoherence benchmarking of superconducting qubits," npj Quantum Information vol. 5, Article No. 54 (Jun. 26, 2019), https://www.nature.com/articles/s41534-019-0168-5, 8 pages.

Carroll, M. et al. | Dynamics of superconducting qubit relaxation times. arXiv:2105.15201v1 [quant-ph] May 31, 2021, 10 pages.

Coherent Josephson qubit suitable for scalable quantum integrated circuits, Barend et al, 2013 (Year: 2013).

Non-Final Rejection Mailed on Sep. 15, 2025 for U.S. Appl. No. 17/694,063, 12 page(s).

* cited by examiner

PROTOCOL FOR $T_1$ ESTIMATOR FOR QUBITS

BACKGROUND

Quantum computing is generally the use of quantum-mechanical phenomena to perform computing and information processing functions. Quantum computing can be viewed in contrast to classical computing, which generally operates on binary values with transistors. That is, while classical computers can operate on bit values that are either 0 or 1, quantum computers operate on quantum bits (qubits) that comprise superpositions of both 0 and 1. Quantum computing has the potential to solve problems that, due to computational complexity, cannot be solved or can only be solved slowly on a classical computer.

On a large scale, quantum computing cloud service providers can execute millions of quantum jobs for users during a year. Each quantum job can include the execution of one or more quantum programs at a physical logic circuit. Physical, real-world, quantum logic circuits controlled by a quantum system can include a plurality of qubits.

Superconducting qubits are a leading candidate for quantum computing but display temporal fluctuations in their energy relaxation times $<T_1>$. Obtaining representative measures of $<T_1>$ for process optimization and device screening can be challenging. While a method of sampling $T_1$ measurements at a shifted frequency near the qubit's unperturbed frequency can be proposed as a fast way to estimate $<T_1>$, the present inventors realized that systems and/or methods that can provide guidance on determining a range of shifted qubit frequencies to sample the $<T_1>$ measurements at and that can provide guidance on a number of the $<T_1>$ measurements to sample, can be desirable.

SUMMARY

The following presents a summary to provide a basic understanding of one or more embodiments described herein. This summary is not intended to identify key or critical elements, delineate scope of particular embodiments or scope of claims. Its sole purpose is to present concepts in a simplified form as a prelude to the more detailed description that is presented later. In one or more embodiments described herein, systems, computer-implemented methods, apparatus and/or computer program products that enable a protocol for a $T_1$ estimator for qubits are discussed.

According to an embodiment, a system is provided. The system can comprise a memory configured to store computer executable components. The system can further comprise a processor configured to execute the computer executable components stored in the memory, wherein the computer executable components can comprise, a sampling component configured to sample a plurality of measurements of an energy relaxation time of a qubit at individual shifted qubit frequencies of a plurality of shifted qubit frequencies of the qubit, and an analysis component configured to perform an analysis, based on a protocol, to determine a correlation frequency-length between individual energy relaxation times measured at the individual shifted qubit frequencies.

According to another embodiment, a method is provided. The method can comprise sampling, by a system operatively coupled to a processor, a plurality of measurements of an energy relaxation time of a qubit at individual shifted qubit frequencies of a plurality of shifted qubit frequencies of the qubit; and performing, by the system, an analysis, based on a protocol, to determine a correlation frequency-length between individual energy relaxation times measured at the individual shifted qubit frequencies.

According to yet another embodiment, a computer program product for determining an estimated energy relaxation time of a qubit is provided. The computer program product can comprise a computer readable storage medium having program instructions embodied therewith, the program instructions executable by a processor to cause the processor to sample, by the processor, a plurality of measurements of an energy relaxation time of the qubit at individual shifted qubit frequencies of a plurality of shifted qubit frequencies of the qubit; and perform, by the processor, an analysis, based on a protocol, to determine a correlation frequency-length between individual energy relaxation times measured at the individual shifted qubit frequencies.

An advantage of the aforementioned system, computer-implemented method and/or computer program product can be an increase in understanding of qubit coherence parameters and of fluctuations in the qubit coherence parameters, and the subsequent ability to employ that information to provide a rapid forecast of qubit useability for an execution of a quantum program.

In one or more preferred embodiments, the correlation frequency-length can represent a minimum spacing between consecutive shifted qubit frequencies of the individual shifted qubit frequencies such that a first energy relaxation time measured at a first shifted qubit frequency of the consecutive shifted qubit frequencies and a second energy relaxation time measured at a second shifted qubit frequency of the consecutive shifted qubit frequencies, can be independent by a defined threshold. In various embodiments, determining an estimated energy relaxation time of the qubit can comprise employing weightings of a plurality of independent energy relaxation time measurements. In various embodiments, a range of frequencies, over which the plurality of measurements of the energy relaxation time can be taken, can be asymmetrical about a qubit frequency of the qubit.

In one or more preferred embodiments, a shifting component can be configured to shift a frequency of the qubit to the plurality of the shifted qubit frequencies by employing a frequency shifting method. In various embodiments, a minimum number of independent weighted measurements of the energy relaxation time can be determined to obtain a target accuracy for an estimated energy relaxation time. In various embodiments, the minimum number of independent weighted measurements of the energy relaxation time can be determined to specify a minimum range of frequencies over which the plurality of measurements of the energy relaxation time are taken.

Yet another advantage of the aforementioned system, computer-implemented method and/or computer program product can be an ability to use any of flux tuning, Autler-Townes effect, DC electric field, mechanical strain and/or other suitable method to shift a qubit's frequency for probing the frequency space about the qubit frequency of the qubit. As used herein, the Autler-Townes effect/shift/tone can also be referred to as the Autler-Townes-AC-Stark effect/shift/tone or AC Stark effect/shift/tone. Further advantages can comprise an ability to rapidly plot energy relaxation of qubits over a plurality of shifted frequencies relative to the qubit frequencies, and along a range of real time, such as days, weeks and/or months. This plot can enable understanding of the dynamic frequency space of a qubit. Additionally, one or more embodiments discussed herein can further enable speeding up of accurate screening of $T_1$ (coherence) in superconducting devices or research devices by reducing guess work for finding best parameters for the estimator, and cost of yielding higher performance devices can be reduced.

DESCRIPTION OF THE DRAWINGS

The patent or application file contains at least one drawing executed in color. Copies of this patent or application publication with color drawing(s) will be provided by the Office upon request and payment of the necessary fee.

DETAILED DESCRIPTION

Figure 1:
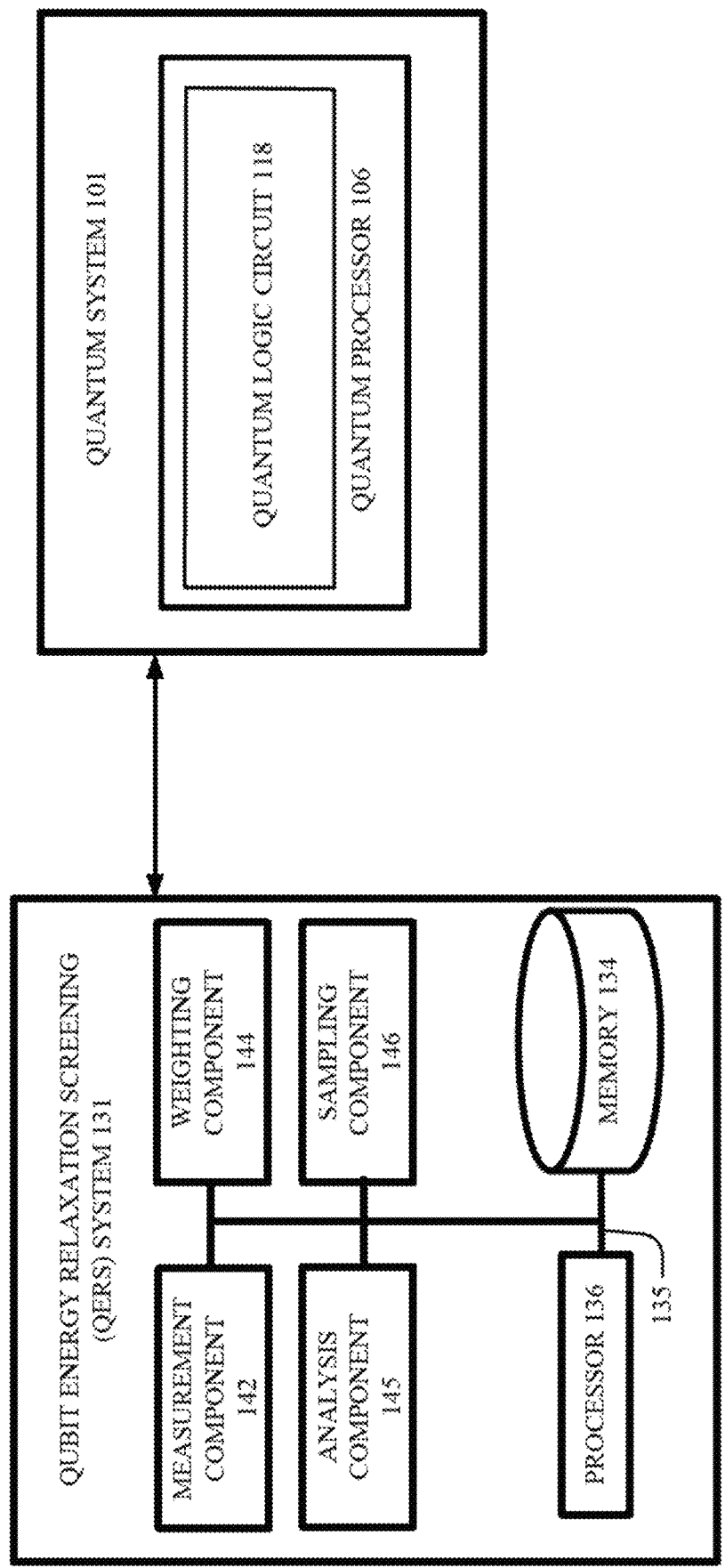
FIG. 1 illustrates a block diagram of an example, non-limiting system that can enable a process to determine an estimated energy relaxation time of a qubit, in accordance with one or more embodiments described herein.

The following detailed description is merely illustrative and is not intended to limit embodiments and/or application or utilization of embodiments. Furthermore, there is no intention to be bound by any expressed or implied information presented in the preceding Summary section, or in the Detailed Description section. One or more embodiments are now described with reference to the drawings, wherein like reference numerals are utilized to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Superconducting qubits are a leading candidate for quantum computing, driven, in part, by improvements in coherence times over five orders of magnitude since the realization of coherent dynamics in a cooper pair box. However, superconducting qubits display temporal fluctuations in their energy relaxation times $T_1$. This introduces instabilities in multi-qubit device performance. Furthermore, autocorrelation in these time fluctuations introduces challenges for obtaining representative measures of $T_1$ for process optimization and device screening. These $T_1$ fluctuations are often attributed to time varying coupling of the qubit to defects, putative TLSs. Thus, techniques to probe the spectral and temporal dynamics of $T_1$ in single junction transmons by repeated $T_1$ measurements in the frequency vicinity of the bare qubit transition, via the AC-Stark effect, can be developed to address one or more technical issues discussed herein. Across 10 qubits, strong correlations can be observed between a mean $T_1$ averaged over about nine months and a snapshot of an equally weighted $T_1$ average over a Stark shifted frequency range. These observations can be suggestive of an ergodic-like spectral diffusion of TLSs dominating $T_1$, and can offer a promising path to more rapid $T_1$ characterization for device screening and process optimization. For example, discovering long-term qubit behavior over a relatively short time span can assist with improvements in manufacturing processes for the qubits.

Further improving coherence times is significant for enhancing the scope of noisy superconducting quantum processors as well as the long term challenge of building a fault tolerant quantum computer. Recent advances in two-qubit gate control have placed their fidelities at the cusp of their coherence limit, implying that improvements in coherence could directly drive gate fidelities past the fault tolerant threshold. In this context, coherence stability and its impact on multi-qubit device performance is also asignificant theme, since superconducting qubits have been shown to display large and correlated temporal fluctuations (i.e., $1/f^\alpha$) in their energy relaxation times $T_1$. This places additional challenges for benchmarking the coherence properties of these devices, and also for error mitigation strategies such as zero noise extrapolation.

The fluctuations of qubit $T_1$ are often attributed to resonant couplings with TLSs that have been historically studied in the context of amorphous solids and their low temperature properties. More recently, TLSs have attracted renewed interest due to their effect on the coherence properties of superconducting quantum circuits, and are attributed to defects in amorphous materials at surfaces, interfaces, and the Josephson junction tunnel barrier. Frequency resolved measurements of $T_1$ in flux and stress tunable devices have also displayed fluctuations, suggesting an environment of TLSs with varying coupling strengths around the qubit frequency. The variability of $T_1$ over time is explained, at least in part, by temporal fluctuations in this frequency environment, associated with the spectral diffusion of the TLSs.

Furthermore, two-qubit gates that involve frequency excursions can also interact with TLSs near the qubit frequency leading to additional incoherent error. The fluctuations in TLS peak positions, therefore, can also introduce fluctuations in two qubit fidelity. Spectroscopy of defect TLSs is, therefore, central to understanding the short and long time $T_1$ and gate fidelity of qubits.

Single Josephson junction transmons with fixed frequency couplings represent a successful device architecture achieving networks of over 60 qubits with all microwave control and state of the art device coherence. The single junction configuration offers advantages such as reduced sensitivity to flux noise, while preserving the transmon charge insensitivity and also reducing system complexity with fewer control inputs. However, there is little TLS spectroscopy of single junction transmons because of the limited tunability, despite the central importance of understanding the TLS environment both for device stability and process characterization.

Experiments discussed herein introduce an all-microwave technique for the fast spectroscopy of TLSs in single junction transmon qubits that requires no additional hardware resources and can be easily sped up further by integration with reset schemes. In contrast to flux based approaches to TLS spectroscopy, off-resonant microwave tones were employed to drive AC-Stark shifts of the fundamental qubit transition and spectrally resolve qubit relaxation times. Dips in relaxation times serve as a probe of the frequency location of a strongly coupled TLS. Repeated frequency sweeps were used to probe the time dynamics of the relaxation probabilities including tracking the spectral diffusion of strongly coupled TLS. Across 10 qubits, strong correlations were observed between the long time mean, averaged over several months $\langle T_1 \rangle_T$. and the short time mean, averaged around the local qubit frequency $\langle T_1 \rangle_{\omega,t}$. This strong correlation suggests a quasi-ergodic behavior of the TLS spectral diffusion in the nearby frequency neighborhood of the qubit in contrast to static or uncorrelated stochastic processes. In contrast, there is lower correlation between $\langle T_1 \rangle$ and $T_1$ measured over a single day. The $\langle T_1 \rangle_{\omega,t}$ can provide, therefore, a more rapid estimate of long time behavior. Herein, the frequency neighbourhood of the qubit can be estimated by autocorrelation of $T_1$ or by autocorrelation of a decay probability $P_1$ in frequency. This concept has been further elaborated at least in paragraph [0072].

As used herein, a quantum circuit can be a set of operations, such as gates, performed on a set of real-world physical qubits with the purpose of obtaining one or more qubit measurements. A quantum processor can comprise the one or more real-world physical qubits.

Qubit states can only exist (or can only be coherent) for a limited amount of time. Thus, an objective of operation of a quantum logic circuit (e.g., including one or more qubits) can be to maximize the coherence time of the employed qubits. Time spent to operate the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit can be enabled, such as by a waveform generator, to produce one or more physical pulses and/or other waveforms, signals and/or frequencies to alter one or more states of one or more of the physical qubits.

The altered states can be measured, thus allowing for one or more computations to be performed regarding the qubits and/or the respective altered states. Operations on qubits generally can introduce some error, such as some level of decoherence and/or some level of quantum noise, further affecting qubit availability. Quantum noise can refer to noise attributable to the discrete and/or probabilistic natures of quantum interactions.

An energy relaxation time ($T_1$) of a qubit can fluctuate in time. One source of the fluctuations can be the quantum noise. One type of quantum noise can be TLSs. A two-level system has a transition energy (or corresponding frequency). When a TLS is resonant with the qubit frequency, the rate of energy relaxation can increase, leading to shorter $T_1$.

A two-level system (TLS), among other noise causes, can comprise a source of noise that can cause deterioration of coherence parameters (e.g., shorter $T_1$) of one or more qubits of a quantum logic circuit. TLSs are believed to be able to coherently or incoherently couple to the qubit leading to either faster energy relaxation times or rate of energy decay (e.g., shorter $T_1$s corresponding to an exponential 1/e decay time) as well as faster phase decoherence (e.g., $T_2$). That is, the noise can couple to a low-energy thermal fluctuator, for example, which can randomly change the TLS energy resonance (or the equivalent frequency of the TLS resonance). A TLS can spectrally diffuse into and out of resonance with the qubit frequency when the TLS is in the vicinity of a qubit frequency. This is a source of $T_1$ fluctuation at the qubit frequency.

The qubit frequency is the resonance frequency of a qubit energy transition between two states such as, but not limited to, the ground and first excited states of the qubit. The vicinity of a qubit frequency is a frequency range which in some embodiments can range from about 10 megahertz (MHz) below the qubit frequency to about 10 MHz above the qubit frequency. In other embodiments, the vicinity of a qubit frequency can range from about 100 MHz below the qubit frequency to about 100 MHz above the qubit frequency. In still other embodiments, the vicinity of a qubit frequency can range from about 1 gigahertz (GHz) below the qubit frequency to about 1 GHz above the qubit frequency. Without being limited to theory, it is believed that such TLSs can be caused by atomic scale defects in surface oxides on the metals and/or on the silicon of a physical real-world qubit and can be electromagnetically active. Indeed, a qubit, such as a transmon itself is a resonator with an electromagnetic excitation, and thus a qubit excitation can couple with a TLS and can cause performance issues for a quantum logic circuit, such as, but not limited to, deterioration of qubit parameters.

Due to presence of TLSs in/at the quantum system and/or due to maintenance and/or diagnostics to be performed relative to coherence times of a particular qubit, one or more qubits, such as superconducting qubits, can be unavailable and/or not recommended for use with the quantum logic circuit, even if desired for use. Furthermore, absent understanding of such two-level systems and their associated fluctuations relative to the frequency domain of one or more qubits of a quantum system, coherence of the qubit can be affected. Loss of coherence can cause failure of execution of a quantum circuit, thus wasting power, time, queue space and/or memory relative to a queue of jobs to be performed on a respective quantum system.

There can be varying causes for loss of qubit coherence. Some causes of decoherence can be equipment related. When coherence of a qubit suddenly changes, or changes gradually over time, one or more existing solutions can comprise not employing the qubit until the coherence deterioration is reduced or ends altogether, such as compared to historical coherence parameters for the particular qubit. Absent understanding, such as definitive understanding, that the change in qubit coherence parameters is caused by a two-level system, unnecessary diagnostics and/or maintenance can be performed, such as switching out cables, swapping control electronics, warming up a super-cooled refrigeration system of the quantum system to troubleshoot components, and/or the like. Also, even when a TLS is suspected as a culprit of noise issues, existing techniques for analyzing the frequency space about a qubit's unperturbed frequency, can be cumbersome, timely, resource intensive, and/or manually intensive relative to at least the scheduling and operation of associated diagnostics. The unperturbed frequency of the qubit is the resonance frequency of the qubit as fabricated, in the absence of external effects that may shift its frequency, including but not limited to magnetic flux bias, DC electric field, mechanical strain, and/or an Autler-Townes (AT) effect.

In view of unintended or unforeseen decoherence, waste of quantum resources, time, power, and/or labor can occur. Indeed, because quantum processors and quantum systems are scarce and costly resources, such waste can be detrimental to both users and administrators of quantum systems. Put another way, each quantum processor can have a fixed number of qubits it supports. When quantum circuits cannot use the full capacity of a quantum processor, one or more qubits can remain idle. Thus, it can be desired to enable a process for understanding deteriorations and/or changes in qubit coherence parameters to in turn provide more informed queuing of quantum jobs and/or mapping of quantum circuits of the quantum jobs.

Moreover, different quantum circuits can require varying resources. For example, one quantum circuit can use different physical qubits of a quantum logic circuit of a respective quantum system than another quantum circuit. During scheduling of quantum jobs from a queue and corresponding mapping of quantum circuits to a quantum logic circuit, particular qubits can be desirable for use with one quantum circuit as compared to other qubits of a same quantum logic circuit. Quantum noise, such as TLSs can therefore interfere, often unknowingly, with this mapping. Therefore, device designs that can target qubits having a longer lifetime of their respective quantum states and/or having longer coherence time can be desirable.

To address the aforementioned presence of TLSs, lack of information regarding qubit coherence parameters, and/or diagnostics/maintenance to address noise, described herein are one or more embodiments of a system, computer-implemented method and/or computer program product that can analyze the frequency space of a qubit, to allow for better understanding and/or prediction of evolving coherence parameters of the qubit. Indeed, the one or more embodiments described herein can account for one or more deficiencies of existing techniques for analyzing qubit coherence parameters of one or more qubits, including both fixed frequency and multi-junction qubits.

With respect to single junction qubits, such as single Josephson junction transmons with fixed frequency couplings, such type of qubit represents a device architecture that can be employed in a device having even 60 or more qubits, for example. The single junction configuration can offer advantages such as reduced sensitivity to flux noise, while preserving the transmon charge insensitivity and reducing system complexity with few control inputs (e.g., due to the single junctions). However, due to the limited frequency tunability of single junction qubits, existing TLS spectroscopy techniques are limited, cumbersome and/or time-consuming.

Generally, provided are one or more embodiments of a system, computer-implemented method and/or computer program product for executing a process to employ an excited qubit shifted in frequency as a probe of the energy relaxation rate frequencies at or around the qubit's frequency. Understanding this neighborhood (i.e., vicinity) can allow for one or more determinations to be made regarding coherence parameters of the qubit at different shifted frequencies, such as specifically based on TLS and/or noise presence about a qubit frequency over a range of time, such as days, weeks and/or months. This can be desired information when determining which qubits and/or which qubit device to employ for executing a quantum circuit due to the nature of qubit coherence parameters being dynamic, fluctuating and/or otherwise changing when in the presence of or coming into at least partial resonance with a TLS and/or other system noise. Indeed, such understanding can be gained, such as separately on a qubit-by-qubit basis, to gain an understanding regarding frequency space about a group of qubits of a quantum processor or other quantum device. A qubit device comprises a group of qubits pertaining to the same piece of hardware.

Generally, the one or more systems, devices, computer program products and/or computer-implemented methods of use provided herein can employ a qubit shifted in frequency, such as by a frequency shifting method based on flux tuning, an Autler-Townes off-resonant tone (AT tone), DC electric field, mechanical strain, and/or by another suitable method to probe a frequency space about excitation frequencies of the qubit. Results of the probing can be employed to determine probabilities of the qubit being at one or more excited states at various times and/or various shifted frequencies.

Further, results of the probing can be employed to forecast estimated energy relaxation times of a qubit at one or more frequencies based on the frequency neighborhood about the desired one or more frequencies. Understanding of variance in the probabilities can allow for a better understanding of whether or not to employ the qubit, and or a respective qubit device comprising the qubit, such as relative to one or more other qubits and/or qubit devices. These one or more systems, device, computer program products and/or computer-implemented methods of use can be employed relative to plural qubits of a qubit device. It is noted that while one or more operations described herein can be employed absent application of flux bias to the qubits (e.g., absent flux tuning of the qubits) to determine the aforementioned information and results, such operations can function by instead employing flux bias, mechanical strain and/or DC electric field to shift a qubit frequency.

The information can be gained more quickly than by employing existing techniques relying on $T_1$ measurements made at only the unperturbed/unshifted qubit frequency. The $T_1$ fluctuates slowly in time. An estimate of the average energy relaxation time $<T_1>$ is typically obtained by measuring then waiting a time (i.e., best if that time is long relative to any correlation time of the $T_1$ fluctuations). Obtaining an average of $T_1$ with a small uncertainty requires many measurements spaced by a long time. As used herein. $T_1$ refers to energy relaxation time of a qubit, which is a coherence time limitation on how long information can be stored in the qubit. The measurement of $T_1(\Delta\omega)$ for many different $\Delta\omega$ further provides an understanding about movements and fluctuations in the respective frequency space, better forecasting can be provided using the one or more embodiments described herein.

In accordance with one or more embodiments discussed herein, the method using $T_1$ measurements at shifted frequencies near the qubit's unperturbed frequency to estimate $T_1(\Delta\omega)$ can comprise sampling, by a system operatively coupled to a processor, a plurality of measurements of an energy relaxation time of a qubit at individual shifted qubit frequencies of a plurality of shifted qubit frequencies of the qubit, and performing, by the system, an analysis, based on a protocol, to determine a correlation frequency-length between individual energy relaxation times measured at the individual shifted qubit frequencies, wherein the correlation frequency-length can be employed for generating an estimator for an average energy relaxation time of the qubit based on the analysis. It is to be appreciated that the terms "estimator" and "estimated energy relaxation time/s" have been used interchangeably throughout the scope of this specification and represent an estimated energy relaxation time of a qubit.

Herein, the method can specify a minimum number of independent measurements of $T_1$ required at shifted qubit frequencies of the qubit for achieving a target accuracy between the estimator and the average energy relaxation time of the qubit, and the method can specify a minimum range of shifted qubit frequencies required to achieve the target accuracy. Accordingly, individual measurements of $T_1$ can be sampled at individual shifted qubits frequencies in the vicinity of a qubit's unperturbed frequency. The individual measurements of $T_1$ can be used to calculate a correlation frequency-length that can represent a minimum spacing between individual $T_1$ times measured at consecutive shifted qubit frequencies such that the individual measurements of $T_1$, measured at shifted qubit frequencies spaced according to the minimum spacing, can be approximately independent from one another.

A protocol can further specify a minimum number of independent measurements of $T_1$ required to achieve a target accuracy for the estimator. The minimum number of independent measurements of $T_1$ at the shifted qubit frequencies can be further weighted to generate a minimum number of independent weighted measurements of $T_1$ that can be used to calculate the target accuracy. In accordance with statistical methods elaborated further in at least paragraphs [00190]-[00200] and in Appendix C of this specification, it can be determined that a score of R=0.8 on a Pearson R test can represent a strong Pearson correlation between the estimator and the average energy relaxation time of the qubit, and thus R=0.8 can represent the target accuracy in this case. Additionally, the minimum number of independent weighted measurements can be used to determine the minimum range of frequencies over which the plurality of measurements of $T_1$ can be taken. This can be done via equation 1.

$$\Delta\omega = \frac{(S-1)}{2}\chi, \quad \text{Equation 1}$$

where $\Delta\omega$ can represent the minimum range of frequencies, S can represent the minimum number of independent measurements of the energy relaxation times, and $\chi$ can represent the correlation-frequency length, in accordance with one or more embodiments discussed herein. Additional definitions of variables can be found in Table 1. For example, in one or more embodiments, in accordance with statistical methods elaborated in Appendix G and in at least paragraph [00256], it can be determined that an independent measurement is one that can have a correlation below a value of about 0.2.

In various embodiments, one or more of the technical problems discussed here can be addressed via a protocol for a <T$_1$> estimation method. The method can sample T$_1$ at a qubit frequency and at shifted qubit frequencies nearby the unperturbed qubit frequency. The protocol can specify the shifted qubit frequencies for an efficient application of the method. This approach can produce a faster estimator of <T$_1$> than measuring T$_1$ only at the qubit's frequency. For screening of devices that have many qubits (i.e., a <T$_1$> for each qubit), this method and protocol can provide an accurate way to compare two devices rapidly with higher accuracy than relying on measuring T$_1$ at the qubit frequency alone. The protocol can comprise an to determine the correlation frequency-length between each Δω using the same collection of T$_1$ measurements.

The solution can further comprise a technique to shift a transmon's frequency (e.g., AC Stark shift OR flux tuning), a collection of measurements of T$_1$ at the qubit frequency and at shifted frequencies, Δω$_j$, over a range of frequencies from −δω to +δω, an analysis to determine the correlation frequency-length between each δω$_j$ using the same collection of T$_1$ measurements, an average <T$_1$>$_{\delta\omega}$ derived from the measurements and an analysis using a weighting of each of the T$_1$ measurements as a function of Δω$_j$ and δω, wherein the average <T$_1$>$_{\delta\omega}$ can represent an estimator of <T$_1$> such that <T$_1$>$_{\delta\omega}$ can show higher statistical correlation to <T$_1$> than independent measurements of T$_1$ at the qubit frequency for the same amount of measurement time.

For obtaining T$_1$s at Δω$_j$, a typical embodiment of a T$_1$ spectroscopy experiment for a fixed frequency qubit can be illustrated in FIG. 3, wherein the embodiment can be obtained using an extra drive tone (pulsed, not continuous) to Stark shift the qubit. Flux tunable measurements of T$_1$(Δω$_j$) are also possible. For example, a single decay probability, P$_1$, at τ=50 μs can be used as a proxy for T$_1$, and an estimator of the T$_1$ measurement can be generated from the P$_1$ value by assuming an exponential decay of the qubit's energy, per equation 2. The <T$_1$>$_{\Delta\omega}$ estimator can be formed per equation 3.

$$\frac{-\tau}{\ln(P1(\Delta\omega_q = 0))}, \quad \text{Equation 2}$$

wherein Δω$_q$ can represent the unperturbed qubit frequency, τ can represent a fixed time at which the qubit's energy decays, and P$_1$ (Δω$_q$=0) can represent the measured probability of being in the |1⟩ state at time t at the bare qubit frequency.

$$\langle T_1\rangle_{\omega,t} = \frac{1}{n}\sum_{i=1}^{n}\frac{1}{2\Delta\omega}\sum_{-\Delta\omega}^{\Delta\omega}\frac{-\tau}{\ln(P_1(\omega_q + \omega_j, \tau, t_i)d\omega_j)}, \quad \text{Equation 3}$$

wherein dω$_j$ can represent the minimum spacing between the shifted qubit frequencies such that −Δω and +Δω can be replaced with −δω to +δω (range of frequencies), respectively, and ω$_j$ can be replaced with Δω$_j$ (shifted qubit frequencies). Additionally, the "j" index can represent an index of the second/innermost summation, and 2Δω can be equal to a summation of the range of frequencies according to equation 4.

$$2\Delta\omega = |-\delta\omega| + \delta\omega \quad \text{Equation 4}$$

A subset of T$_1$(ω$_q$+ω$_j$) can be defined to form the estimator, wherein the estimator can be spaced by x, and wherein the protocol can define a number of samples, S (equation 5), for a target correlation of the estimator with <T$_1$> T. As will be discussed in the subsequent figures, at values of S equal to about 10, the estimator <T$_1$>$_{\Delta\omega}$ and <T$_1$> T can be expected to approach or exceed strong correlation.

$$\{T_1(t_i)\} = \frac{1}{S}\sum_{j=0}^{S}T_1(\omega_q + (jx - \Delta\omega), t_i), \quad \text{Equation 5}$$

wherein additional definitions of variables can be found in Table 1.

Figure 15:
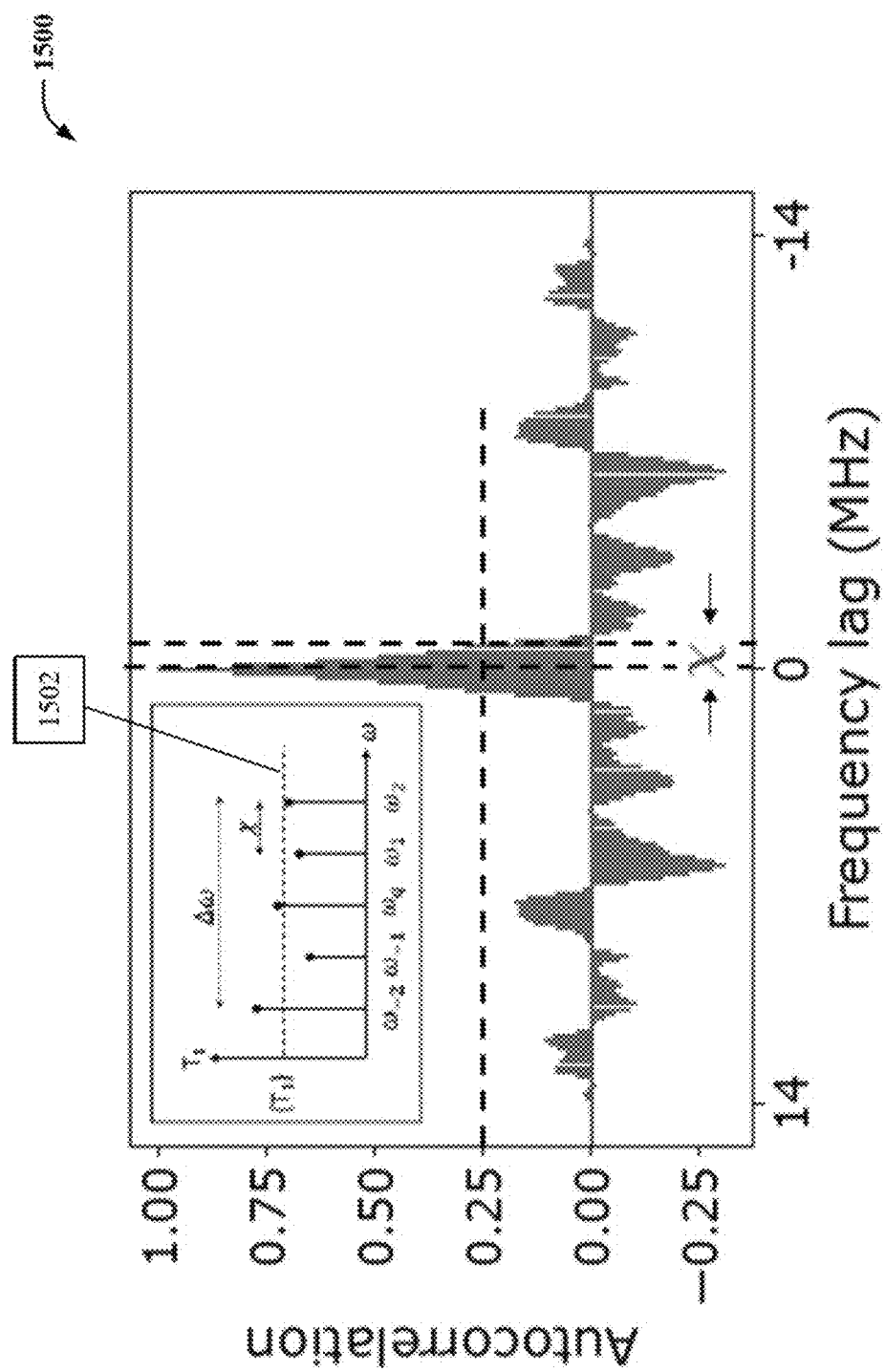
FIG. 15 illustrates a graph demonstrating autocorrelation of a qubit for a negative Stark shift in accordance with one or more embodiments described herein.

An example of analysis can be to determine the correlation frequency-length between each Δω in accordance with FIG. 15. FIG. 15 can represent autocorrelation between frequencies of the P$_1$ measurements. Autocorrelation below a range of 0.2-0.25 can be defined as a threshold of approximately independent measurements of T$_1$ measured at individual shifted qubit frequencies, in accordance with one or more embodiments discussed herein. Autocorrelation below 0.25 can be achieved by setting χ equal to a specific frequency length. The inset graph in FIG. 15 can illustrates a comb of frequencies separated by x. The maximum frequency is set by S.

Figure 16A:
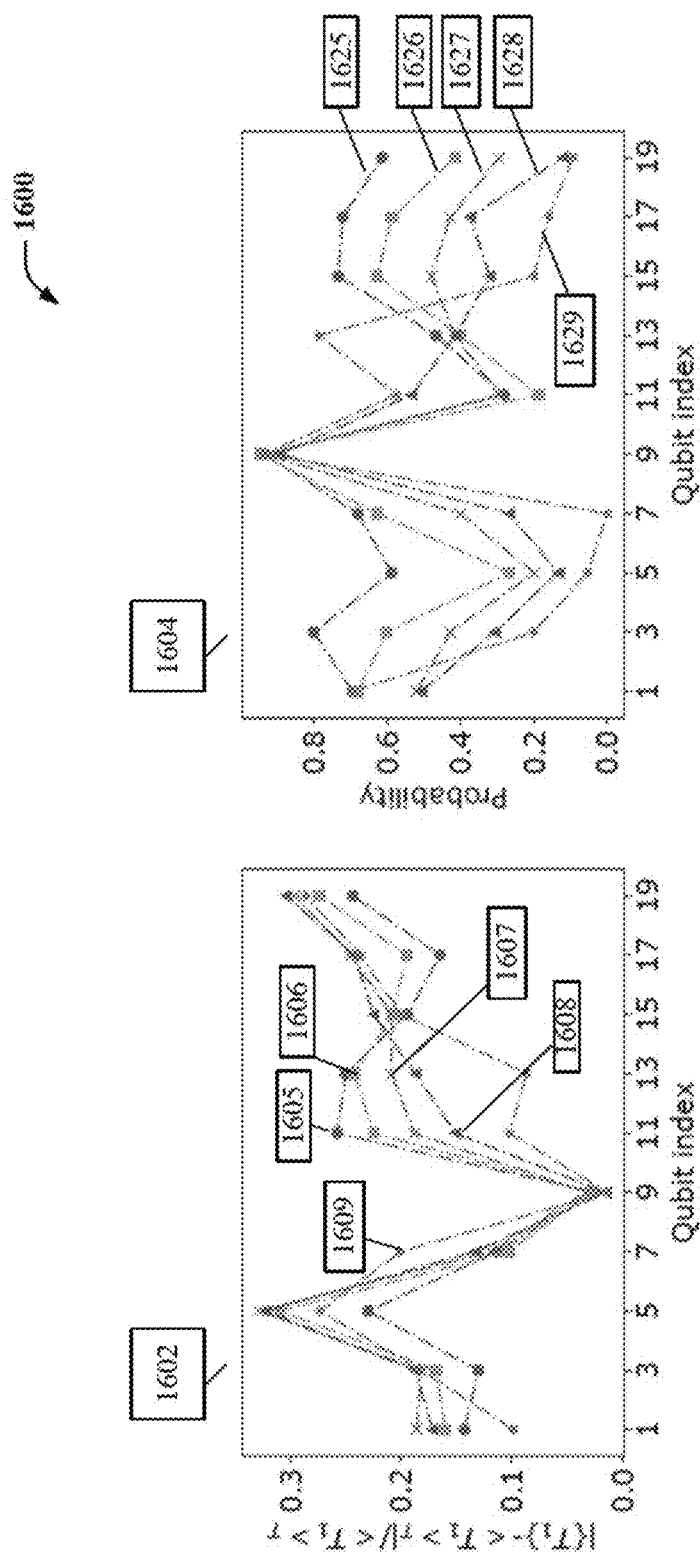
FIG. 16A illustrates schematic graphs pertaining to qubit $T_1$ responses to shift in qubit frequencies in accordance with one or more embodiments described herein.
Figure 16B:
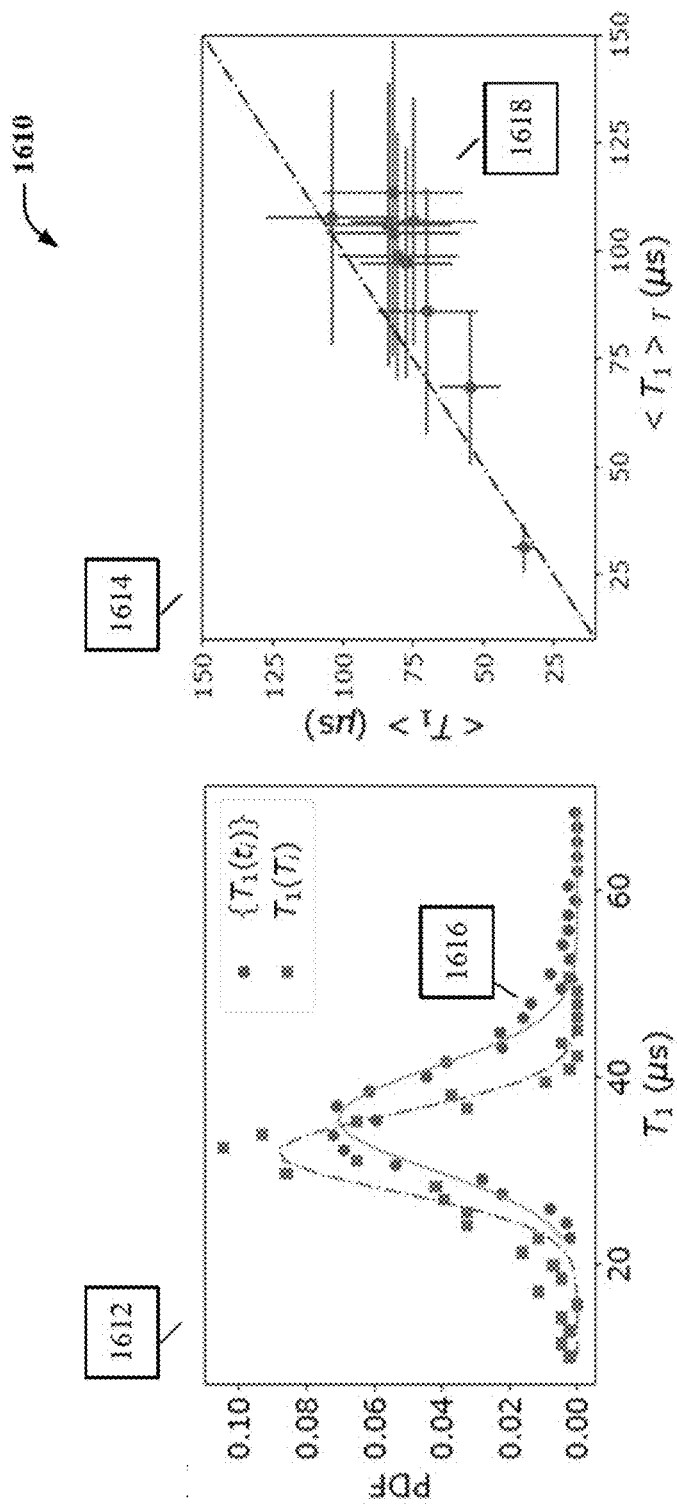
FIG. 16B further illustrates schematic graphs pertaining to qubit $T_1$ responses to shift in qubit frequencies in accordance with one or more embodiments described herein.

An example of efficacy of the protocol can be illustrated by FIG. 16B. Graph 1612 of FIG. 16B illustrates a probability distribution function of T$_1$s for a time series T$_1$(T$_i$) of a qubit. Overlaid are a set of estimators {T$_1$(t$_i$)} using the protocol. Graph 1614 of FIG. 16B illustrates the approach applied to 10 qubits. A strong near 1:1 correlation can be observed, wherein the 1:1 correlation can be achieved faster than obtaining a similar accuracy from a T$_1$ timeseries measured at a single qubit frequency.

Table 1: List of Symbols

TABLE 1

| Symbol | Definitions |
|---|---|
| | List of symbols |
| ω$_q$ | Qubit frequency |
| Ω$_{s,j}$ | j$^{th}$ Stark drive amplitude point in a frequency scan (see equation 6) |
| ω$_j$ | j$^{th}$ Qubit Stark shift, Δω$_q$ (see equation 6) |
| dω$_j$ | Frequency bin size at the Stark shifted frequency location |
| Δω | Maximum qubit Stark shift |
| N | Number of T$_1$ measurements for the approximately 9 month time series in an average |

TABLE 1-continued

List of symbols

| Symbol | Definitions |
| --- | --- |
| n | Total number of spectroscopy time slices in a moving average |
| $T_i$ | Time of $i^{th}$ time bin for the approximately 9 month $T_1$ time series |
| $t_i$ | Time of $i^{th}$ time bin of the spectroscopy time series |
| $T_1(t_i)$ | $T_1$ measured at $i^{th}$ time |
| $\tau$ | Decay time at which $P_1$ was evaluated |
| $P_1(\omega_q + \omega_j, \tau, t_i)$ | Probability of $|1\rangle$ at $\tau$ delay for time slice $t_i$ and frequency shift $\omega_j$ |
| $\langle P_1 \rangle_T$ | Probability of $|1\rangle$ at $\tau$ averaged over approximately 9 month time series |
| $\langle P_1 \rangle_{\omega, t}$ | Probability of $|1\rangle$ at $\tau$ averaged over frequency and spectroscopy time |
| $\langle T_1 \rangle_{T_0 \to N}$ | Moving average of $T_i$ measurements from $T_0$ to $T_n$ |
| $\langle T_1 \rangle_T$ | $T_1$ averaged over entire about 9 months |
| $\langle T_1 \rangle_{\omega, t}$ | $T_1$ average from $\langle P_1 \rangle_{\omega, t}$ |
| $Q_k$ | k'th qubit |
| $R(t_i)$ | $\langle T_1 \rangle_T$ correlation to $\langle T_1 \rangle_\omega$ at $t_i$ for $\{Q_k\}$ |
| $R(T_i)$ | $\langle T_1 \rangle_T$ correlation to $T_1$ at a single time $T_i$ of the approximately 9 month series for $\{Q_k\}$ |
| $\langle R \rangle_{t_0 \to n}$ | $\langle T_1 \rangle_T$ correlation to $\langle T_1 \rangle_{\omega, t_0 \to n}$ for $\{Q_k\}$ |
| $\langle R \rangle_{T_0 \to N}$ | $\langle T_1 \rangle_T$ correlation to $\langle T_1 \rangle_{T_0 \to N}$ for $\{Q_k\}$ |

One or more embodiments are now described with reference to the drawings, where like referenced numerals are used to refer to like elements throughout. As used herein, the terms "entity", "requesting entity" and "user entity" can refer to a machine, device, component, hardware, software, smart device and/or human. In the following description, for purposes of explanation, numerous specific details are set forth in order to provide a more thorough understanding of the one or more embodiments. It is evident, however, in various cases, that the one or more embodiments can be practiced without these specific details.

Figure 2:
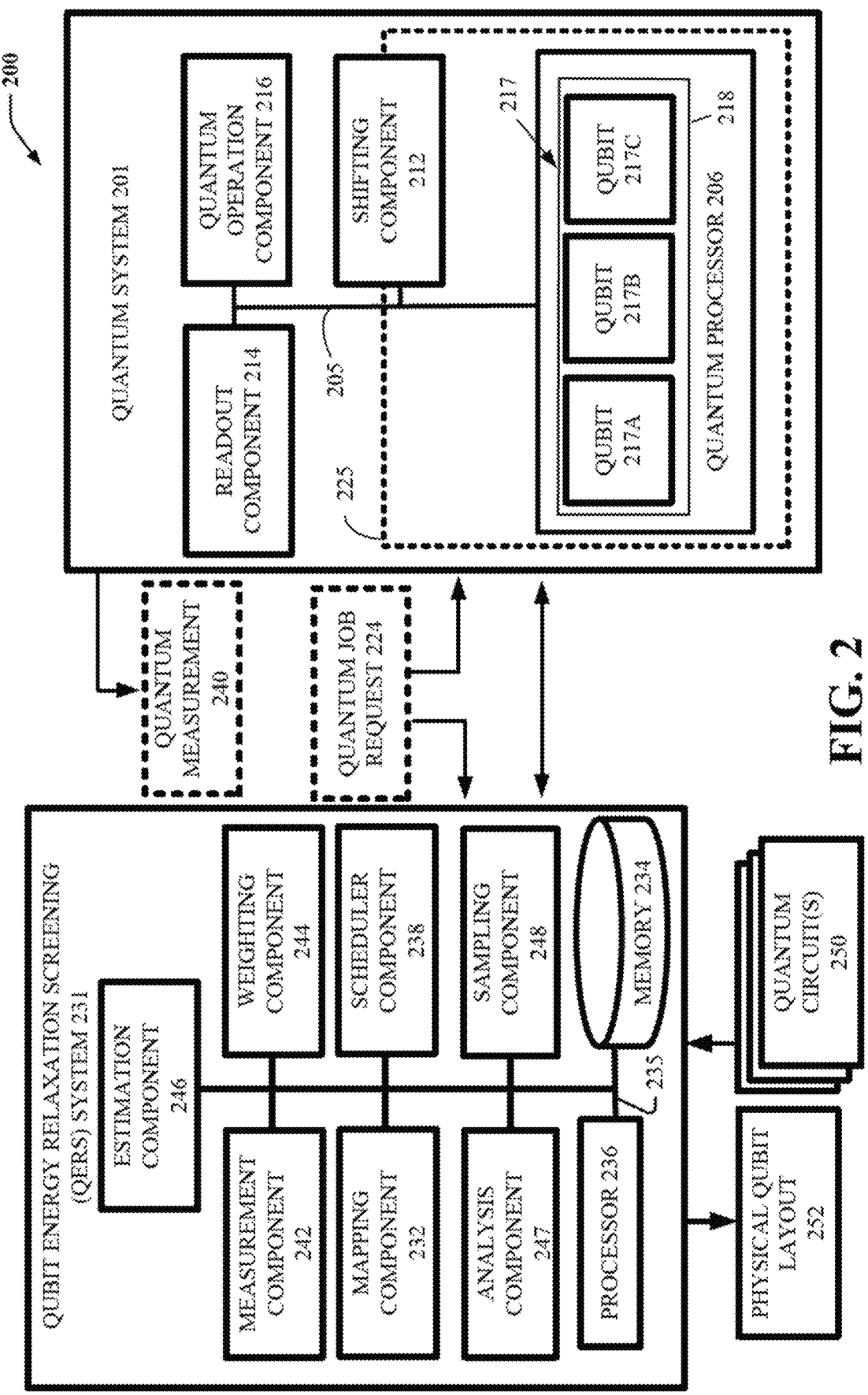
FIG. 2 illustrates a block diagram of another example, non-limiting system that can enable a process to determine an estimated energy relaxation time of a qubit, in accordance with one or more embodiments described herein.

Further, the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems described herein, such as non-limiting systems 100 and/or 200 as illustrated at FIGS. 1 and 2, and/or systems thereof, can further comprise, be associated with and/or be coupled to one or more computer and/or computing-based elements described herein with reference to an operating environment, such as the computing environment 2200 illustrated at FIG. 22. In one or more described embodiments, computer and/or omputing-based clements can be used in connection with implementing one or more of the systems, devices, components and/or computer-implemented operations shown and/or described in connection with FIGS. 1 and/or 2 and/or with other figures described herein.

Turning first generally to FIG. 1, one or more embodiments described herein can include one or more devices, systems and/or apparatuses that can enable a process to determine an estimated energy relaxation time of a qubit, as briefly described above. For example, FIG. 1 illustrates a block diagram of an example, non-limiting system 100 that can employ a shifting component to probe frequency space of a qubit of a quantum logic circuit of a quantum system. As used herein, the average energy relaxation time is the ideal relaxation time being a true mean of a continuous distribution.

At FIG. 1, illustrated is a block diagram of an example, non-limiting system 100 that can enable such probing process, in accordance with one or more embodiments described herein. While referring here to one or more processes, facilitations and/or uses of the non-limiting system 100, descriptions provided herein, both above and below, also can be relevant to one or more other non-limiting systems described herein, such as the non-limiting system 200, to be described below in detail.

As illustrated at FIG. 1, the non-limiting system 100 can comprise a classical system such as qubit energy relaxation screening (QERS) system 131, and quantum system 101. The quantum system 101 can comprise at least a quantum processor 106 having a quantum logic circuit 118 comprising at least one or more qubits. The QERS system 131 can comprise one or more components, such as a memory 134, quantum processor 136, bus 135, measurement component 142, weighting component 144, analysis component 145, and/or sampling component 146.

Generally, the classical system, such as QERS system 131, can employ the measurement component 142 or sampling component 146 to determine one or more energy relaxation measurements at the qubit frequency for a qubit. The measurement component or sampling component 146 likewise can determine one or more energy relaxation measurements at a plurality of shifted frequencies for the qubit. By combining these measurements, e.g., by estimation component 246 of FIG. 2, such as by averaging these measurements, or averaging these measurements according to weights of the measurements, an estimation of an average energy relaxation time of the qubit can be obtained. That is, incorporated in the estimation are a range of measurements through frequencies through which noise (e.g., TLSs) can move and or fluctuate before migrating/fluctuating/jumping to the qubit frequency. For example, sampling component 146 can sample one or more measurements of an energy relaxation time of the qubit at the individual shifted qubit frequencies to generate an estimator for an average energy relaxation time of the qubit based on the one or more measurements.

Further, analysis component 145 can perform an analysis, based on a protocol, to determine a correlation frequency-length between individual shifted qubit frequencies of a plurality of shifted qubit frequencies of a qubit to enable generating the estimator for an average energy relaxation time of the qubit based on the one or more measurements.

Turning next to FIG. 2, the figure illustrates a diagram of an example, non-limiting system 200 that can enable TLS and qubit excitation spectroscopy and subsequent analysis of the results, thereby facilitating a process to determine an estimated energy relaxation time of a qubit. For example, FIG. 2 illustrates a block diagram of an example, non-limiting system 200 that can employ a shifting component to affect a qubit 217, and a readout component 214 that can be employed to measure one or more characteristics of the affected qubit, qubit 217. In response, the non-limiting system 200 can employ a measurement component 242 to determine one or more estimated energy relaxation times ($<T_1>_{\delta\omega}$)), where dω refers to the frequency range covered by the average employed in the estimation, ranging from frequency value $-\delta\omega$ to $+\delta\omega$.

Generally, the non-limiting system can first obtain $T_1$ measurements at multiple offset frequencies, used for obtaining the estimator described herein, $<T_1>_{\delta\omega}$, via any suitable means. Again, as used herein, $T_1$ refers to energy relaxation time of a qubit, which is a coherence time limitation on how long information can be stored in the qubit. The suitable means for measuring the $T_1$s can include a slow method of entirely measuring $T_1$s (i.e., $P_1$s at different delay times) and at varying frequencies, using DC electric field, using mechanical strain, or by flux tuning multi-junction qubits to various shifted frequencies and waiting for measurements of entire $T_1$s. Additionally, $T_1$s can be measured by employing the qubit as a probe in frequency space to determine probabilities $P_1$ of a qubit being in a particular state at a particular time. From the $P_1$s, $T_1$s can be obtained. This method is generally described relative to FIGS. 4A-5. This method described herein for first obtaining the $T_1$s can provide more rapid results than the other methods indicated above—the method described herein by employing $P_1$ as a proxy for time-to-decoherence ($T_1$) of the particular qubit, such as at a fixed delay time. Nonetheless, the other methods indicated above (flux tuning, DC electric field, mechanical strain, and/or the like) and understood to one having ordinary skill in the art, can be employed, albeit more slowly providing results, and wasting power, time, energy and/or manual labor.

Using the $P_1$ measurements obtained, $T_1$ measurements can be determined. As compared to waiting for a plurality of $P_1$ measurements at different delay times, τ, to more accurately fit the energy relaxation to, for example, an exponential decay ascribing $T_1$ to the 1/e time. The $P_1$ and $T_1$s described above are made at a single qubit frequency offset including 0 (zero) offset.

Estimating an average energy relaxation time, $<T_1>$, of a qubit can be commonly done using an average of many weakly time correlated $T_1$ measurements of the qubit, where Δt is the total time over which the average can be made (i.e., the sum of many time intervals sufficient to produce weak correlation in the $T_1$ fluctuations in time). Spacings in time to obtain weakly correlated measurements can typically be orders of magnitude larger than the time to obtain a single $T_1$ measurement. The techniques described herein can provide results that better correlate with $<T_1>$ (average $T_1$). The average according to existing techniques can be denoted as $<T_1>_{\Delta t}$.

Generally, an estimator $<T_1>_{\delta\omega}$ has been discovered by the inventors to be a faster estimator of unattainable $<T_1>$ (average $T_1$) than existing techniques for obtaining an estimator of average $T_1$ (denoted herein as $<T_1>$). The estimator described herein, $<T_1>_{\delta\omega}$, can represent an estimator for $<T_1>$ that can be obtained more quickly than the long time averaging necessary to obtain $<T_1>_{\Delta t}$. Indeed, the estimator described herein, $<T_1>_{\delta\omega}$, can instead comprise averaging by taking $T_1$ measurements at multiple offset frequencies, Δω, from the qubit frequency, $\omega_q$, of a qubit, q (ω are expressed typically in radians per second (Rad/s) whereas f=ω/(2φ) are expressed in Hertz (Hz)). As used herein, "i" can represent an index for Z different frequencies, where Z can represent the number of different frequencies measured.

Repetitive description of like elements and/or processes employed in respective embodiments is omitted for sake of brevity. As indicated previously, description relative to an embodiment of FIG. 1 can be applicable to an embodiment of FIG. 2. Likewise, description relative to an embodiment of FIG. 2 can be applicable to an embodiment of FIG. 1.

In one or more embodiments, the non-limiting system 200 can be a hybrid system and thus can include both a quantum system and a classical system, such as quantum system 201 and qubit energy relaxation screening (QERS) system 231, respectively. In one or more other embodiments, the quantum system 201 can be separate from, but function in combination with, the QERS system 231. In one or more embodiments, one or more components of the quantum system 201, such as the readout component 214, can be at least partially comprised by the QERS system 231, or otherwise comprised external to the quantum system 201. In one or more embodiments, one or more components of the QERS system 231, such as the measurement component 242 and/or weighting component 244, can be at least partially comprised by the quantum system 201, or otherwise comprised external to the QERS system 231 (also herein referred to as the qubit energy relaxation screen system 231 or QERS system 231).

One or more communications between one or more components of the non-limiting system 200 can be enabled by wired and/or wireless means including, but not limited to, employing a cellular network, a wide area network (WAN) (e.g., the Internet), and/or a local area network (LAN). Suitable wired or wireless technologies for facilitating the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Arca Networks), Z-Wave, an ANT, an ultra-wideband (UWB) standard protocol and/or other proprietary and/or non-proprietary communication protocols.

The QERS system 231 and/or the quantum system 201 can be associated with, such as accessible via, a computing environment 2200 described below with reference to FIG. 22. For example, the QERS system 231 can be associated with a computing environment 2200 such that aspects of classical processing can be distributed between the QERS system 231 and the computing environment 2200.

Turning first to the quantum system 201, generally based on a quantum job request 224, on physical qubit layouts 252, and/or on an associated queue of quantum circuits 250 to be executed, the quantum operation component 216 and/or quantum processor 206 can direct execution of the quantum circuits at the quantum logic circuit 218.

Generally, the quantum system 201 (e.g., quantum computer system, superconducting quantum computer system and/or the like) can employ quantum algorithms and/or quantum circuitry, including computing components and/or devices, to perform quantum operations and/or functions on input data to produce results that can be output to an entity.

The quantum circuitry can comprise quantum bits (qubits), such as multi-bit qubits, physical circuit level components, high level components and/or functions. The quantum circuity can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement 240, can be responsive to the quantum job request 224 and associated input data and can be based at least in part on the input data, quantum functions and/or quantum computations.

In one or more embodiments, the quantum system 201 can comprise components, such as a quantum operation component 216, a quantum processor 206, shifting component 212 (e.g., a waveform generator) and/or a readout component 214. In other embodiments, the readout component 214 can be comprised at least partially by the QERS system 231 and/or be external to the quantum system 201. The quantum processor 206 can comprise the quantum logic circuit 218 comprising one or more, such as plural, qubits 217. Individual qubits 217A, 217B and 217C, for example, can be fixed frequency and/or single junction qubits, such as transmon qubits.

The quantum processor 206 can be any suitable processor. The quantum processor 206 can generate one or more instructions for controlling the one or more processes of the quantum operation component 216 and/or for controlling the quantum logic circuit 218.

The quantum operation component 216 can obtain (e.g., download, receive, search for and/or the like) a quantum job request 224 requesting execution of one or more quantum programs (e.g., quantum circuit 250) and/or a physical qubit layout 252 generated by the QERS system 231. The quantum job request 224 can be provided in any suitable format, such as a text format, binary format and/or another suitable format. In one or more embodiments, the quantum job request 224 can be received by a component other than of the quantum system 201, such as by a component of the QERS system 231.

The quantum operation component 216 can determine one or more quantum logic circuits, such as the quantum logic circuit 218, for executing a quantum program. In one or more embodiments, the quantum operation component 216/quantum processor 206 can direct the shifting component 212 to generate one or more pulses, tones, waveforms and/or the like to affect one or more qubits 217.

The shifting component 212 can generally perform one or more quantum processes, calculations and/or measurements for shifting the frequency of one or more qubits 217, such as when in respective excited states. For example, the shifting component 212 can operate one or more qubit effectors, such as qubit oscillators, harmonic oscillators, pulse generators and/or the like to cause one or more pulses to stimulate and/or manipulate the state(s) of the one or more qubits 217 comprised by the quantum system 201, and thus can be and/or comprise a waveform generator. In one or more other embodiments, additionally and/or alternatively, the shifting component 212 can enable application of flux bias/flux tuning to one or more qubits. This shifting can be employed, as briefly described above, relative to probing of frequency space about the qubit frequency of the qubit, to thereby enable measurement of one or more qubit parameters at the shifted frequency.

The readout component 214 can enable transmission, e.g., readout, of one or more readings, signals and/or the like to the classical system, such as to the measurement component 242. From the readout, the measurement component can determine one or more energy relaxation measurements at the qubit frequency or at a shifted frequency of the qubit.

The quantum logic circuit 218 and a portion or all of the shifting component 212 can be contained in a cryogenic environment, such as generated by a cryogenic chamber 225, such as a dilution refrigerator. Indeed, a signal can be generated by the shifting component 212 within the cryogenic chamber 225 to affect one or more of the plurality of qubits 217. Where the plurality of qubits 217 are superconducting qubits, cryogenic temperatures, such as about 4 Kelvin (K) or lower can be employed to enable functioning of these physical qubits. Accordingly, one or more elements of the readout component 214 also can be constructed to perform at such cryogenic temperatures.

The readout component 214, or at least a portion thereof, can be contained in the cryogenic chamber 225, such as for reading a state, frequency and/or other characteristic of a qubit, excited, decaying or otherwise.

Generally, the operations can allow for better understanding and/or planning of the quantum job queue, qubit decay and/or qubit coherence relative to the quantum logic circuit 218. As indicated, the diagnostics and operations of the quantum system 201 can be performed at any suitable interval to thereby enable the frequency space mapping of one or more of the qubits 217. As indicated, a suitable interval can be between execution of quantum jobs and/or at a defined and uniform interval, such as every 6 hours, every 3 hours, every 1 hour and/or any other suitable interval. The diagnostic processes to be discussed can be performed on any number, one or more, of the qubits 217 of the quantum logic circuit 218 to gain a better understanding of frequency space about the qubit frequencies of these qubits 217.

Further, the aforementioned description(s) refer(s) to the operation of a single set of diagnostics run on a single qubit. However, employment of the diagnostics can be enabled, where suitable, at one or more qubits at a time of a quantum system. For example, non-neighbor qubits of a quantum logic circuit can be simultaneously measured.

Next, discussion turns to operations of the QERS system 231 that can be performed on and/or employing the readout output from the quantum system 201, to thereby enable generation of the information regarding the frequency space of the qubit, over a range of time that can span days, weeks and/or months.

Turning now to the classical system specifically, generally, the QERS system 231 can comprise any suitable type of component, machine, device, facility, apparatus and/or instrument that comprises a processor and/or can be capable of effective and/or operative communication with a wired and/or wireless network. All such embodiments are envisioned. For example, the QERS system 231 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the QERS system 231 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

The QERS system 231 can comprise a plurality of components. The components can include a memory 234, processor 236, bus 235, mapping component 232, scheduler component 238, measurement component 242, estimation component 246 and/or weighting component 244. It is noted that while the measurement component 242, estimation component 246 and/or weighting component 244 are shown as being comprised by the QERS system 231, in one or more other embodiments, any one or more of these components can be comprised by the quantum system 201 or be external or at least partially external to the QERS system 231.

Generally, the QERS system 231 can enable receipt of a quantum job request 224 and/or receipt of one or more quantum circuits 250 to be operated on the quantum system 201 relative to the quantum logic circuit 218 of the quantum system 201. The quantum circuits 250 can be mapped to one or more physical qubit layouts 252 by the QERS system 231, such as based on the readout data from the quantum system 201 and further based on the use of that readout data by the measurement component 242 of the classical system.

Discussion first turns briefly to the processor 236, memory 234 and bus 235 of the QERS system 231. For example, in one or more embodiments, the QERS system 231 can comprise the processor 236 (e.g., computer processing unit, microprocessor, classical processor, quantum processor and/or like processor). In one or more embodiments, a component associated with QERS system 231, as described herein with or without reference to the one or more figures of the one or more embodiments, can comprise one or more computer and/or machine readable, writable and/or executable components and/or instructions that can be executed by processor 236 to enable performance of one or more processes defined by such component(s) and/or instruction(s). In one or more embodiments, the processor 236 can comprise the mapping component 232, scheduler component 238, measurement component 242, estimation component 246 and/or weighting component 244.

In one or more embodiments, the QERS system 231 can comprise a computer-readable memory (e.g., memory 234) that can be operably connected to the processor 236. The memory 234 can store computer-executable instructions that, upon execution by the processor 236, can cause the processor 236 and/or one or more other components of the QERS system 231 (e.g., mapping component 232, scheduler component 238, measurement component 242, estimation component 246 and/or weighting component 244) to perform one or more actions. In one or more embodiments, the memory 234 can store computer-executable components (e.g., mapping component 232, scheduler component 238, measurement component 242, estimation component 246 and/or weighting component 244).

The QERS system 231 and/or a component thereof as described herein, can be communicatively, electrically, operatively, optically and/or otherwise coupled to one another via a bus 235. Bus 235 can comprise one or more of a memory bus, memory controller, peripheral bus, external bus, local bus, quantum bus and/or another type of bus that can employ one or more bus architectures. One or more of these examples of bus 235 can be employed.

In one or more embodiments, the QERS system 231 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the QERS system 231 and/or of the non-limiting system 200 can reside in the cloud, and/or can reside locally in a local computing environment (e.g., at a specified location(s)).

In addition to the processor 236 and/or memory 234 described above, the QERS system 231 can comprise one or more computer and/or machine readable, writable and/or executable components and/or instructions that, when executed by processor 236, can enable performance of one or more operations defined by such component(s) and/or instruction(s).

Turning now to the additional components of the QERS system 231 (e.g., the mapping component 232, scheduler component 238, measurement component 242, estimation component 246, weighting component 244, analysis component 247, and/or sampling component 248), generally, quantum circuits 250 received and/or obtained by the QERS system 231 can be analyzed, such as by one or both of the mapping component 232 and scheduler component 238. Based on information from the quantum system 201, the mapping component 232 can map a quantum circuit 250 to a physical qubit layout 252 of the quantum processor 206 (e.g., of one or more qubits of the quantum logic circuit 218). The scheduler component 238, based on additional information from the quantum system 201 and on the mapping information from the mapping component 232, can schedule execution of the quantum circuits 250 in a queue. The additional information from the quantum system 201 can comprise times for running iterations of quantum circuits, times for diagnostic checks, setup, calibration and/or maintenance, and/or the like.

This mapping can be enabled based on which one or more qubits 217 can be available for execution absent interruption by a TLS and/or other noise of the frequency space about the qubit frequency and/or about a shifted frequency to which the qubit will be moved during an execution of a quantum program (e.g., quantum circuit 250).

It also is noted that the processor 236 and/or another component of the QERS system 231 can enable one or more of the operations of the quantum system 201. For example, the processor 236, via transmission of one or more signals to the quantum system 201, can cause the one or more energy relaxation measurements, such as using a pulse generation by the shifting component 212. One or more of such instructions can be included in one or more scheduling and/or mapping instructions, such as provided by the respective scheduler component 238 and/or mapping component 232, provided to the quantum system 201.

Figure 3A:
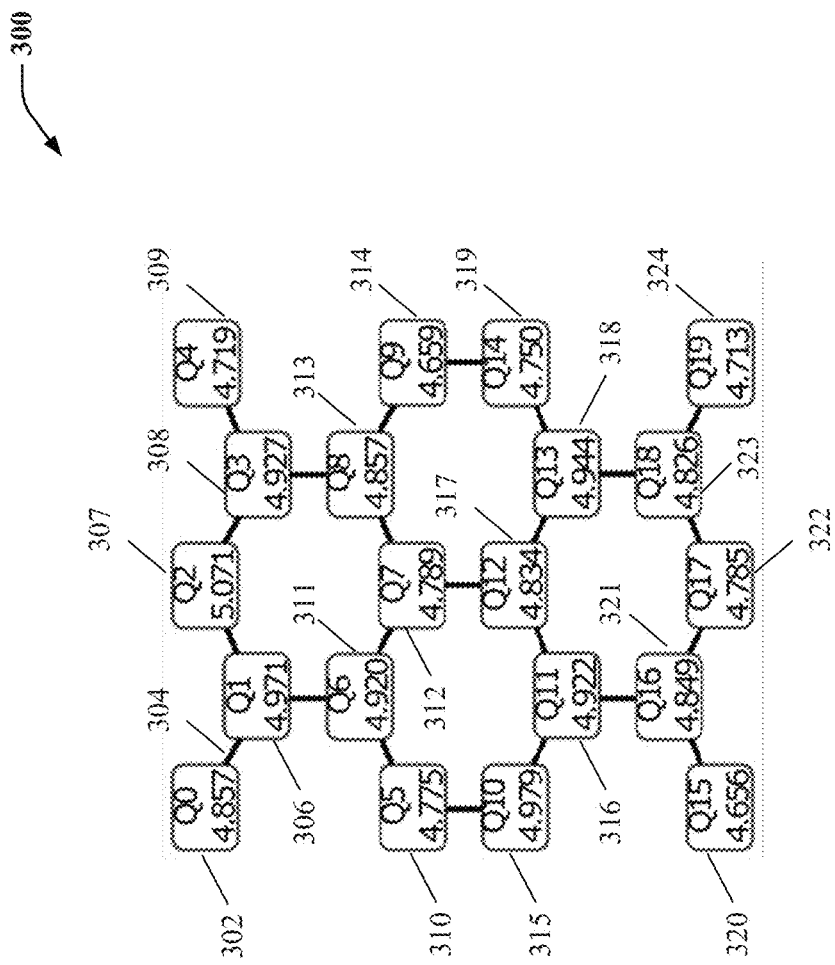
FIG. 3A illustrates an exemplary map of 20 qubit devices in accordance with one or more embodiments described herein.
Figure 3B:
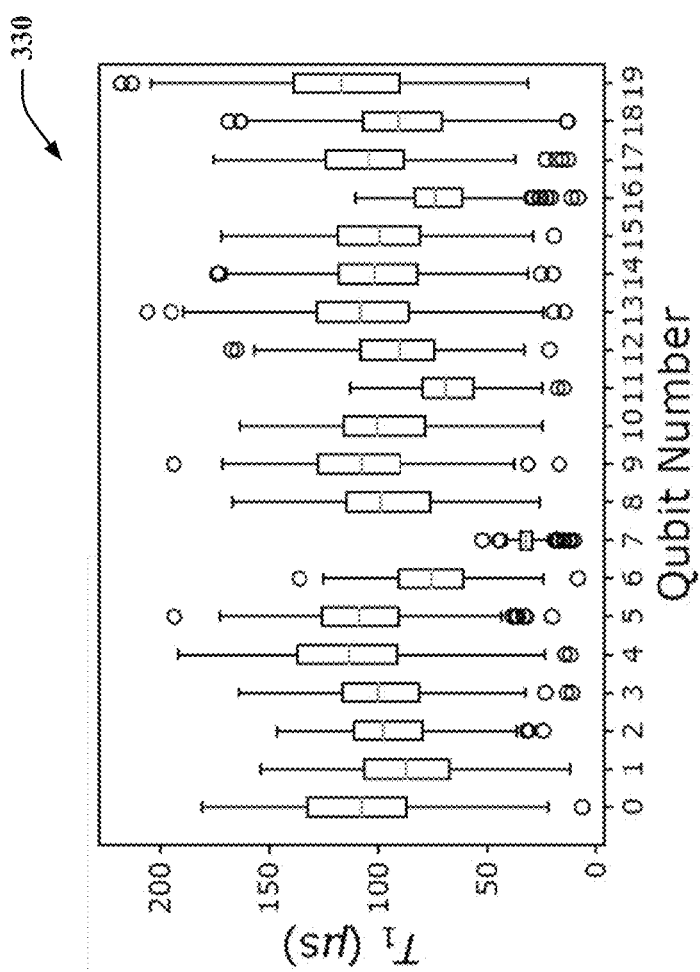
FIG. 3B illustrates a box and whisker plot of $T_1$ measurements in accordance with one or more embodiments described herein.

FIG. 3A illustrates an exemplary map 300 of 20 qubit devices in accordance with one or more embodiments described herein, and FIG. 3B illustrates a box and whisker plot 330 of $T_1$ measurements in accordance with one or more embodiments described herein. Repetitive description of like elements and/or processes employed in respective embodiments is omitted for sake of brevity.

The device and the spectroscopy technique used in one or more embodiments of this specification are discussed herein. The experiments reported in this specification were conducted on a 20 qubit processor based off single junction transmons and fixed couplings. FIG. 3A can illustrate a device topology of the 20 qubit processor, including the qubit number, two-qubit connectivity and the qubit frequency in (GHz). The qubit frequencies of the individual qubits can be around 5GHz. For example, qubit 302, illustrated as $Q_0$ in map 300, can have a frequency of 4.857 GHz and qubit 302 can be connected to qubit 306, illustrated as $Q_1$ in map 300, at 304. Qubits 307-324 have been illustrated as qubits $Q_2$-$Q_{19}$ in FIG. 3A. Qubits FIG. 3B illustrates box and whisker plot 330 of $T_1$'s measured daily, for the individual qubits of the 20 qubit processor illustrated in FIG. 3A, over approximately nine months. The boxes represent the first to third quartile, the vertical line indicates the median and the whiskers are drawn to the maximum or minimum values that fall within 1.5 times the interquartile range. All other points are outliers. Box and whisker plot 330 illustrates the characteristic spread of the qubit $T_1$s and their mean, from about 250 measurements over 9 months.

The 20 qubit device can be mounted to a base plate, wherein the base plate temperature of the dilution refrigerator can typically be about 13 millikelvin (mK) excepting several temperature excursions to about 1 K, which have been observed to not have any significant effects on the long time $T_1$ time series or distributions of $T_1$ values discussed later in this specification. Several qubits on the device can display mean $T_1$s exceeding 100 microseconds (μs). However, the large spread in individual qubit $T_1$s can highlight the challenge for rapid benchmarking of device coherence, since any single $T_1$ measurement can disagree substantially from its longtime mean.

Figure 4A:
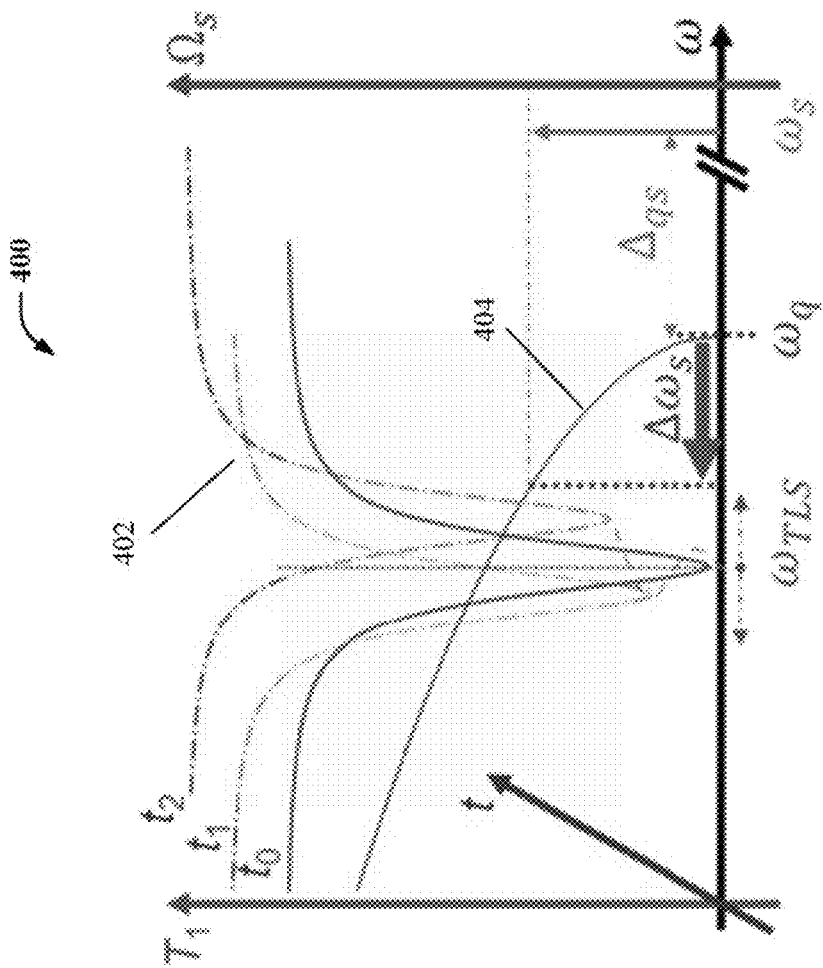
FIG. 4A illustrates a graph resulting from energy relaxation spectroscopy employing an Autler-Townes effect (AT effect) to shift a qubit frequency.

The spectral dynamics of these $T_1$ times can be studied by employing off-resonant microwave tones to induce an effective frequency shift $\Delta\omega_q$ in single junction transmons by the AC Stark effect. This can be employed for coherent state transfer between coupled qubits that are Stark shifted into resonance. Shifting the qubit frequency into resonance with a defect TLS can induce a faster relaxation time, which in turn can be used to detect the frequency location of the TLS, as depicted in FIG. 4A. The Stark shift can be described analytically by a Duffing oscillator model described by equation 6.

$$\Delta\omega_q = \frac{\delta_q \Omega_s^2}{2\Delta_{qs}(\delta_q + \Delta_{qs})}, \qquad \text{Equation 6}$$

where $\delta_q$ can represent the qubit anharmonicity, $\Omega_s$ can represent the drive amplitude and $\Delta_{qs}$ can represent the detuning between the qubit frequency and the Stark tone according to equation 7.

$$\Delta_{qs}=\omega_q-\omega_s \qquad \text{Equation 7}$$

Figure 4B:
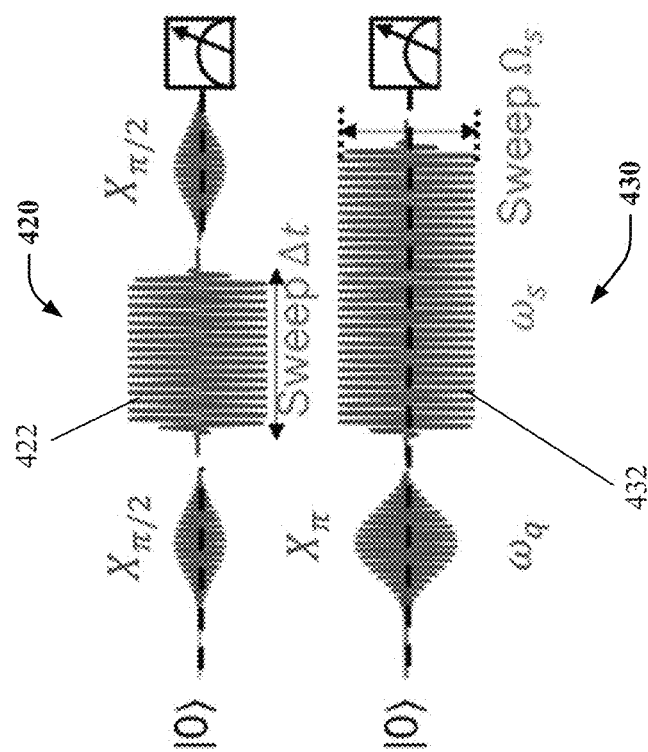
FIG. 4B illustrates a pair of pulse sequences that can be employed by the non-limiting system of FIG. 2, and particularly employing an AT tone, in accordance with one or more embodiments described herein.
Figure 4C:
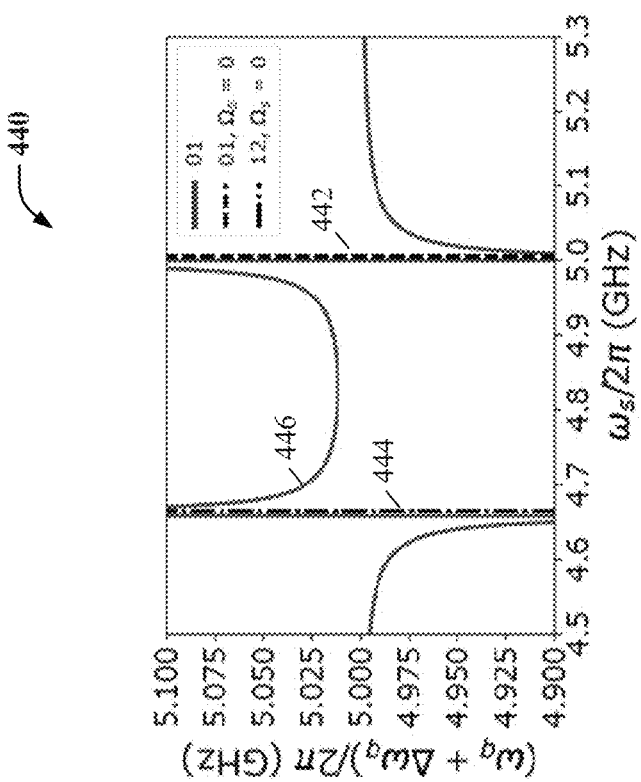
FIG. 4C illustrates a graph of qubit transition dependence on Stark tone for a constant drive amplitude in accordance with one or more embodiments described herein.
Figure 4D:
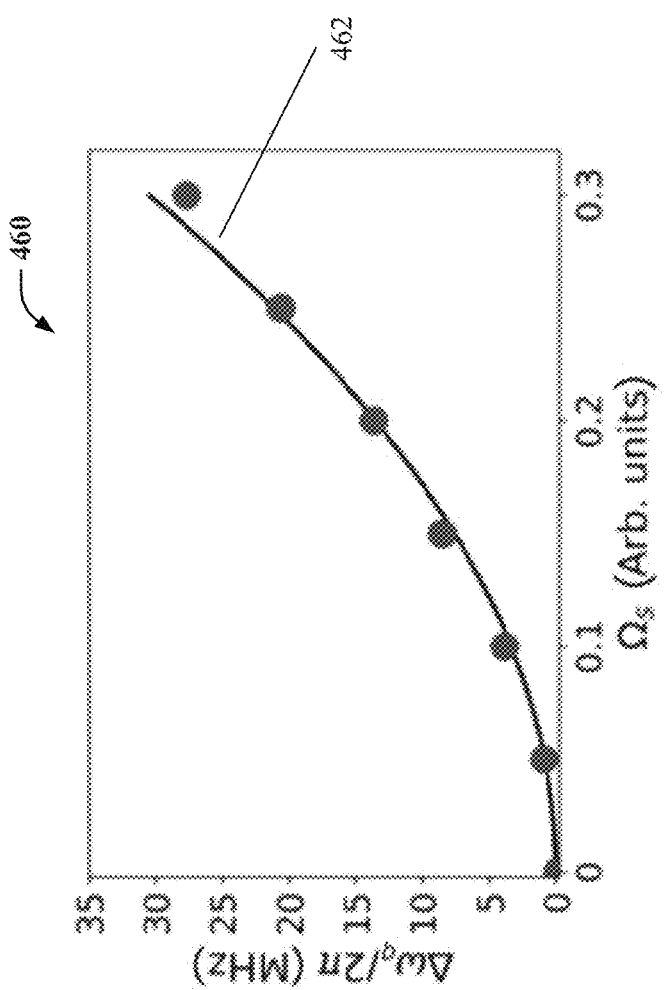
FIG. 4D illustrates a graph of measured Stark shift in accordance with one or more embodiments described herein.

As described by equation 6, the magnitude and sign of the Stark shift can be manipulated by the detuning and the drive amplitude of the Stark tone illustrated in FIG. 4D. Very large frequency shifts can be obtained by driving close to the transmon transitions, but this can typically lead to undesired excitations/leakage out the two-state manifold. Stark shifts of tens of MHz can be obtained with modest drive amplitudes and a fixed detuning $\Delta_{qs}$ of ±50 MHz. The frequency shifts can be experimentally measured using a modified Ramsey sequence, schematically shown in FIG. 4B, and display good agreement with the quadratic dependence of the perturbative model in the low-drive limit. A representative case can be illustrated in FIG. 4D.

Figure 5:
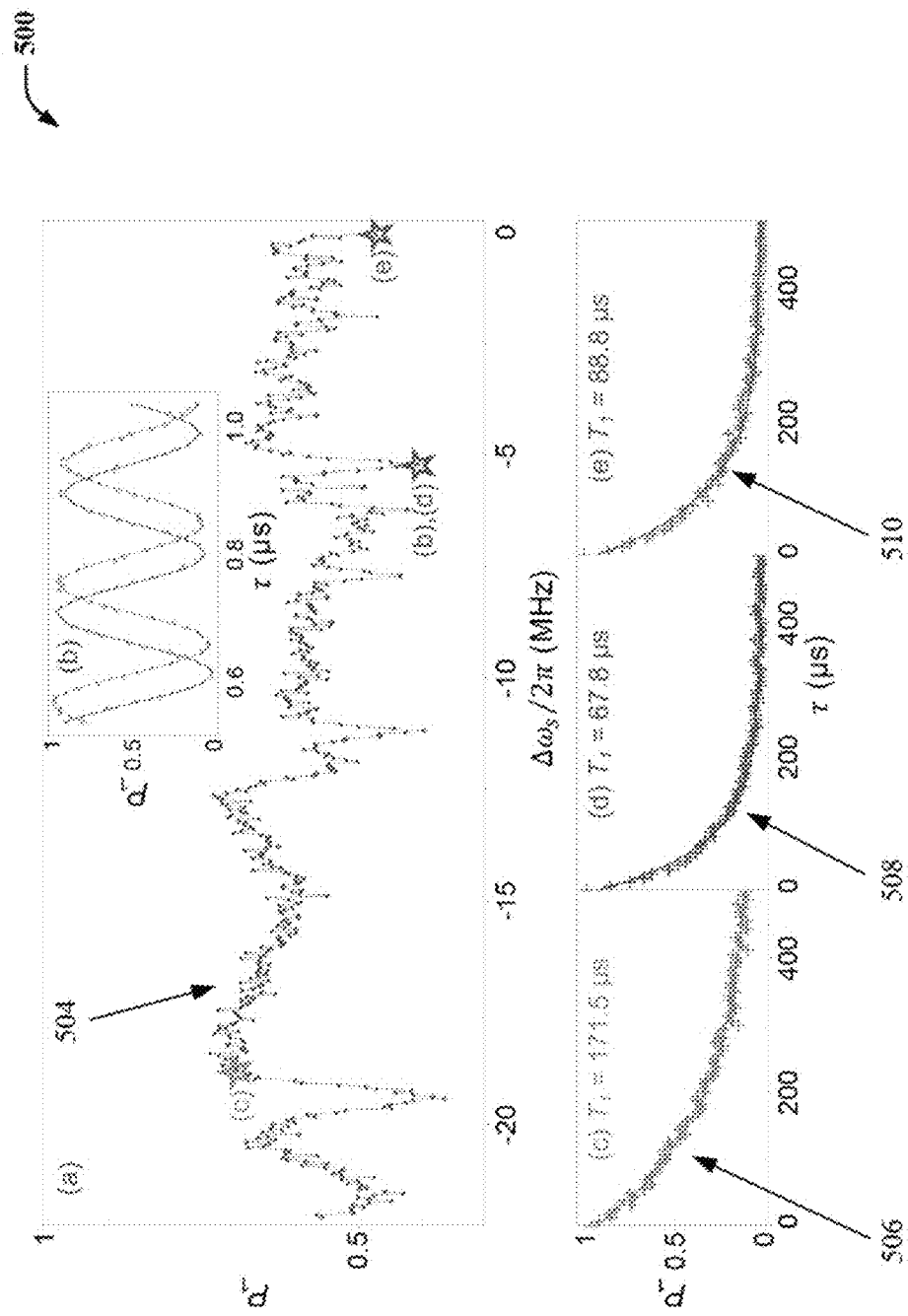
FIG. 5 illustrates a set of graphs demonstrating outcomes of employment of energy relaxation spectroscopy by the non-limiting system of FIG. 2, via employment of an AT tone to shift qubit frequencies, in accordance with one or more embodiments described herein.

Turning now to FIGS. 4A to 5, as indicated above, to get the $T_1$ measurements in the first instance that can then result in the aforedescribed estimated energy relaxation times of a qubit, initial diagnostics can be performed. These initial diagnostics employ at least the quantum system 201, and are based on use of the AT effect, flux bias, DC electric field and/or mechanical strain to shift a frequency of a qubit, thereby allowing the qubit with shifted frequency to be employed as a probe of the frequency space about the qubit.

Generally, the operations can comprise determining qubit shifted frequencies, based on the known shifted frequencies determining probabilities $P_1$ of a qubit being at a particular state at a particular time, based on the probabilities $P_1$ determining one or more $T_1$ (energy relaxation) times of a qubit from different shifted frequencies, and/or facilitating postulation of presence of one or more TLSs and/or TLS transitions/fluctuations.

One particular set of diagnostic processes can employ the AT effect, and thus employ off-resonant AT microwave tones to induce an effective frequency shift $\Delta\omega_q$, to thereby analyze the spectral dynamics of $T_1$ times of one or more of the qubits (e.g., qubits 217 of FIG. 2).

FIG. 4A illustrates a graph 400 resulting from energy relaxation spectroscopy employing an Autler-Townes effect (AT effect) to shift a qubit frequency, in accordance with one or more embodiments described herein. Such energy relaxation spectroscopy, employing an AT tone can be employed to understand the frequency space of a fixed frequency qubit, absent use of flux tuning, to rapidly determine $T_1$ relaxation times at different shifted frequencies of the qubit, without the need to separately measure (e.g., including waiting for the excited qubit to again reach ground state) at each different shifted frequency.

The frequency space of a single qubit is illustrated relative to being acted upon by an AT tone. The plots 402 of graph 400 illustrate $T_1$ relaxation times of a qubit vs. qubit frequency $\omega_q$. The plot 404 illustrates that in the presence of an AT tone at frequency $\omega_s$ and drive amplitude (vertical) $\Omega_s$, the frequency $\omega_q$ of the qubit follows the plot 404 and changes by an amount $\Delta\omega_q$. It is noted that TLSs decrease the $T_1$ relaxation time when on resonance with the qubit frequency $\omega_q$, as shown by the dips at the plots 402. Because frequencies of TLSs, $\omega_{TLS}$, fluctuate in time, the position of a TLS (generally alluded to by dips in $T_1$) can vary over time, and thus may or may not affect qubit coherence depending on the time and/or the qubit frequency shift employed.

That is, a temporary (non-continuous) AT tone can be applied to an excited qubit with an amount of additional power/amplitude $\omega_q$ to temporarily shift the frequency of the qubit according to how much power/amplitude $\Omega_S$ is applied. The qubit frequency can be tuned by an amount $\Delta\omega_q$ by an off-resonant tone placed $|\Delta_{qs}|$ above the qubit frequency $\omega_q$. The shift is generally quadratic, in view of the AT tone. Use of the AT tone can allow for moving the qubit frequency through the frequency space about the qubit and ideally into resonance with a TLS. In this manner, frequency space about the qubit frequency can be probed using the qubit, to detect, after one or more computations using the results of measurements of the qubit, where a coherence time of the qubit may be low and/or where a TLS can be at a particular instant. Indeed, generally, a neighborhood of the unperturbed state of the qubit can be mapped.

Indeed, without the application of flux bias and inclusion and modification due to multi-junctions, the neighborhood can more easily be obtained. It is noted, however, that the diagnostic processes described herein also can function for use with multi-junction qubits.

It also is noted that a diagnostic process could be employed in an embodiment where a continuous AT tone is applied to a qubit. That is the qubit would be continuously shifted, not just temporarily. In such case, the qubit and/or quantum circuit can be recalibrated in that typical quantum circuits are generally based on non-constantly shifted qubits.

Turning next to FIG. 4B, a pair of pulse sequences are illustrated at 420 and 430 that can be applied to a qubit 217, such as by the shifting component 212, such as via control by the quantum processor 206 and/or quantum operation component 216.

FIG. 4B illustrates a pair of pulse sequences that can be employed by the non-limiting system of FIG. 2, and particularly employing an AT tone, in accordance with one or more embodiments described herein. FIG. 4B illustrates a schematic of a Ramsey pulse sequence used to calibrate $\Delta\omega_q$ as a function of $\Omega_s$ (pulse sequence 420); and a schematic pulse sequence for the relaxation time spectroscopy (pulse sequence 430). For each $\Omega_s$ (i.e., $\Delta\omega_q$), the |1⟩ occupation can be measured at a fixed time (i.e., $\tau$=50 µs in this work).

The T pulse sequence 420 can represent a Ramsey experiment employing an AT tone. The pulse sequence 420 can comprise a first pulse X, such as a $\pi/2$ pulse, that can be applied to the particular qubit. This first pulse X can put the qubit on its equator. After emission of the first pulse X, an AT tone 422 can be applied, also by the shifting component 212, to the qubit to thereby shift the resonating frequency of the qubit. The AT tone 422 is applied with fixed power $\Omega_s$ and sweeping of the label $\Delta t$ in FIG. 4B (also referred to herein as delay times or $\tau$). Generally, thereafter cessation of the second pulse (e.g., the AT tone 422), a measurement can be taken, such as by the readout component 214 of the qubit. More particularly, a third pulse X can be applied to the qubit, such as another $\pi/2$ pulse. The readout component 214, such as via a measurement pulse, waveform or other signal applied to the qubit by the shifting component 212, can take a measurement and thereafter determine the shift of the qubit frequency. The Ramsey fringe can be fit to a sine function. The change in frequency (from no AT tone applied) can indicate a change due to the AT tone. For example, the fit of the resulting Ramsey fringes can correspond to the frequency shift. This resulting frequency shift can be employed in subsequent diagnostics, to be described relative to additional Figures, as a known shift caused by a particular AT tone 422.

The pulse sequence 430 represents pulses employed for $T_1$ relaxation spectroscopy with an AT tone. As shown, a first pulse at $\pi$ can be emitted by the shifting component 212 to the qubit. This first pulse can excite the qubit to a first state |1>. A second pulse 432, being an AT tone at a fixed frequency ws can be temporarily emitted by the shifting component 212, to the qubit. This AT tone can be swept over varying power/amplitudes $\Omega_S$, to result in decay at a different qubit frequency (e.g., shifted qubit frequency) $\omega_q$ of the qubit. That is, by applying the AT tone to the excited qubit, the qubit's frequency can be shifted. A sweep of $\omega_q$ can thus correspond to measurements of decay at different qubit frequencies. The resultant measurement information of the qubit at the different qubit frequencies, such as attained and measured by the readout component 214, can be employed to determine probabilities $P_1$ of the qubit to be at a particular state, such as the |1> state at a particular time while at a single time interval, and further to determine a plurality of $T_1$ times at the different shifted frequencies. This can be completed absent when actually evaluating the qubit at each of those shifted frequencies for the full relaxation time in order to thus attain the relaxation times $T_1$. Indeed, the sequence 430 at FIG. 4B, and/or a sequence similar thereto, can be run repeatedly, such as in uniform and/or non-uniform increments. Over a period of time, where the sequence 430 has been additionally run for the same particular qubit, predictions can be calculated.

FIG. 4C illustrates a graph 440 of qubit transition dependence on Stark tone for a constant drive amplitude in accordance with one or more embodiments described herein. FIG. 4D illustrates a graph 460 of measured Stark shift in accordance with one or more embodiments described herein.

FIG. 4C illustrates, for an arbitrary case, calculated qubit frequency dependence on $\Delta_{qs}$ for a fixed $\Omega_s$. Graph 440 can comprise plot 446. Plot 446 illustrates a case of a 01 qubit transition dependence on $\omega_s$ for constant $\Omega_s$. The 01 qubit frequency, $\omega_q+\Delta\omega_q$, uses an unperturbed frequency of $\omega_q$=5.0 GHz and an anharmonicity of $\delta_q$=−340 MHz. The locations of the unperturbed transitions 01 and 12 are shown as vertical dotted lines 442 and 444 (and indicated in the legend in FIG. 4C), respectively, and overlaid with 5 MHz offsets to make their locations more visible on the figure. Negative and positive qubit shifts can be produced and large shifts can be induced depending on $\Delta_{qs}$.

FIG. 4D illustrates graph 460 depicting measured $\Delta\omega_q$ as a function of normalized distance amplitude curve (DAC) amplitude, $\Omega_s$ using the AC Stark shifted Ramsey technique. Plot 462 (solid line) can represent a quadratic fit functionally consistent with a perturbative model.

FIG. 5 illustrates a set of graphs 500 demonstrating outcomes of employment of energy relaxation spectroscopy by the non-limiting system of FIG. 2, via employment of an AT tone to shift qubit frequencies, in accordance with one or more embodiments described herein.

Graph (a) of the set of graphs 500 illustrates measured probability of a qubit being in the |1⟩ state, $P_1$, at 50 µs wait time with varying $\Delta\omega_q$ and tone detuned 50 MHz above $\omega_q/2\pi$ for qubit $Q_{19}$. Inset graph (b) of set 500 illustrates an example of Ramsey measurements used to extract frequency shifts $\Delta\omega_q/2\pi$ from pulse amplitudes. The two curves result from starting the Ramsey oscillations with a $X_{\pi/2}$ or $Y_{\pi/2}$. Graphs (c) and (d) of set 500 are $T_1$ measurement with Stark shifts $\Delta\omega_q/2\pi$=−18.9 and −5.3 MHz, respectively. Graph (c) of set 500 illustrates $T_1$ measurement with no Stark shift (i.e., no Stark tone).

An explanation follows regarding how a single point on the curve of exponential decay of a qubit state, such as of the |1> state, being a $P_1$ value, can be employed as a proxy for $T_1$ at varying shifted qubit frequencies $\omega_q$. As used herein, $P_1$ can represent the probability of finding the qubit in the |1>, or another state, at a particular qubit frequency $\omega_q$ at a given time interval. This probability $P_1$ can be employed to determine the probability of how high the coherence is for that qubit.

For example, exponential decay of the |1> state can be assumed, with a delay time (e.g., about 50 µs), can be employed after the |1> state is formed, and $T_1$ can be equal to $-\tau/\ln(P_1)$. That is, there can be a $P_1$ for every shifted qubit frequency and every time point at which P is measured. $P_1$ can be a function, such as $P_1(\Delta\omega_t)$. A $T_1$ for each shifted frequency can be estimated from each $P_1$, such as employing equation 8 (or equation 2).

$$T_1(\Delta\omega) = -\frac{\tau}{\ln(P_1(\Delta\omega))}, \quad \text{Equation 8}$$

where $\Delta\omega$ is the frequency shift and $\tau$ is the fixed time delay.

That is, instead of measuring the entire $T_1$ decay at any particular shifted qubit frequency, the excited state probability $P_1$ is employed, after a fixed delay time as a measure of $T_1$. This method can speed up spectral scans as compared to measuring the entire $T_1$ decay at any particular shifted qubit frequency.

Further, the spectral scans (e.g., diagnostic processes) can be repeated, such as at a repetition rate of 1 kHz. That is, additional averaging can improve the result of the estimator in Equation 10, where the repeated scans correspond to the first sum of Equation 10. One or more reset techniques can be employed to further speed up the repetition rate, thus allowing for probing faster TLS dynamics. In one embodiments, for an effective frequency sweep, an amplitude sweep with off-resonant pulses at fixed detuning (e.g., about +/−50 MHz) and duration (delay time of about 50 μs) can be employed as the second pulse, after exciting the qubit with one or more first pulses (which can be the same or different from one another), for example, pulse sequence 430 at FIG. 4B. Such pulsed AT sequence 430 can enable faster spectroscopy by circumventing re-calibration of the π and π/2 pulses at each frequency. The off-resonant pulses have Gaussian-square envelopes with a 2σ rise-fall profile, where σ=10 ns. This pulse sequence can be illustrated at FIG. 4B. The amplitude points in the sweep can be related to particular AT shifts by use of a Ramsey sequence (e.g., pulse sequence 420 of FIG. 4B) performed before or after the aforementioned spectral scans. Based on these diagnostic processes, $P_1$ values can be attained.

That is, at plot 504, plotted are $P_1$ values against change in AT tone frequency $\Delta\omega_s/2\pi$ in megahertz (MHz). Plot 504 is representative of a single delay time of about 50 μs, with measurements taken at different frequencies of the qubit to get each $P_1$ value on the plot 504. For example, illustrated is probability $P_1$ of qubit measurement resulting in |1> state (such as over 1000 averages) for an AT tone detuned 50 MHz above the qubit 01 frequency, using the pulse sequence 430 of FIG. 4B, wherein 01 can represent the transition between the |0> and |1> states of the qubit. To speed up measurements, $P_1$ can be used as a proxy for $T_1$ at a fixed delay time of 50 μs. Generally, delay time can be selected to have high contrast between $P_1$ of about 1 (e.g., delay time of about 0) and $P_1$ of about 0 (e.g., delay time>>$T_1$). For example, a delay time of about 0.5 $T_1$ can provide a reasonable contrast. The X values (values on the x-axis of the figure) can be calibrated from $\Omega_q$ drive amplitude to $\omega_q$ qubit frequency using the Ramsey experiment pulse sequence 420 of FIG. 4B (e.g., using a Ramsey fringe measurement of qubit frequency as known to one having ordinary skill in the art). Additional X values (values on the x-axis of the figure) can be scaled by the quadratic expression of Equation 6, wherein $\delta_q$ is the anharmonicity of the qubit given by f12-f01. Put another way, in the X-axis are shifted frequencies of the qubit, measured from a Ramsey experiment, calibrated using the qubit frequency shift value for every desired value of power of $\Omega_S$.

As illustrated, the plot 504 comprises a plurality of peaks and valleys. A dip can be representative of a likely TLS.

Furthermore, relative to single points of $P_1$ on the plot 504, a $T_1$ experiment can be executed, by fixing the frequency shift instead of power, and varying the amount of power, and can map a full decay curve for each of those points, as shown at plots 506, 508 and 510. The $T_1$ experiment can comprise measuring $P_1$ for different delay times. This can produce an exponential decay. For example, plots 506, 508, 510 illustrate $T_1$ decay curves from which a $T_1$ can be extracted (rather than estimating from a single $P_1$ at a single delay time).

Accordingly, by being able to shift the frequency of the qubit while observing the relaxation at the new shifted frequencies, by employing the pulse sequence 430, one can determine where qubit coherence will be worse (dips at plot 504) or better, and without direct observance of decay at each of the shifted qubit frequencies.

Thus, spectrally resolved $T_1$ measurements in FIG. 5 can be used as a probe of defect TLS transition frequencies. FIG. 5 can illustrate representative data of such a sweep on qubit $Q_{19}$ (qubit 324 of FIG. 3A) with distinctive dips in $P_1$ that can be attributed to strongly coupled TLS at their transition frequencies. $T_1$ measurements at Stark tone amplitudes corresponding to high/low $P_1$ points, as seen in the bottom panel of FIG. 5, can explicitly show the substantial variation in $T_1$ as a function of frequency and the consistent tracking of $T_1$ with $P_1$.

Variations in $P_1$ can potentially be caused by sources other than TLS. In one or more embodiments, $P_1$ can be spectrally resolved to about +/−25MHz around the individual qubit frequencies. The narrow frequency range combined with measuring non-neighbor sets of qubits simultaneously can avoid strong $P_1$ suppression from resonances with neighboring qubits, with the coupling bus, or with common low-Q parasitic microwave modes. Control experiments can show that time insensitive features in the $P_1$ fingerprint can be robust to choice of the Stark tone detuning, ruling out a power dependence for the power range used in this work. While broadband $T_1$ scatter can be modeled as arising from quasi-particle fluctuations, it does not sufficiently explain sharp frequency dependent $P_1$ features depicted, for example, in FIG. 5. Recent experiments on qubits can suggest a quasi-particle limit to $T_1$ that exceeds several milliseconds.

The following description(s) refer(s) to a single set of operations relative to a single qubit. However, employment of the operations of a classical system (e.g., QERS system 231) can be enabled, where suitable for one or more qubits at a time of a quantum system. For example, measurements can be taken, and estimations performed relative to one or more qubits at a time and/or relative to one or more time-ranges for one or more qubits at a time.

Figure 6:
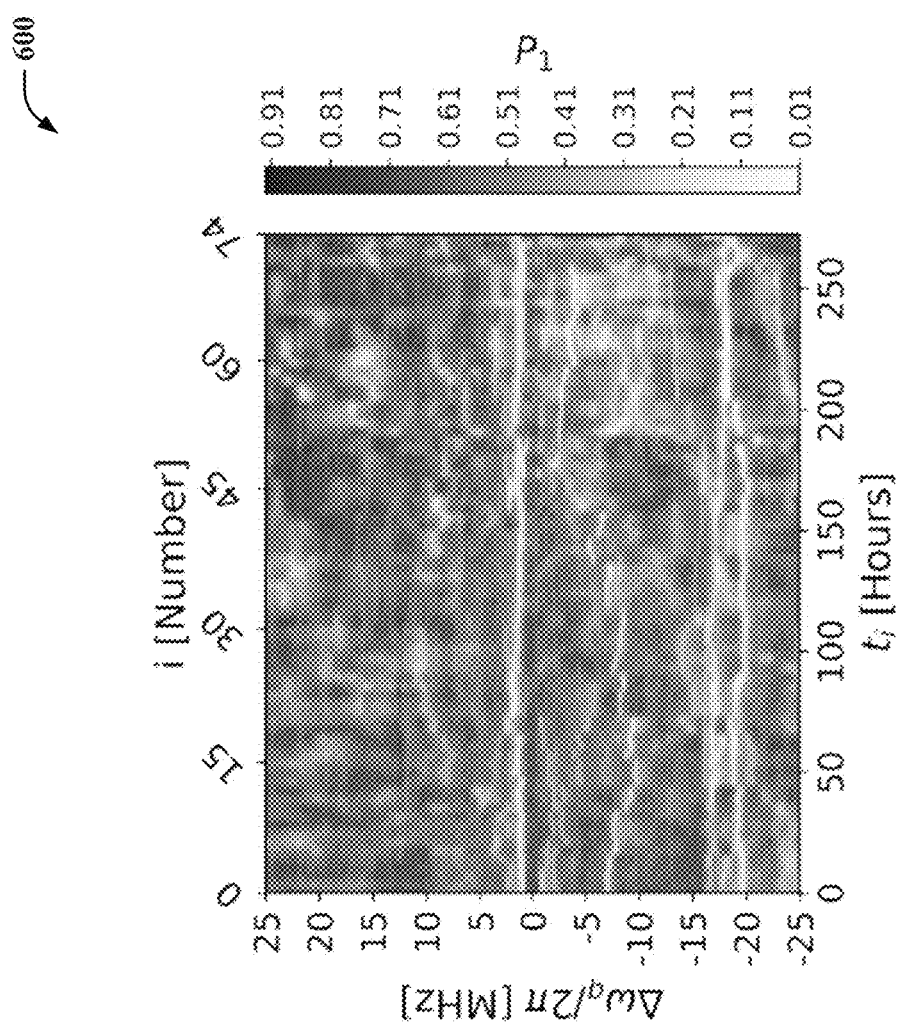
FIG. 6 illustrates a plot of a $P_1$ probability landscape of a single qubit, the plot comprising a range of applied Autler-Townes tones of varying frequency and fixed power/amplitude graphed against time, in accordance with one or more embodiments described herein.
Figure 7:
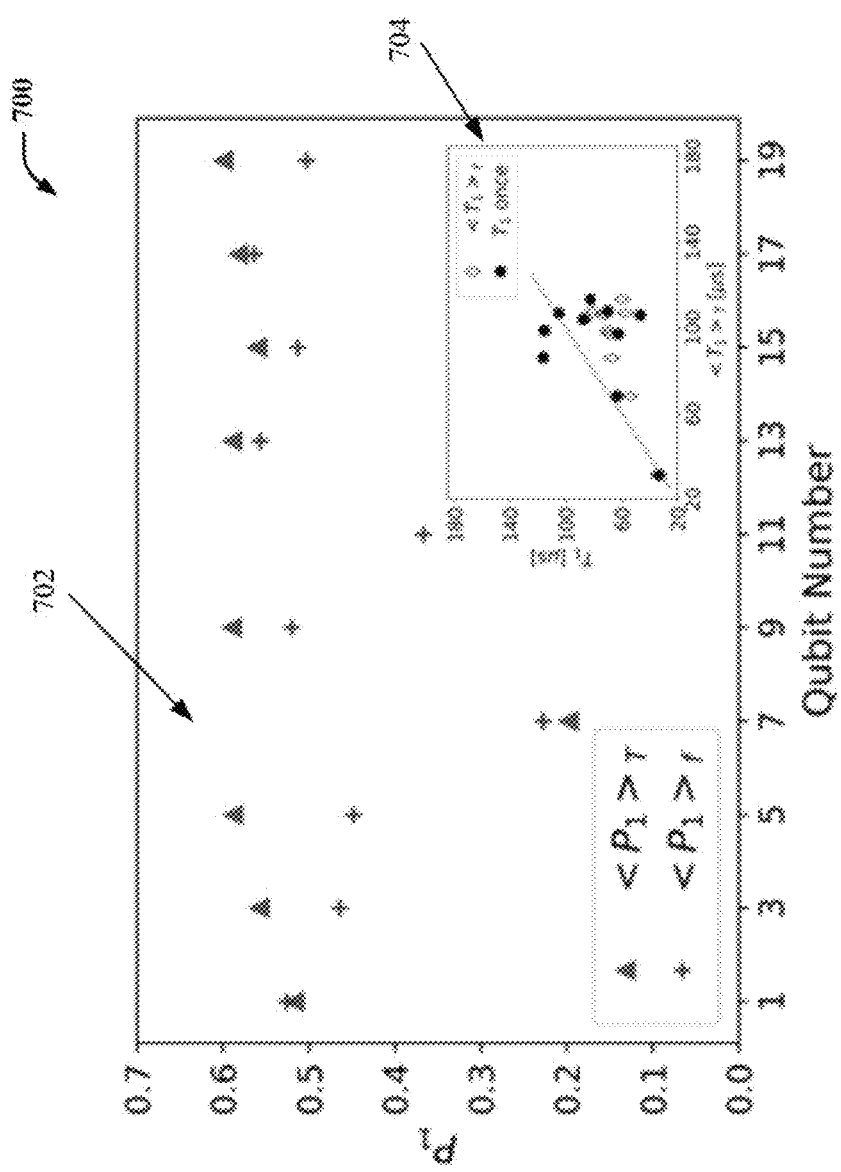
FIG. 7 illustrates a graph of proof of concept of conventionally acquired $T_1$ and $P_1$ values graphed against $<T_1>$ ($T_1$ averages) and $<P_1>$ ($P_1$ average) of various qubits of a qubit device, in accordance with one or more embodiments described herein.

Turning now to FIGS. 6 and 7, one or more operations that can be executed and enabled by the QERS system 231 of the non-limiting system 200 will be described. The operations can comprise determining one or more energy relaxation measurements at the qubit frequency for a qubit, determining one or more energy relaxation measurements at a plurality of shifted frequencies for the qubit, estimating an average energy relaxation time of the qubit based on the plurality of energy relaxation measurements, and/or applying weights to one or more of the energy relaxation measurements.

FIG. 6 illustrates a plot 600 of a $P_1$ probability landscape of a single qubit, the plot comprising a range of applied Autler-Townes tones of varying frequency and fixed power/amplitude graphed against time, in accordance with one or more embodiments described herein.

TLS dynamics and correlations between $P_1(\omega, t)$ and $\langle T_1 \rangle_T$ for one or more embodiments of this specification are discussed herein. Representative plot 600 illustrates repeat line traces of repeated spectral scans, taken approximately once every 3-4 hours, extended over hundreds of hours for a particular qubit. A representative example of the cumulative scans can be shown in FIG. 6 for qubit $Q_{15}$ (qubit 320 of FIG. 3A). Thus, FIG. 6 illustrates time dependence of the energy relaxation spectroscopy for qubit $Q_{15}$ using $\Delta\omega_s=\pm50$ MHz and varying $\Omega_s$ over 501 different j amplitude points, $\Omega_{s,j}$, to sweep $\Delta\omega_q(\Omega_{s,j})$ in a positive or negative direction (equation 6). The $P_1$ can be measured at 50 μs.

Spectroscopy of the other qubits is shown in the supplemental information, Appendix A. The TLS dynamics around the qubit frequency can be qualitatively similar to TLS spectroscopy using flux or stress tunable devices. Relative to FIG. 2, the measurement component 242 can generate the plot 600, for example, from a plurality of $T_1$ measurements from a plurality of the spectral scans. Again, the $T_1$ measurements can be gained based on any suitable qubit frequency shifting method, as described in one or more embodiments herein.

At plot 600, the spectral representation was obtained using a qubit frequency shifting method based on an Autler-Townes (AT) tone to shift the qubit. Particularly, a single decay probability at about τ=50 μs was used as a proxy for $T_1$. An estimator of single $T_1$ measurements can be made from the single $P_1$ value, assuming an exponential decay, such as by the measurement component 242. For example, the measurement component 242 can employ Equation 9.

$$T_1 = \frac{-\tau}{\ln(P_1)}. \quad \text{Equation 9}$$

A plurality of the single $P_1$ measurements can then be plotted together, such as at the plot 600, such as by the measurement component 242, which can be converted to estimated $T_1$s with Equation 9. As indicated above, flux tunable measurements of $T_1$ (Δω) can also be employed, among other options. Note that Δω is referred to as $\Delta\omega_q$.

As shown, the y-axis illustrates frequency space relative to one qubit, and the x-axis represents time, with increments of about 50 hours being marked. $P_1$ is shown as a shaded scale on the right side of plot 600. The plot 600 exhibits prominent dips around positive 1 MHz, negative 5-10 MHz, and negative 15-20 MHz. The spectral diffusion of the positions of the $T_1$ dips can vary between an order of about 1 MHz to about 10 MHz over the 272 hours of measurement providing a qualitative measure of linewidths. A more quantitative discussion of linewidths can be found in appendix I. In plot 600, the background comprises an ensemble of smaller dips of relaxation, that also dynamically evolve with features that are larger than the sampling noise in the measurement.

That is, as shown, a situation of fluctuating $P_1$'s (e.g., fluctuating frequency space noise) can result in an inability to utilize the respective qubit while the situation persists, otherwise possibly resulting in failure of execution of a quantum circuit employing the particular respective qubit. That is, the illustrated detection can allow for assessment of the root cause and adjust queue closures for customers employing a qubit device.

From one or more quantum measurements 240 (e.g., from the readout component 214), from the representative plot, and/or based on the data from which the plot is generated, the measurement component 242 (or sampling component 248) can attain, measure and/or determine one or more energy relaxation measurements at the qubit frequency for a qubit and at a plurality of shifted frequencies for the qubit. The number (e.g., plurality) of energy relaxation measurements at the shifted frequencies can be selected based on view of the plot 600, based on historical data, and/or the like. In one or more embodiments, data from both positive and negative shifts relative to the qubit frequency can be employed. In one or more embodiments the range can be asymmetrical about the qubit frequency (e.g., greater positive or negative range than the other of positive or negative range).

Based on these measurements attained by the measurement component 242, the $\langle T_1 \rangle_{\delta\omega}$ estimator can be generated by the estimation component 246. As alluded to above, the estimator $\langle T_1 \rangle_{\delta\omega}$ has been discovered by the inventors to be a faster estimator of unattainable $\langle T_1 \rangle$ (average $T_1$) than existing techniques for obtaining an estimator of average $T_1$ (denoted herein as $\langle T_1 \rangle$). The estimator described herein, $\langle T_1 \rangle_{\delta\omega}$, is an estimator for $\langle T_1 \rangle$ that can be obtained more quickly than the long time averaging necessary to obtain $\langle T_1 \rangle_{At}$. Indeed, the estimator described herein, $\langle T_1 \rangle_{\delta\omega}$, can instead comprise averaging by taking $T_1$ measurements at multiple offset frequencies, Δω, from the qubit frequency, $\omega_q$, of a qubit, q (ω are expressed typically in Rad/s whereas f=ω/(2π) are expressed in Hz). As used herein, "i" can represent an index for Z different frequencies, where Z can represent the number of different frequencies measured.

The $\langle T_1 \rangle_{\delta\omega}$ estimator can be formed based on Equation 10 with parameters defined here in this list: $\omega_q$ is qubit frequency, $\omega_j$ is the $j^{th}$ qubit frequency shift, $\delta\omega_j$ is the frequency bin size at the $j^{th}$ frequency shifted location, δω is span of qubit frequency shift, n is the number of spectroscopy time slices, ti is a time slice for the spectroscopy, t is the decay time at which $P_1$ was evaluated, $P_1(\omega_q+\omega_j, \tau, t_i)$ is the probability of |1> at τ for time stamp $t_i$ and a frequency shift of $\omega_j$.

$$\langle T_1 \rangle_{\delta\omega} = \frac{1}{n}\sum_{i=1}^{n}\frac{1}{2\delta\omega}\sum_{j=-\delta\omega_-}^{\delta\omega_+} T_1(\omega_q+\omega_j, \tau, t_i)\delta\omega_j \quad \text{Equation 10}$$

The $\langle T_1 \rangle_{\delta\omega}$ estimator of Equation 10 (or equation 3) can be obtained, being the estimation of an average energy relaxation time of the qubit based on the plurality of all the "j" energy relaxation measurements. One may obtain $T_1(\omega_q+\omega_j, \tau)$ by converting $P_1(\omega_q+\omega_j, \tau)$ to a $T_1$ using Equation 11 or by any other means of estimating $T_1$ (e.g., $P_1$ estimates at different delay times to reconstruct an exponential decay instead of relying on one delay time).

$$T_1(\omega_q+\omega_j, \tau, t) = \frac{-\tau}{\ln(P_1(\omega_q+\omega_j, \tau, t))}, \quad \text{Equation 11}$$

where τ is the fixed time delay and t is a time stamp such as $t_i$.

As illustrated at Equation 10, a uniform weighting has been applied to the plurality of energy relaxation measurements (e.g., at the qubit frequency and at frequencies shifted from the qubit frequency), such as by the weighting component 244. Other weightings can be applied at each $\omega_j$ in one or more other embodiments (e.g., $\alpha_j\delta\omega_j$ instead of $\delta\omega_j$ in Equation 10, where $\delta\alpha_j$ is a more optimized weighting function).

Referring next to FIG. 7, one general proof of concept is illustrated by comparing average $P_1$s from energy relaxation spectroscopy to the $\langle P_1 \rangle$, for which the best estimate of $\langle P_1 \rangle$ can be obtained from $\langle T_1 \rangle_{At}$ using Equation 9 (in reverse) resulting in $\langle P_1 \rangle_{At}$. The estimator can represent the uniform average of $P_1$ ($\omega_q+\omega_j$, τ) over all "j"s producing $\langle P_1 \rangle_{\omega, t}$. This can be made to correlate with the equivalent best estimator available of $\langle P_1 \rangle_{At}$.

FIG. 7 illustrates a graph of proof of concept of conventionally acquired $T_1$ and $P_1$ values graphed against $\langle T_1 \rangle$ ($T_1$ averages) and <P₁> (P₁ average) of various qubits of a qubit device, in accordance with one or more embodiments described herein. At the plot 702, the estimator <P₁>_{Δt} is attained after averaging for about 9 months. That is, <P₁>_{ω,τ}, listed as <P₁>_f in the figure, can be compared to <P₁>_{Δt}, listed as <P₁>_T in the figure.

As discussed in one or more embodiments herein, $T_1$ fluctuations can introduce uncertainty in the coherence benchmarking, stability of multi-qubit circuit performance and process optimization of superconducting qubit devices. In the context of a better estimator, the long time averages (e.g., for T equal to about 9 months) $\langle T_1 \rangle_T$ and $\langle P_1 \rangle_T$ can be examined to determine if they can be correlated with the frequency neighborhood of the qubit $\langle T_1 \rangle_{\omega,t}$ and $\langle P_1 \rangle_{\omega,t}$, respectively. The averaged relaxation probabilities and $T_1$s can be defined by the following equations 12-14 and equation 3, where definitions of variables can be found in table 1.

$$\langle P_1 \rangle_T = \frac{1}{N} \sum_{i=1}^{N} P_1(\omega_q, \tau, T_i) \qquad \text{Equation 12}$$

$$\langle T_1 \rangle_T = \frac{1}{N} \sum_{i=1}^{N} T_1(\omega_q, T_i) \qquad \text{Equation 13}$$

$$\langle P_1 \rangle_{\omega,t} = \frac{1}{n} \sum_{i=1}^{n} \frac{1}{2\Delta\omega} \sum_{\omega_j=-\Delta\omega}^{\Delta\omega} P_1(\omega_q + \omega_j, \tau, t_i) d\omega_j \qquad \text{Equation 14}$$

$\langle P_1 \rangle_{\omega,t}$ can be compared to $\langle P_1 \rangle_T$ from the daily $T_1$ measurements, over a $T_{max}$ of about 9 months, evaluated at τ=53 μs, shown in FIG. 3B. The $\langle P_1 \rangle_{\omega,t}$ can be calculated for a $T_1$ delay time of τ=50 μs for 10 qubits in the device for the first time slice and a cutoff frequency Δω/2π=5 MHz. As illustrated in graph 700 at FIG. 7, a qualitatively close agreement for the 10 qubits can be observed.

A $\langle T_1 \rangle_{\omega,t}$ can also be estimated for each $\langle P_1 \rangle_{\omega,t}$ (i.e. for each qubit) at τ=50 μs by assuming an exponential decay, using equation 10. The approximate equivalence of $\langle T_1 \rangle_{\omega,t}$, listed as <T₁>_f in the figure, and $\langle T_1 \rangle_T$, (a 9 month average), can be seen in the scatter plot 704 inset in graph 700 of FIG. 7. A near 1:1 relationship can be observed when this approach is applied more broadly across many other devices (Appendix K). Furthermore, the poorer correlation between $\langle T_1 \rangle_T$ and a single instance of $T_1$ measurements, is also illustrated by a larger scatter, as seen in FIG. 7 inset. That is, $T_1(\omega_q)$, a $T_1$ measurement at a single time stamp, and at the qubit frequency for each qubit in the device, is also shown for reference, in 704, listed as 'T₁ once'. The $T_1(\omega_q)$ measurement has a greater standard deviation and is a poorer 1:1 agreement with the $T_1$s.

To quantify this difference, a correlation between measurements can be quantified by a measure such as the Pearson R, which can provide a value between −1 (completely anticorrelated) to +1 (completely correlated) and where 0 means no correlation. That is, to quantify with a single value, the correlations between $\langle T_1 \rangle_T$ or $\langle P_1 \rangle_T$ and their estimators for many qubits, a Pearson R measure across the ten odd-labeled qubits (e.g., Equation 15 or Equation 16) can be employed, wherein the Pearson R is a statistic for correlations.

$$R = \frac{\sum_{k=0}^{d-1}(\langle X \rangle_{T,Q_i} - \overline{\langle X \rangle_T})(\langle X \rangle_{\omega,t,Q_i} - \overline{\langle X \rangle_{\omega,t}})}{\sqrt{\sum_{k=0}^{d-1}(\langle X \rangle_{T,Q_k} - \overline{\langle X \rangle_T})^2 \sum_{k=0}^{d-1}(\langle X \rangle_{\omega,t,Q_i} - \overline{\langle X \rangle_{\omega,t}})^2}}, \qquad \text{Equation 15}$$

where d is the number of
qubits in the device or analysis, 10 in this case, and X is the observable $P_1$ or $T_1$.

$$R = \frac{\sum_{i=0}^{9}(\langle P_1 \rangle_{T,Q_i} - \overline{\langle P_1 \rangle_T})(\langle P_1 \rangle_{\omega,t,Q_i} - \overline{\langle P_1 \rangle_{\omega,t}})}{\sqrt{\sum_{i=0}^{9}(\langle P_1 \rangle_{T,Q_i} - \overline{\langle P_1 \rangle_T})^2 \sum_{i=0}^{9}(\langle P_1 \rangle_{\omega,t,Q_i} - \overline{\langle P_1 \rangle_{\omega,t}})^2}} \qquad \text{Equation 16}$$

Briefly, Equation 16 represents a definition of Pearson R measure for evaluating strength of correlations. The sums are evaluated over 10 qubits in a device.

Equation 16 utilizes $P_1$ (probability of measuring |1> state) and can be converted to $T_1$. <P₁>T can represent the average value of $P_1$ for the $T_1$ estimator measurements, and <P₁>_{ω,t} can represent the average value of $P_1$ from frequency measurements. The bar over <P₁> represents an average over all measurements.

The resulting Pearson correlation is a normalized covariance between two variables reflecting a linear correlation from 1 to −1, where R=1 (−1) represents a 100% positive (negative) correlation and R=0 indicates no correlation. Strong R correlation can therefore signal the existence of a potential linear mapping between the estimator and $\langle T_1 \rangle_T$, in particular, possibly one that is 1:1 or a scaling factor that will reliably estimate $\langle T_1 \rangle_T$.

For a single frequency sweep that takes about 20 minutes, 0.76<R(t_i)<0.84 correlation can be obtained between <T₁>_T and <T₁>_{ω,t} for 0.5 MHz<Δω<5 MHz. Using the $P_1$ values without assuming an exponential dependence can lead to strong correlations of 0.87<R(t_i)<0.91. Both of these can be substantially stronger than the correlation found between the representative instance of $T_1$ and <T₁>_T, which was R=0.29. It is noted that this instance of R can have a large spread, as seen by simulations of Gaussian distributed fluctuations in Appendix C.

Subsequently, after determination of one or more estimated energy relaxation times of one qubit, the same operations can be performed for one or more qubits of the same quantum logic circuit (e.g., quantum logic circuit 218) and/or for one or more qubits of yet another qubit device (e.g., quantum logic circuit). Based on the results, a comparison can be made, such as by the measurement component 242, as to which qubit device to employ for execution of a particular quantum circuit. For example, one or more qubits that are desired to be employed of a first device could be understood to have better coherence times than one or more qubits that are desired to be employed of a second device, based on the aforedescribed operations. That is, the measurement component 242 can, in one or more embodiments, determine which of a pair of qubit devices to employ for execution of a quantum circuit by comparing the estimated energy relaxation times of the qubits therein.

Figure 8A:
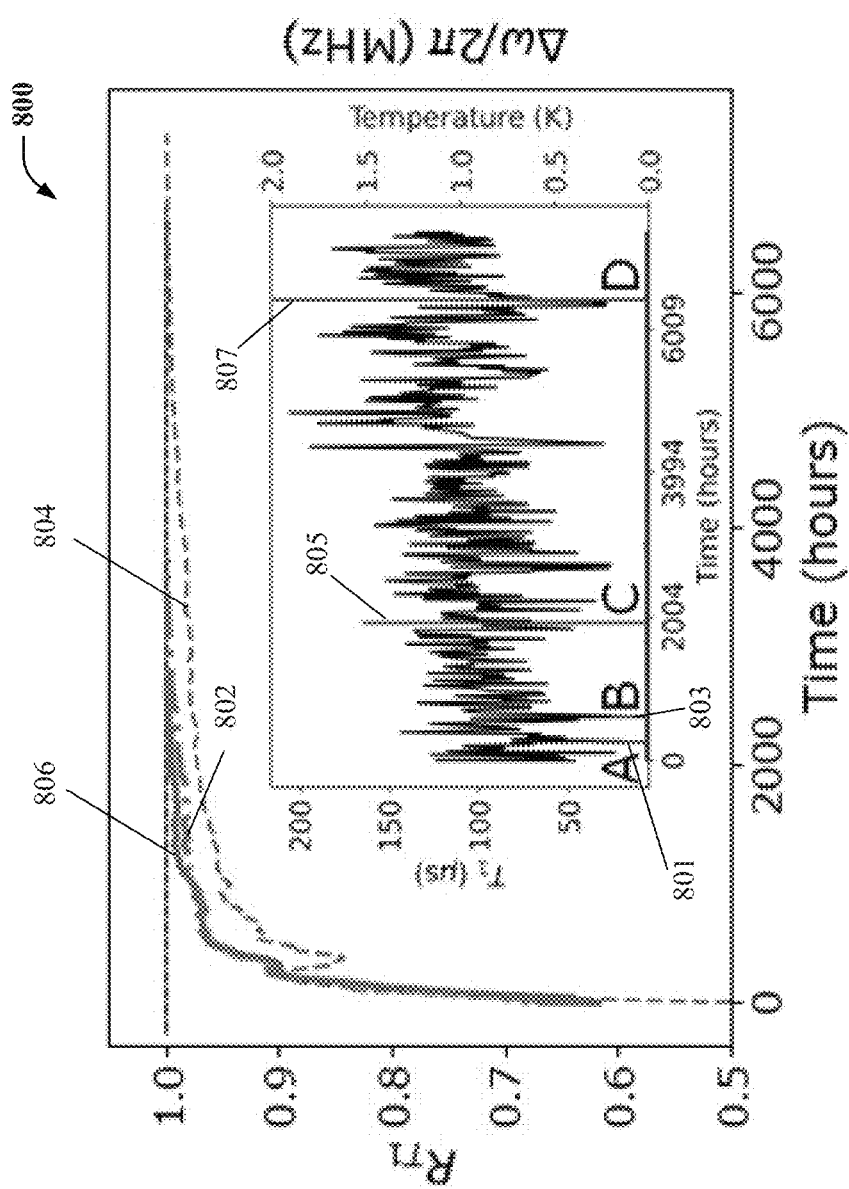
FIG. 8A illustrates a Pearson R dependence on time averaging of $T_1$s for odd-numbered qubits in accordance with one or more embodiments described herein.
Figure 8B:
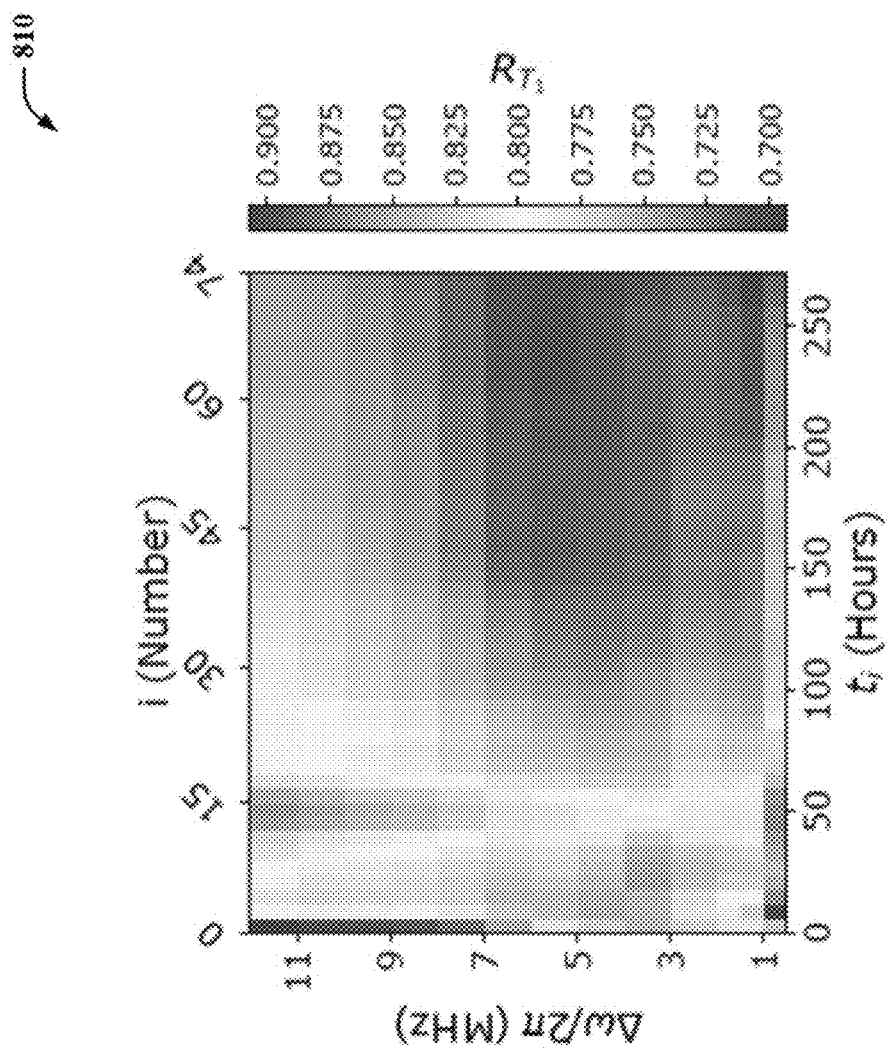
FIG. 8B illustrates a Pearson R dependence on time slice averaging and frequency range of the odd-numbered qubits of FIG. 8A in accordance with one or more embodiments described herein.

FIG. 8A illustrates a Pearson R dependence on time averaging of $T_1$s for odd-numbered qubits in accordance with one or more embodiments described herein. FIG. 8B illustrates a Pearson R dependence on time slice averaging and frequency range of the odd-numbered qubits of FIG. 8A in accordance with one or more embodiments described herein. Repetitive description of like elements and/or processes employed in respective embodiments is omitted for sake of brevity.

FIG. 8A illustrates graph 800 depicting Pearson R dependence on time averaging of the $T_1$'s of odd numbered qubits up to time, T, for three cases: (i) the entire time series indicated by plot 804 (dashed line), (ii) the time series between temperature excursions B (803) and D (807), indicated by plot 802 (dash-dot line; lettered locations indicated in the inset), and (iii) the time series between C (805) and D (807) for which no temperature excursions were recorded, indicated by plot 806 (solid line). The intermediate time series can be shifted in time index to compare more directly at short times with the full time series. The differences in R are within the standard deviation calculated for sampling $T_1$ time series with a Gaussian distributed range of values, see Appendix C.

The inset graph of graph 800 illustrates $T_1$ times on the left-hand y-axis, mixing chamber temperature on the right-hand y-axis, and time series for qubit $Q_{13}$ (i.e., qubit $Q_{13}$ of FIG. 3A) on the x-axis. Spacing of measurements is non-uniform. The minimum spacing is about 24 hours apart. Each temperature excursion is labeled with a letter.

A better estimate of the $\langle T_1 \rangle_T$ and R measurements for each qubit, $Q_k$, in a device can be obtained, for example by estimation component 246 of FIG. 2, from a moving average of multiple, N, measurements. The evolution of $\langle R \rangle_{T_{o \to N}}$ can be illustrated in FIG. 8A using a moving average of the $T_1(T_i)$ measurements, $\langle T_1 \rangle_{T_{o \to N}}$, for each qubit, that is, using a $T_1$ time series for each qubit and employing an updated $T_1(T_i)$ for each qubit. The $\langle R \rangle$ Touw exceeds an R value of about 0.8 (i.e., strong correlation) after about 10 measurements, corresponding to a time exceeding 100 hours, at an order of 10 separate measurements. Thus, approximately 10 independent measurements can be sufficient for fluctuations with a magnitude of about $0.2 \langle T_1 \rangle_T$ to obtain a strong correlation (an R value of about 0.8), between an estimator (e.g., $\langle T_1 \rangle_{T_{o \to N}}$) and $\langle T_1 \rangle_T$. The details of R dependence on fluctuation magnitude and number of measurements in the moving average have been discussed more completely in Appendix C.

Autocorrelation between $T_1(T_i)$ and $T_1(T_{i-1})$ measurements can be an underlying challenge to fast estimation of $\langle T_1 \rangle_T$ and R measurements. Evidence of autocorrelation can be seen for example in long term drifts in the average and short term correlations between $T_1$ (inset of FIG. 8A). To provide guidance on how many uncorrelated measurements, N, are required to achieve an R values of about 0.8, the evolution of $\langle R \rangle_{T_{o \to N}}$ can be simulated for a 20% standard deviation for the individual qubits, for example, by measurement component 242 of FIG. 2. As discussed in one or more embodiments earlier, it can be determined that about 10 uncorrelated $T_1$ measurements can be required for $\langle R \rangle_{T_{o \to N}}$ to exceed 0.8 for 10 qubit devices (appendix C). On shorter time scales, the experimental data herein can provide evidence of stronger autocorrelation frustrating faster accurate estimation of $\langle T_1 \rangle_T$ and that the fastest R (i.e., an R value of about 0.8) can be obtained on order of 1-2 days (appendices D and H). Thus, $\langle T_1 \rangle_{\omega,t}$ can be a promising method for faster estimation of $\langle T_1 \rangle_T$ than repeated $T_1(\omega=\omega_q)$ measurements at only the qubit frequency. Extending the $\langle T_1 \rangle_{\omega,t}$ estimator to a set of many qubits, $\{Q_k\}$, in a device can result in larger R values, in the same time, compared to relying only on $T_1 (\omega_q)$ measurements for each qubit. The R value can simply represent a quantitative single value expression of the high correlation between each $\langle T_1 \rangle_{\omega,t}$ and $\langle T_1 \rangle_T$ across the entire set of qubits.

It is to be noted that calculations of $\langle T_1 \rangle_{\omega,t}$ can employ an equal weighting of $P_1$, such as generated by weighting component 244, associated with every frequency bin, and the same choice of $\Delta\omega$ for every qubit. However, it is not a priori clear whether equal weighting can be a representative choice over the $\Delta\omega$ range, for example, how evenly the spectral diffusion of each TLS can contribute to the $T_1$ of the qubit is not known. The strong correlation of $\langle T_1 \rangle_{\omega,t}$ with $\langle T_1 \rangle_T$ with equal weighting can suggest that an ergodic-like sampling of the TLSs near the qubit frequency is a reasonable first approximation. The ergodic behavior of the $T_1$ estimators can be examined more completely in Appendix F and Appendix G. Central to the question of assigning a $T_1$ estimate to any qubit, it can be observed that $\langle T_1 \rangle_T$ behaves ergodically for all the qubits despite short term $1/f^\alpha$ correlated behavior (i.e., a constant mean $\langle T_1 \rangle_T$ can be identified). Assignment of any $T_1$ estimate could alternatively be made impossible in the presence of drift, which is not observed in these qubits (see Appendix B and Appendix F for further details about weak stationarity and ergodicity). Furthermore, the strong correlation of $\langle T_1 \rangle_T$ to $\langle T_1 \rangle_{\omega,t}$ using only the $P_1(\omega, \tau, t)$ spectrum around the qubit is consistent with a leading hypothesis that the $\langle T_1 \rangle_T$ is dominated by TLS behavior rather than other stochastic or static contributions.

FIG. 8B illustrates graph 810 depicting Pearson correlation, R, dependence on time slice averaging and frequency range, $\Delta\omega$, of the odd numbered qubits. Repetitive description of like elements and/or processes employed in respective embodiments is omitted for sake of brevity.

Correlation dependence on frequency and measurement time for one or more embodiments of this specification are addressed herein. In the context of the estimator $\langle T_1 \rangle_{\omega,t}$, determining optimal parameter choices for frequency range $\Delta\omega$, n autocorrelated samples and the spacing in time, $\Delta t = t_i - t_{i-1}$, to obtain sufficiently weakly autocorrelated measurements and a fast, accurate measure of $\langle T_1 \rangle_T$ are vital steps in the process. Since the optimum choices are presently not known a priori. $\langle R \rangle_{t_{o \to n}}$ versus $\Delta\omega$ and $t_i$ can be evaluated and plotted, such as illustrated in graph 810 FIG. 8B, to guide future application of this approach. Graph 810 can be generated by measurement component 242. Equal frequency bin weighting of $P_1$, such as can be generated by weighting component 244, was used for the plotting. While this order of magnitude choice of $\Delta\omega$ can produce a reasonably good first approximation for correlation across the entire range, the plot can display several unexplained features (e.g., non-monotonic dependence on $\Delta\omega$) indicating the unsurprising insufficiency of these two globally applied parameters (i.e., $\Delta\omega$ and t) alone to weight the frequency contribution of all the qubits and approach an R value of about 1.

Additional sensitivity analysis in Appendix G also examines correlation between frequencies and highlights that individual qubits have different sensitivity to the range sampled, $\Delta\omega$. A wide span of $\Delta\omega$ can produce high $\langle R \rangle_{t_{o \to n}}$, comparable or better than $R(T_i)$ from a single $T_1(\omega_q)$ measurement. Further, a strong R correlation (e.g., linear dependence) and $(\langle T_1 \rangle_{\omega,t}$ approaching 1:1 quantitative agreement with $\langle T_1 \rangle_T$ can be observed from graph 810. The degree to which a $T_1$ estimator, from sampling the nearby frequency space (e.g., by sampling component 248 of FIG. 2), is quasi-ergodic and would converge to 1:1 agreement is addressed in much more detail in Appendix G and Appendix K.

One or more implications for process characterization for one or more embodiments of this specification are discussed herein. A strong correlation between $\langle T_1 \rangle_{\omega,t}$ and $\langle T_1 \rangle_T$ can suggest that long time $T_1$ averages can be estimated relatively rapidly using spectroscopy (e.g., FIG. 8B), in contrast to overcoming correlation times in $T_1$ at a single $\omega_q$ to obtain a representative $\langle T_1 \rangle_T$ for the qubit.

Identification of better choices of $\Delta\omega$ and n in this study were made with pre-knowledge of what $\langle T_1 \rangle_T$ was. These parameters will have to be chosen without this pre-characterization for future implementation of this method. The R dependence on both these parameters appears to be relatively weak suggesting that a heuristic choice for a single $\Delta\omega$ and n might be sufficient to obtain useful estimates (i.e., R>0.8) of $\langle T_1 \rangle_T$ for new processes when using this simple equal weighting approach until improved choices can be formulated (i.e., different frequency spans for each qubit and or weighted averaging over frequency).

More specifically it can be observed that approximately 10 independent measurements can be sufficient to obtain an R value of about 0.8 or higher (Appendix C). Ten approximately independent samples, S, can be obtained in a single scan by sampling (e.g., by sampling component 248) at frequency spacings, $\chi$, that are greater than the autocorrelation frequency width (i.e., a frequency spacing where correlation drops below a value of about 0.2). The correlation was found to become weak for $\mathcal{O}(1 \text{ MHz})$ (Appendix G). Thus, by this heuristic. a single spectroscopy scan can require S=10 for the target R value of about 0.8, according to equation 1. Assuming one of the measurements is done (e.g., by measurement component 242) at the qubit frequency, $T_1(\omega_q)$, so for a $\chi$ value of about 1 MHz, a scan from ±4.5 MHz can be suggested by such a heuristic. Extra n measurements can be obtained by waiting longer than the autocorrelation time. The autocorrelation width, furthermore, can be evaluated (e.g., by measurement component 242) in the same scan as that used for the $\langle T_1 \rangle_T$ estimate as long as a sufficiently wide range is sampled. Alternatively a second scan can be taken if the initial $\Delta\omega$ guess was too small.

Empirically, diminishing gains can be observed in using ever larger $\Delta\omega$. Further research can be required for guidance on better limits on $\Delta\omega$ beyond the operational observation that an S value of about $\mathcal{O}(10)$ produces a quasi-ergodic result for qubits with $\langle T_1 \rangle_T$ in the range of 10-200 µs (Appendix G) for more details on quasi-ergodicity. Since about a 1:1 agreement can be observed using a relatively small $\Delta\omega$ (about 10 MHz) for the approximately 9 month time series (e.g., similar magnitude of spectral diffusion as the TLS as −7.5 MHz in under 272 hours (FIG. 6)), and the distribution of $T_1(\omega_q, T_t)$ can be observed to produce a constant standard deviation (Appendix B), rather than growing (e.g., proportional to a random walk $\propto \sqrt{t}$), it can be speculated that optimal $\Delta\omega$ is bounded rather than growing indefinitely from spectral diffusion processes. Dipole coupled ensembles proposed for TLS spectral diffusion can produce a truncated linewidth.

That is, for a single value, the optimal choice of $\Delta\omega$ and n, can then depend on some representative measure of the inhomogenous TLS linewidth, a measure of the range of frequencies the TLSs sample for all the qubits in the device. Since good correlations can be achieved using a relatively small $\Delta\omega$ rather than a larger A$\omega$ due to extended evolution over months (e.g., proportional to a time dependence such as $\sqrt{t}$, expected in certain limits), it can be speculated that the representative TLS linewidth can also be bounded and might therefore be estimated from the short time TLS spectral diffusion, rather than growing indefinitely from spectral diffusion processes.

Thus, temporal and spectral dynamics of superconducting qubit relaxation times can be explored. Such dynamics can be studies in high coherence, single-junction transmons by developing a technique for energy relaxation spectroscopy of defect TLSs via the AC Stark effect. The techniques discussed herein require no additional hardware resources and can be easily sped up further by integration with reset schemes. Autocorrelation of $T_1$ can frustrate rapid characterization of the long-time average $\langle T_1 \rangle_T$ and therefore accurate characterization of devices. Analysis, herein, of the dynamics identifies a strong correlation between $\langle T_1 \rangle_T$ and its short time average over the local frequency span. $\langle T_1 \rangle_{\omega,t}$. The strong correlation of $\langle T_1 \rangle_T$ with $\langle T_1 \rangle_{\omega,t}$ is also consistent with a TLS dominated $T_1$ that quasi-ergodically samples the qubit local frequency neighborhood in contrast to static or uncorrelated stochastic processes. The experiments conducted herein lead to several new promising directions for rapid process characterization and evaluation of device stability.

Figure 9:
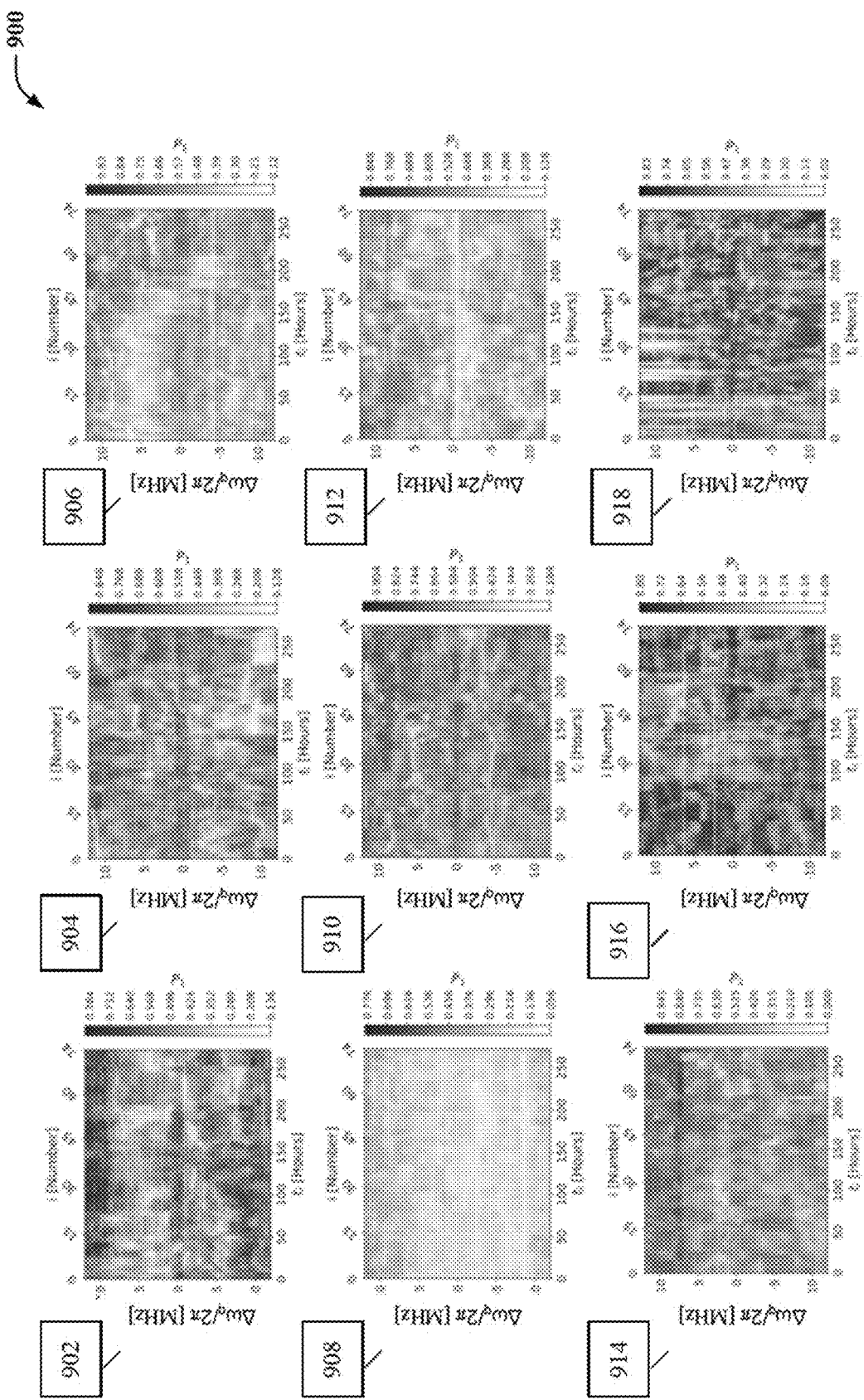
FIG. 9 illustrates a set of graphs demonstrating spectroscopy for odd qubits in accordance with one or more embodiments described herein.

Turning now to FIG. 9 and Appendix A, spectroscopy of odd numbered qubits can be discussed in greated detail. FIG. 9 illustrates a set of graphs 900 demonstrating spectroscopy for odd qubits in accordance with one or more embodiments described herein. Set of graphs 900 illustrates spectroscopy scans 902-918 for qubits $Q_1$, $Q_3$, $Q_5$, $Q_7$, $Q_9$, $Q_{11}$, $Q_{13}$, $Q_{17}$, and $Q_{19}$, respectively, and not including a spectroscopy scan for qubit $Q_{15}$, which is discussed in FIG. 6. Repetitive description of like elements and/or processes employed in respective embodiments is omitted for sake of brevity.

Appendix A—Spectroscopy of Odd Numbered Qubits in a Device

The spectrally and temporally resolved dynamics of $T_1$ for all the odd numbered qubits in the device are provided for reference in FIG. 9. The data was taken under the same conditions and at the same time as FIG. 6. Care was taken to avoid frequency collisions both over the range of qubit frequency shift and the placement of $\omega_s$. It is to be noted that the odd qubits do not have direct connectivity with each other, making cross talk effects negligible for these measurements.

Figure 10A:
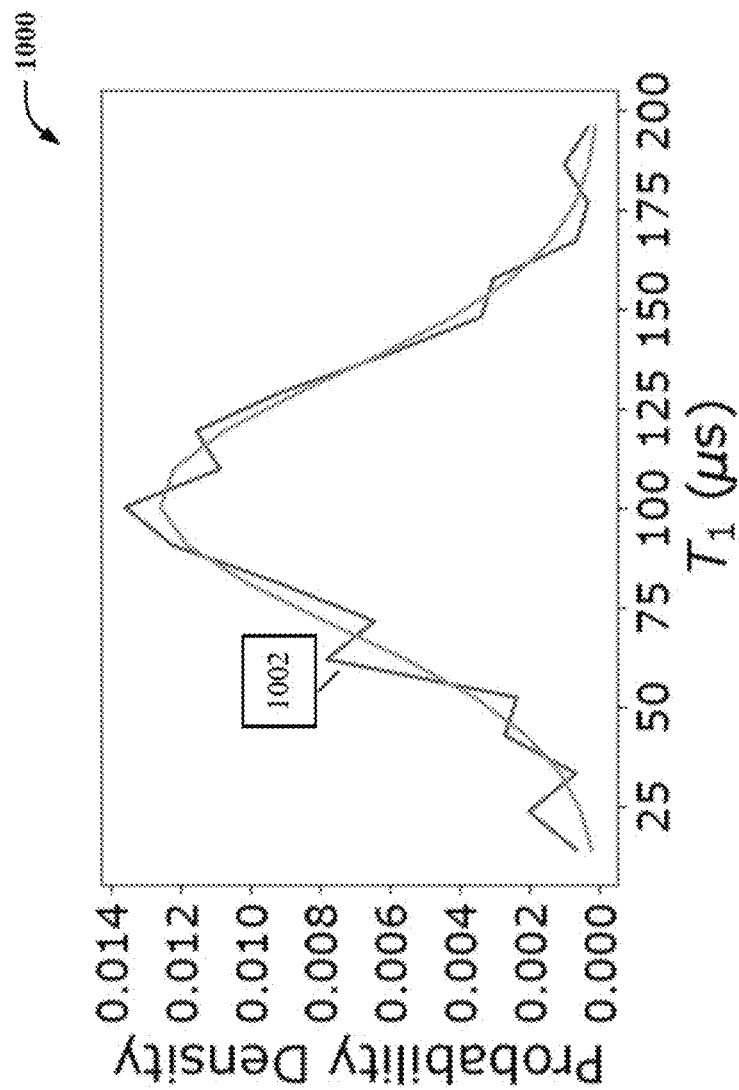
FIG. 10A illustrates a graph demonstrating probability density of $T_1$ fluctuations in accordance with one or more embodiments described herein.
Figure 10B:
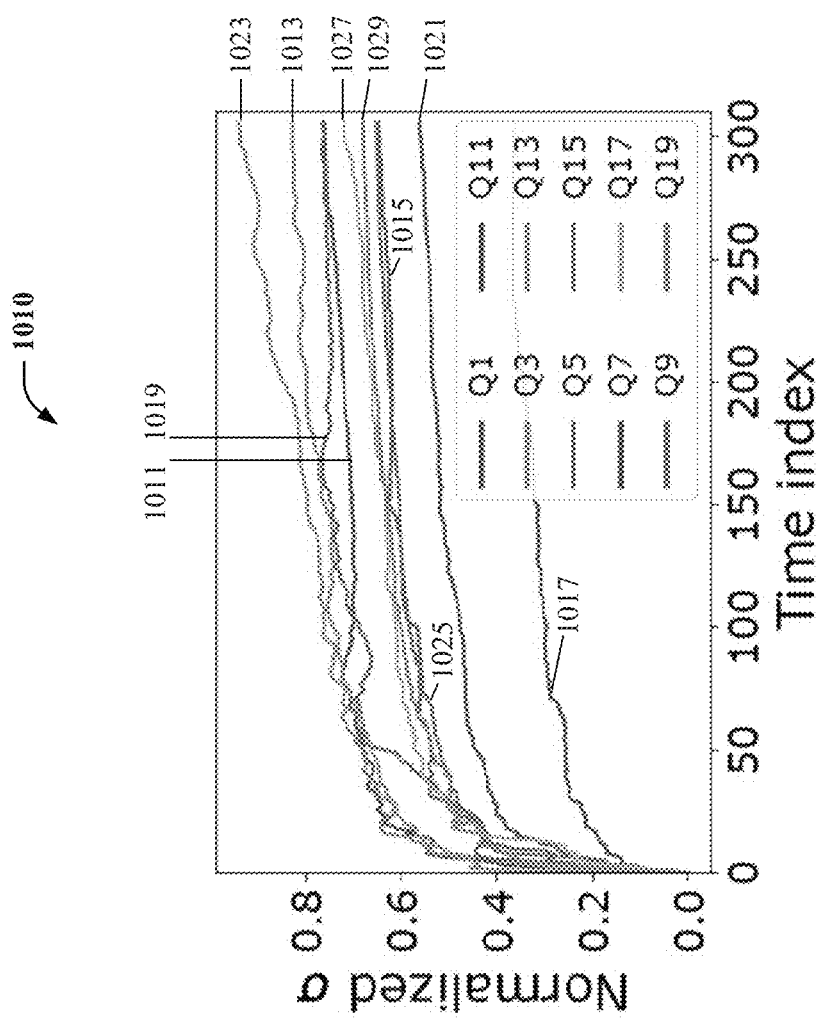
FIG. 10B illustrates a graph demonstrating normalized cumulative moving average of the standard deviations of the $T_1$ fluctuations of FIG. 10A, in accordance with one or more embodiments described herein.

Turning now to FIGS. 10A and 10B and Appendix B, stationarity of $T_1$ time series can be discussed in greater detail. FIG. 10A illustrates a graph 1000 demonstrating probability density of $T_1$ fluctuations in accordance with one or more embodiments described herein. Graph 1000 can be generated by measurement component 242. Repetitive description of like elements and/or processes employed in respective embodiments is omitted for sake of brevity.

Appendix B—Stationarity of $T_1$ Time Series

An important question for $T_1$ analysis of qubits can be whether there exists a representative $T_1$ mean and variance that can be assigned to each qubit. In time series analysis, this concept can be described as weak stationarity, which is an significant condition for ergodicity.

The mean and standard deviations can qualitatively appear relatively constant. A histogram of the $T_1$s over 9 months for $Q_{13}$ can be plotted for a representative case along with a fit to a normal distribution, as illustrated FIG. 10A. Plot 1002 illustrates probability density of $T_1$ fluctuations for a representative qubit, $Q_{13}$, and the normalized histograms can be derived from the $T_1$ time series, such as by measurement component 242. Visually, the distributions can appear relatively normal indicating that the mean is not drifting substantially relative to the variance, while the skew and kurtosis are also relatively small. In other qubits, similar near normally distributed $T_1$ fluctuations can be observed, as illustrated in table 2. The skew and kurtosis can be frequently undiscernable statistically from a normal distribution with notable exceptions, for example, qubit $Q_7$, which can display a tight distribution around the mean and some instances for which the skew was distinguishably larger than normal in qubits $Q_3$ and $Q_{17}$.

Table 2: Calculated first four moments of the $T_1$ distributions for all the odd qubits. The mean, standard deviation, skew and kurtosis are indicated as $\mu_{(1)}$, $\mu_{(2)}$, $\mu_{(3)}$, and $\mu_{(4)}$, respectively, in the table. The table also contains the p-value results of skew and kurtosis tests for normality. The null hypothesis is that the test distribution comes from a normal distribution. A value ≥0.05 is often used as the threshold for the null hypothesis to be accepted (i.e., the distribution is normal-like for that tested moment). It is to be appreciated that the notation "~" is used to indicate approximation in table 2, for example, ~0 can indicate a value that is approximately equal to zero.

TABLE 2

| Qubit | $\mu_{(1)}$ (µs) | $\mu_{(2)}$ (µs) | $\mu_{(3)}$ | $\mu_{(4)}$ | p-value $\mu_{(3)}$ test | p-value $\mu_{(4)}$ test |
|---|---|---|---|---|---|---|
| 1 | 86.1 | 28.3 | −0.12 | −0.32 | 0.37 | 0.23 |
| 3 | 97.2 | 26.4 | −0.44 | 0.30 | 0.002 | 0.25 |
| 5 | 107.0 | 28.5 | −0.25 | 0.23 | 0.07 | 0.32 |
| 7 | 31.4 | 5.6 | −0.83 | 1.92 | ~0 | ~0 |
| 9 | 107.9 | 29.3 | −0.18 | −0.03 | 0.20 | 0.94 |
| 11 | 68.4 | 17.7 | −0.11 | −0.09 | 0.42 | 0.88 |
| 13 | 106 | 32.7 | −0.09 | 0.22 | 0.50 | 0.34 |
| 15 | 98.8 | 28.4 | −0.19 | −0.32 | 0.17 | 0.23 |
| 17 | 104.1 | 28.3 | −0.28 | −0.32 | 0.04 | 0.22 |
| 19 | 113.4 | 35.1 | −0.14 | −0.24 | 0.29 | 0.44 |

FIG. 10B illustrates a graph 1010 demonstrating normalized cumulative moving average of the standard deviations of the $T_1$ fluctuations of FIG. 10A, in accordance with one or more embodiments described herein. The individual plots for the odd numbered qubits $Q_1$-$Q_{19}$ are illustrated as plots 1011-1029, respectively. For example, plot 1011 corresponds to qubit $Q_1$, plot 1021 corresponds to qubit $Q_{11}$, plot 1029 corresponds to qubit $Q_{19}$, and so on. Repetitive description of like elements and/or processes employed in respective embodiments is omitted for sake of brevity.

The normalized cumulative moving average of the standard deviation of the $T_1$ distributions, as a function of time index spanning about 9 months, for each qubit can be illustrated in FIG. 10B. The standard deviation of each qubit can be normalized to its respective mean, µ. It can be observed that the general trend is for the standard deviations to converge towards their mean, that is, for σ to be approximately equal to µ. Drift in σ can be small relative to µ. The mean, σ can behave weakly stationary rather than, for example, random walk-like (i.e., $\sigma \propto \sqrt{t}$). The normalized mean is plotted on the y-axis against a time index on the x-axis.

To more rigorously test the weak stationarity to test whether the variance is stationary after an observation that the mean is stationary, at least within an approximate $\sigma_{T1}$ over 9 months, an augmented Dickey Fuller (ADF) test was applied to the timeseries. The ADF test can be used test of weak stationarity, testing both drift and constant variance. For random walk cases, the mean is constant but the timeseries can be non-stationary because the variance grows with time. In particular, the ADF can test the likelihood of a unit root difference equation regression with the timeseries in question. Unit root is synonomous with random walk behavior. ADF uses the parameterized model illustrated in equation 17.

Equation 17: $y_i = \alpha y_{i-1} + \Sigma_{j=1}^p \beta \Delta y_{i-j} + \delta + \gamma i + \epsilon_i$, where "i" can represent the time step index, α can represent the root, the sum is over additional lag terms, δ can represent a constant offset, γ can represent the slope of a linear trend and ε can represent a random error term that is normally distributed with a standard deviation of $\sigma_\epsilon$. The lag terms significant account for effects of serial correlation (e.g., non-Markovian behavior expected in 1/f noise), while the drift term can be used to establish 'trend stationary' behavior. The null hypothesis, $H_0$, is that there is a unit root. If the time series is stationary, the ADF $H_0$ must be rejected.

The test can be conducted using γ=0, which can accept the null hypothesis, $H_0$, for either the case of a unit root (e.g., random walk) or for an approximate de non-stationary trend summed with a random error term. Table 3 shows the results of the tests. All $T_1$ timeseries reject the ADF $H_0$. All $T_1$ timeseries are therefore consistent with being weakly stationary.

Table 3: ADF tests for odd qubit $T_1$ time series using the python statsmodel library. The tests use a Bayesian information criteria to determine the number of lags. P-values of greater than 0.05 are the typical statistical threshold for acceptance of the $H_0$, null hypothesis. The table values are for $\Delta = 0$.

TABLE 3

| Qubit | t-stat | p-value |
|---|---|---|
| 1 | −9.3 | $9.1 \times 10^{-14}$ |
| 3 | −6.14 | $1.0 \times 10^{-6}$ |
| 5 | −10.1 | $1.6 \times 10^{-15}$ |
| 7 | −11.3 | $5.2 \times 10^{-18}$ |
| 9 | −12.1 | $2.5 \times 10^{-19}$ |
| 11 | −8.5 | $5.8 \times 10^{-12}$ |
| 13 | −6.0 | $1.9 \times 10^{-6}$ |
| 15 | −9.9 | $3.0 \times 10^{-15}$ |
| 17 | −9.6 | $1.4 \times 10^{-14}$ |
| 19 | −4.1 | $7.3 \times 10^{-3}$ |

Figure 11:
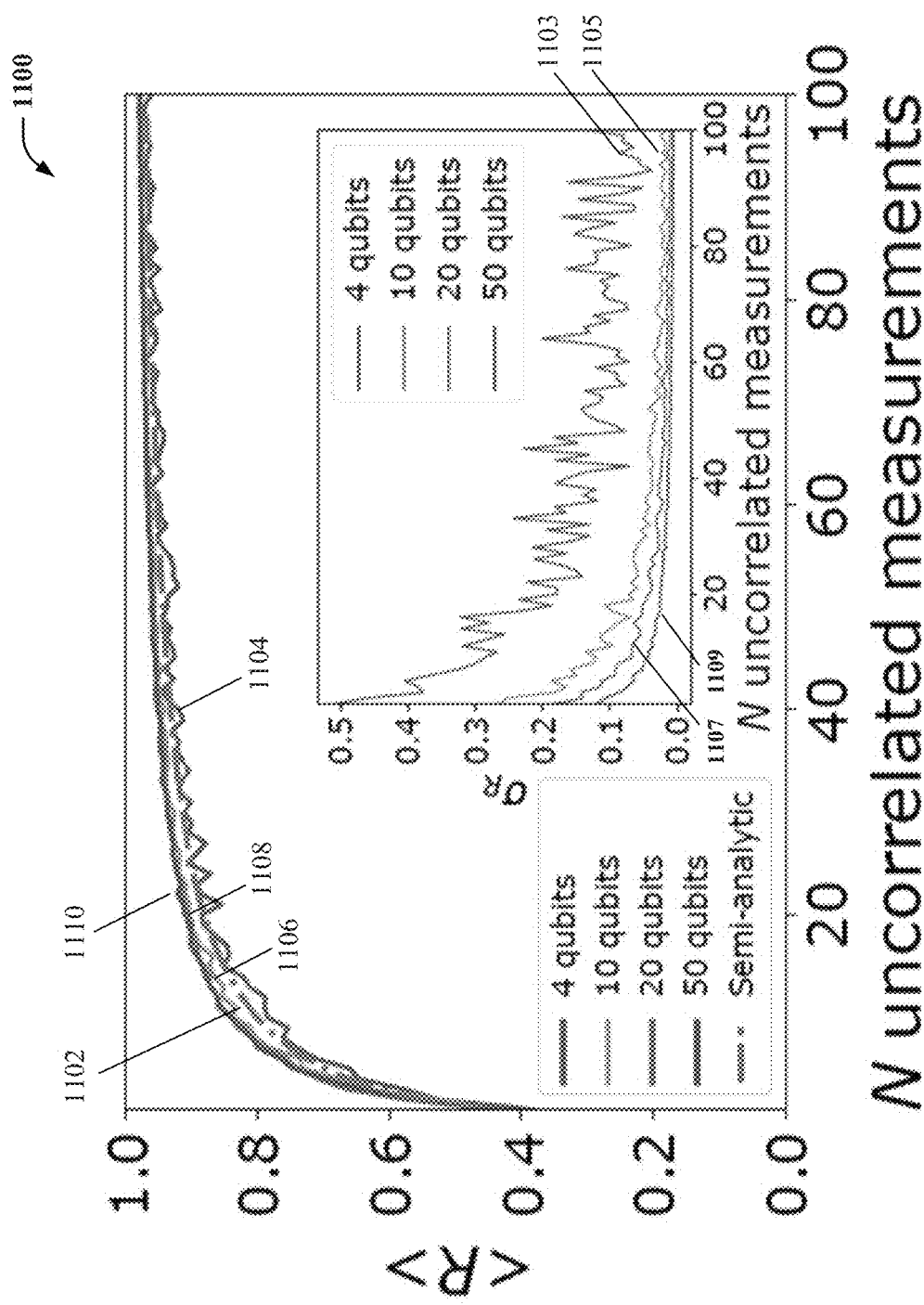
FIG. 11 illustrates a graph demonstrating simulated Pearson R dependence on number of qubits in the device and on N uncorrelated device measurements of $T_1$ in accordance with one or more embodiments described herein.

Turning now to FIG. 11 and Appendix C. Pearson correlation dependence on standard deviation and sampling can be discussed in greated detail. FIG. 11 illustrates a graph 1100 demonstrating simulated Pearson R dependence on number of qubits in the device and on N uncorrelated device measurements of $T_1$ in accordance with one or more embodiments described herein. Plots 1104, 1106, 1108, and 1110 are representative of the (R) results for 4 qubits, 10 qubits, 20 qubits, and 50 qubits, respectively. Similarly plots 1103, 1105, 1107, and 1109 of the inset graph of FIG. 11 are representative of the standard deviation (OR) results for 4 qubits, 10 qubits, 20 qubits, and 50 qubits, respectively. Graph 1100 can be generated by measurement component 242. Repetitive description of like elements and/or processes employed in respective embodiments is omitted for sake of brevity.

Appendix C—Pearson Correlation Dependence on Standard Deviation and Sampling

FIG. 11 illustrates simulated Pearson R dependence on number of qubits in a device and on N uncorrelated device measurements of $T_1$ for each qubit in the device. The simulation was done for 200 simulated devices to find an expectation value ⟨R⟩. The semi-analytic expression at plot 1102 agrees well to the 4 qubit simulation. The inset shows the dependence of the standard deviation of R on N and qubit number.

An expectation of how many uncorrelated measurements are necessary to achieve strong R correlation (i.e., for R to be about 0.8) can be calculated, for example, by measurement component 242. A Pearson $\langle R(n_q, \sigma_{mk}) \rangle_{T_{0 \to N}}$ for $n_q$ being a ten qubit device, $\sigma_{mk}$ being the $T_1$ standard deviation for the $k^{th}$ qubit and where N is the number of uncorrelated $T_1$ measurements for each of the ten qubits can be calculated. The simulated $\langle R \rangle_{T_{0 \to N}}$ calculation has a long-time average $T_1$ assigned to each of the 10 qubits, $\langle T_1 \rangle_{T,k}$. For every k-th qubit, $(\langle T_1 \rangle_{T,k}$ can be chosen randomly from a normal distribution with a mean of 100 μs and a standard deviation of 10 μs. $\langle T_1 \rangle_{T,k}$ can simulate a long time stationary $\langle T_1 \rangle_T$ for each qubit. This standard deviation can be representative of process variation in the qubits of each simulated device.

Next, a sequence of measurements can be simulated. Each measurement can obtain an instantaneous $T_1$ for each qubit in the device. The $T_1$ measurement can be chosen from a normal distribution with a standard deviation of $\sigma_{mk}=0.2\langle T_1 \rangle_{T,k}$, which can be of similar magnitude to that observed in the device. The $\sigma_{mk}$ is a measure of the time fluctuating $T_1$ centered around $\langle T_1 \rangle_{T,k}$, in contrast to the 10 μs above, which is the variability of the static $\langle T_1 \rangle_{T,k}$ centered around $$\langle T_1 \rangle_{T,n_q} = \frac{1}{n_q}\sum_{k}^{n_q}\langle T_1 \rangle_{T,k}.$$

An estimate of the Pearson R correlation can be obtained (e.g., by estimation component 246) between $\langle T_1 \rangle_{T,k}$ and a single measurement instance $T_{1,k}$ for all the qubits. The effect of multiple uncorrelated device measurements can then be simulated (e.g., by measurement component 242) by repeating the device measurement and updating the average of the $T_{1,k}$ with all previous $T_1$ measurements. In order to simulate the dependence of $\langle R \rangle_{T_{0 \to N}}$ on the number of uncorrelated measurements N, an expectation value can first be defined, and $\langle\langle R \rangle_{T_{0 \to N}}\rangle_{Ndev}$, averaged over $N_{dev}=200$ devices with 4, 10, 20 and 50 qubits.

$\langle\langle R \rangle_{T_{0 \to N}}\rangle_{Ndev}$ can approache unity with increasing uncorrelated measurements, as illustrated in FIG. 11. This can indicate that the averaging of uncorrelated measurements increasingly produces an accurate estimate of $\langle T_1 \rangle_{T,k}$. The standard deviation, $\sigma_R$, of $\langle\langle R \rangle_{T_{0 \to N}}\rangle_{Ndev}$ is illustrated in the inset, FIG. 11. It can be observed that the initial $\langle R \rangle_{T_{0 \to N}}$ values can be very low, and around N=10 uncorrelated measurements can be required to obtain an R value of about 0.8, the correlation obtained from the frequency averaging of $T_1$ discussed in the main text.

To provide additional insight into the $\langle R \rangle_{T_{0 \to N}}$ dependence on $n_q$, $\sigma_{mk}$ and N measurements, an analytic expression for $\langle R(n_q, \sigma_{mk}) \rangle_{T_{0 \to N}}$ can be derived (e.g., by analysis component 247). R can be expressed in terms of differences, δX, from $\langle T_1 \rangle_{T,n_q}$. Explicitly writing out the first few terms of $\langle R(n_q, \sigma_{mk}) \rangle$'s sums for a multiqubit device, as described by equation 18.

$$\langle R(n_q, \sigma_{mk}) \rangle = \frac{\delta X_1 (\delta X_1 + \sigma_{m1}) + \delta X_2 (\delta X_2 + \sigma_{m2}) + \ldots}{\sqrt{[\delta X_1^2 + \delta X_2^2 + \ldots][(\delta X_1 + \sigma_{m1})^2 + \ldots]}},$$ Equation 18 where $\sigma_{mk}$ is the standard deviation for measurements of $T_{1,k}$ for the kth qubit in the device, and $\delta X_k$ can be defined according to equation 19.

$$\delta X_k = \langle T_1 \rangle_{T,k} - \langle T_1 \rangle_{T,n_q}$$ Equation 19

The standard deviation of the $T_1$ measurement can be parametrized with a scaling constant a for the kth qubit as $\sigma_{mk}=\alpha_i \langle T_1 \rangle_{T,k}$. Likewise, an assumption can be made that the $\langle T_1 \rangle_{T,k}$ in a device are normally distributed and may be parameterized with $\beta_i$ as $\sigma_{di}=\beta_i \langle T_1 \rangle_{n_q}$ (i.e., $\langle T_1 \rangle_{T,k}=\langle T_1 \rangle_{n_q}+\sigma_{dk}$).

$\langle R \rangle_{T_{0 \to N}}$ can be solved for a particular device instance with $\langle T_1 \rangle_{T,k}$, in the simpler case that $\alpha_k=\alpha$ (i.e., $\sigma_{mk}=\sigma_m$), and with the device defined by $\vec{\beta}=\{\beta_1, \beta_2, \ldots\}$. The $\vec{\beta}$ defines the $\langle T_1 \rangle_T$s of a device instance. Upon, multiplying and reorganizing the first few terms, and substituting $$\delta X_k + \sigma_m \to \delta X_k + \frac{\sigma}{\sqrt{N}}$$

to express une moving average dependence of $T_1$ on N measurements, equations 20 and 21 can be derived.

$$\langle R(n_q, \sigma_m) \rangle = \frac{(\delta X_1^2 + \delta X_2^2 + \ldots) + \sigma_m(\delta X_1 + \delta X_2 + \ldots)}{\sqrt{[\delta X_1^2 + \delta X_2^2 + \ldots][(\delta X_1 + \sigma_m)^2 + \ldots]}}$$ Equation 20

$$\langle R(n_q, \sigma_m, N) \rangle = \frac{\left(\sum_i^{n_q} \beta_i^2\right) + \frac{\alpha}{\sqrt{N}}\left(\sum_i^{n_q} \beta_i\right)}{\sqrt{\left(\sum_i^{n_q} \beta_i^2\right)\left(\sum_i^{n_q}\left(\beta_i + \frac{\alpha}{\sqrt{N}}\right)^2\right)}}$$ Equation 21

To compare to the simulations in FIG. 11, many instances of equation 21 can be sampled, $N_{dev}$ instances of $\vec{\beta}$. The $\vec{\beta}$ are assumed to have a normal distribution. The expression shows good agreement with the full numerical simulation illustrated in FIG. 11. Equation 21 describes the quantitative dependence of how increasing N can educes the uncertainty in R through reducing the uncertainty in each $T_{1,k}$ estimator. The uncertainty is reduced by the familiar VN dependence resulting in $\lim_{N \to \infty} \langle R \rangle_{T_{0 \to N}}$. Increasing the number of qubits in the device also can be used to reduce OR for a single device measurement, playing a similar role of averaging $\vec{\beta}$ instead of alternatively measuring many devices.

Figure 12:
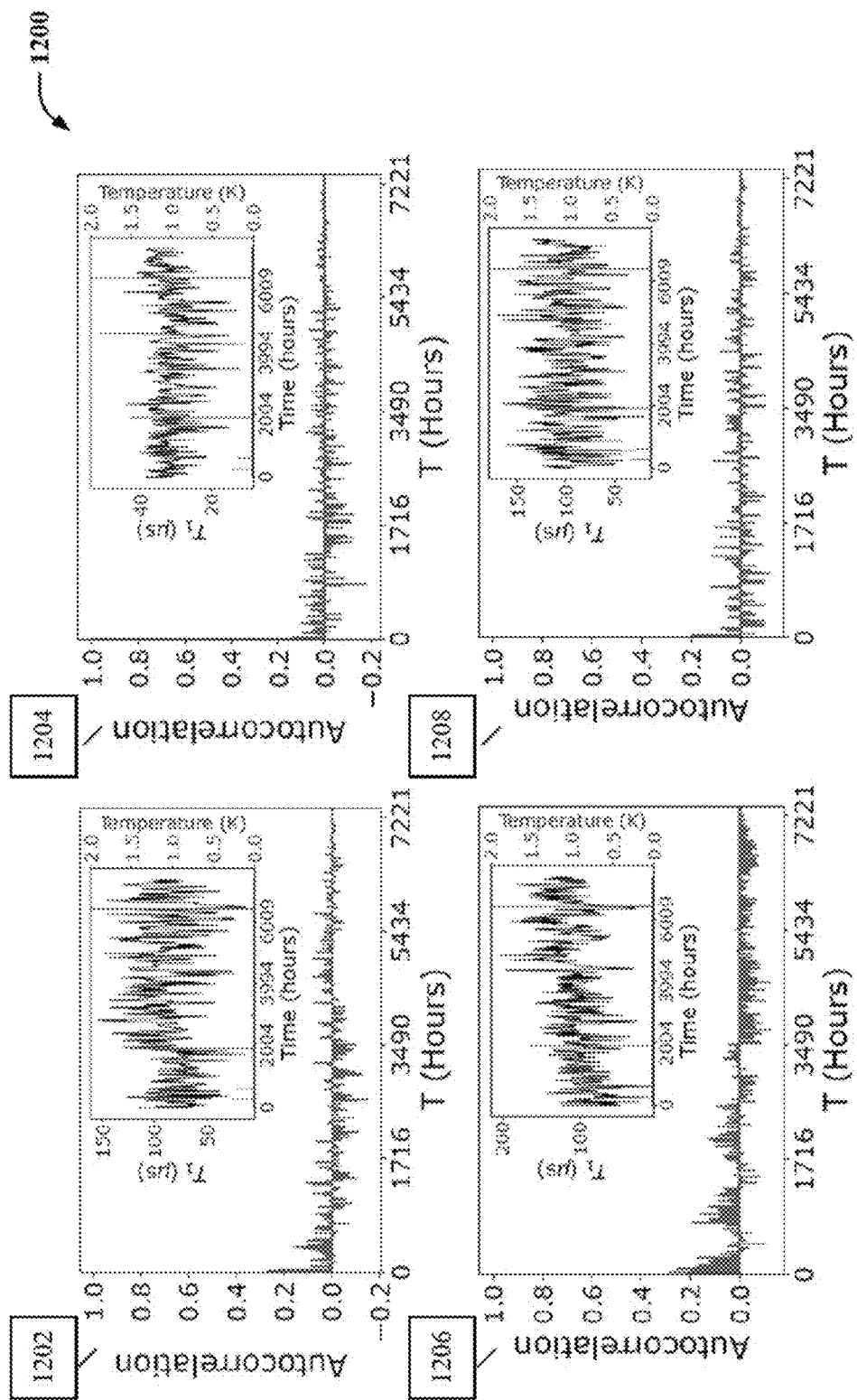
FIG. 12 illustrates a set of graphs demonstrating autocorrelation as a function of measurement time lag for qubits in accordance with one or more embodiments described herein.

Turning now to FIG. 12 and Appendix D, autocorrelation of $T_1(\omega_q, T_i)$ can be discussed in greater detailed. FIG. 12 illustrates a set of graphs 1200 demonstrating autocorrelation as a function of measurement time lag for qubits in accordance with one or more embodiments described herein. Set of graphs 1200 can be generated by measurement component 242. Repetitive description of like elements and/or processes employed in respective embodiments is omitted for sake of brevity.

Appendix D—Autocorrelation of $T_1(\omega_q, T_i)$

FIG. 11 illustrates autocorrelation as a function of measurement lag time for qubits $Q_1$, $Q_7$, $Q_{13}$ and $Q_{15}$ (i.e., qubit 306, qubit 312, qubit 318, and qubit 320 of FIG. 3A), at plots 1202, 1204, 1206, and 1208, respectively. The autocorrelation is detrended using the mean of the time series and normalized using the estimated variance. The insets in each graph show the $T_1$ time series from which the autocorrelation was calculated and the corresponding temperature of the mixing chamber plate.

To determine the time required to obtain an uncorrelated measurement of $T_1$, the autocorrelation for the approximately 9 month $T_1$ time series can be calculated (e.g., by measurement component 242), as illustrated in FIG. 12. The autocorrelation can be detrended using the mean and normalized using the estimated variance. The period between sampling (e.g., by sampling component 248) can be approximately 24 hours with some variability (i.e., hours). All qubits can have some time correlation in the first few measurements (i.e., 1-2 days). For short time behavior see Appendix H. Some qubits also show weak (but non-zero) and decaying autocorrelation at longer times. For example, time series for qubits $Q_{13}$ and $Q_1$ appear to have long time trends towards higher $T_1$, for example, rather than drifting around a stationary average, as illustrated at graphs 1206 and 1202, respectively. Qubit $Q_1$ appears to have a slow drift (graph 1202) that switches direction midway through the time-series, while qubits $Q_7$ and $Q_{15}$ appear to have less evident drifts (graphs 1204 and 1208, respectively). The decaying oscillatory autocorrelation is qualitatively consistent with a mean reverting time series (e.g., an Ornstein-Uhlenbeck process), and it is also consistent with the weak stationarity of the same time series found in appendix B. In general, these longer timescale autocorrelations can highlight a challenge in extrapolating $\langle T_1 \rangle_T$ from sampling $T_1$ at a single frequency at early times in the time evolution.

Figure 13:
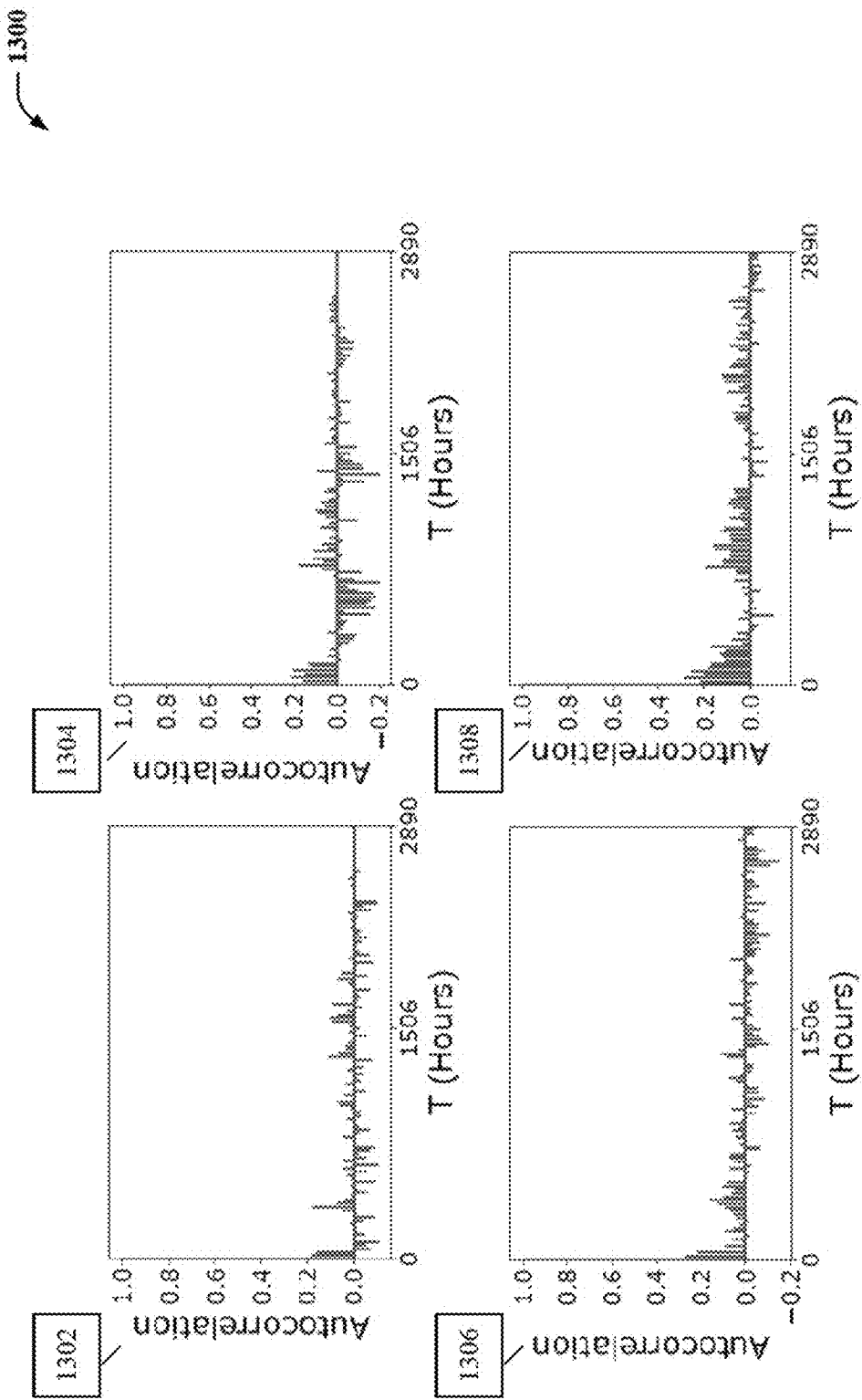
FIG. 13 illustrates a set of graphs demonstrating autocorrelation as a function of measurement time lag for qubits for a time interval of about 2890 hours in accordance with one or more embodiments described herein.

Turning now to FIG. 13 and Appendix E, thermal excursion effects on autocorrelation can be discussed in greater detailed. FIG. 13 illustrates a set of graphs 1300 demonstrating autocorrelation as a function of measurement time lag for qubits for a time interval of approximately 2890 hours in accordance with one or more embodiments described herein. Repetitive description of like elements and/or processes employed in respective embodiments is omitted for sake of brevity.

Appendix E—Thermal Excursion Effects on Autocorrelation

FIG. 13 illustrates at graphs 1302 and 1304 autocorrelation as a function of measurement lag time for qubits 1 and 13, respectively, for a time period of about 2890 hours between temperature excursions, and at graphs 1306 and 1308 are the autocorrelations using the entire time series of about 2890 hours, for the corresponding qubits 1 and 13. The autocorrelation is detrended using the mean of the time series and normalized using the estimated variance.

Mixing chamber plate temperature excursions were observed during the duration of the approximately 9 month $T_1(T_i)$ measurement time series as illustrated in FIG. 13. To address doubts about the impact of the temperature excursions, autocorrelation for representative qubits for the longest time series without any thermal excursions are illustrated in FIG. 13 for comparison with FIG. 12. The qualitative behavior and magnitudes of the long time correlations can be similar to cases with the temperature excursions. The exact quantitative agreement does change, however, this can also be expected from truncating the time series at any different starting time.

Appendix D describes that the autocorrelation time is order of days. This is consistent with observing no strong effects of the temperature excursions on the weak stationarity of the time series or long term behavior of the distributions. For example, a temperature excursion would be expected to have a very localized effect on a behavior of a time series of about 9 months. The measurements using spectroscopy were done when the temperature was stable. Thus, the temperature excursions don't effect the conclusions of the experiments discussed in one or more embodiments herein.

Figure 14A:
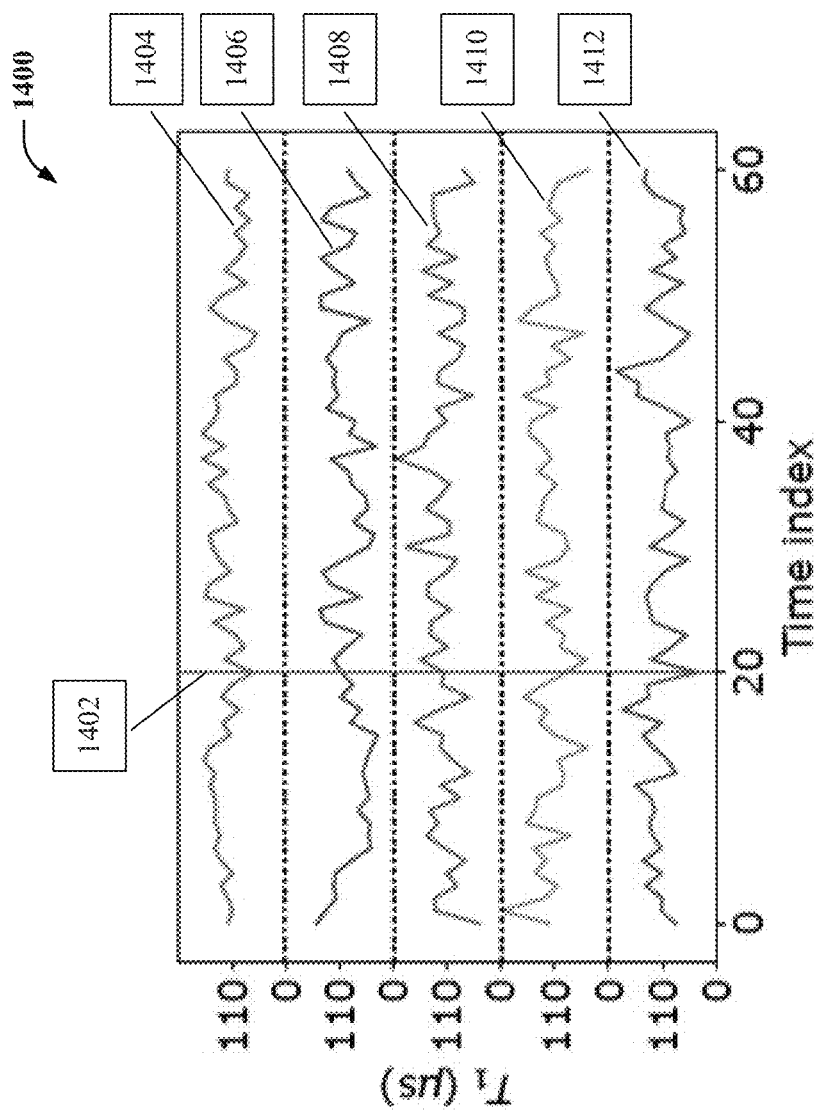
FIG. 14A illustrates a schematic graph pertaining to qubit $T_1$ responses to shift in qubit frequencies in accordance with one or more embodiments described herein.
Figure 14B:
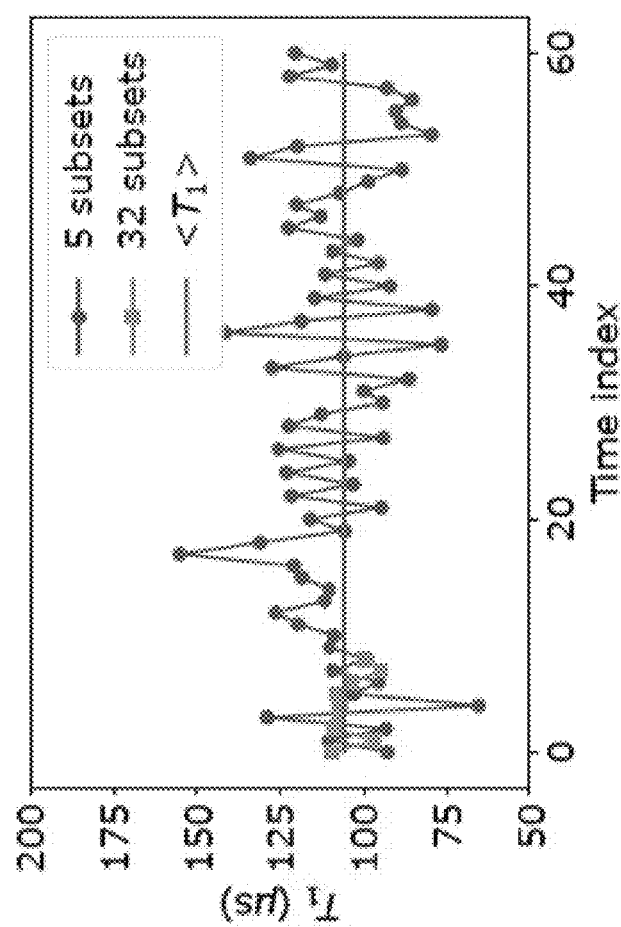
FIG. 14B illustrates ensemble average dependence on time index for 5 subset and 32 subset partitions, in accordance with one or more embodiments described herein.
Figure 14C:
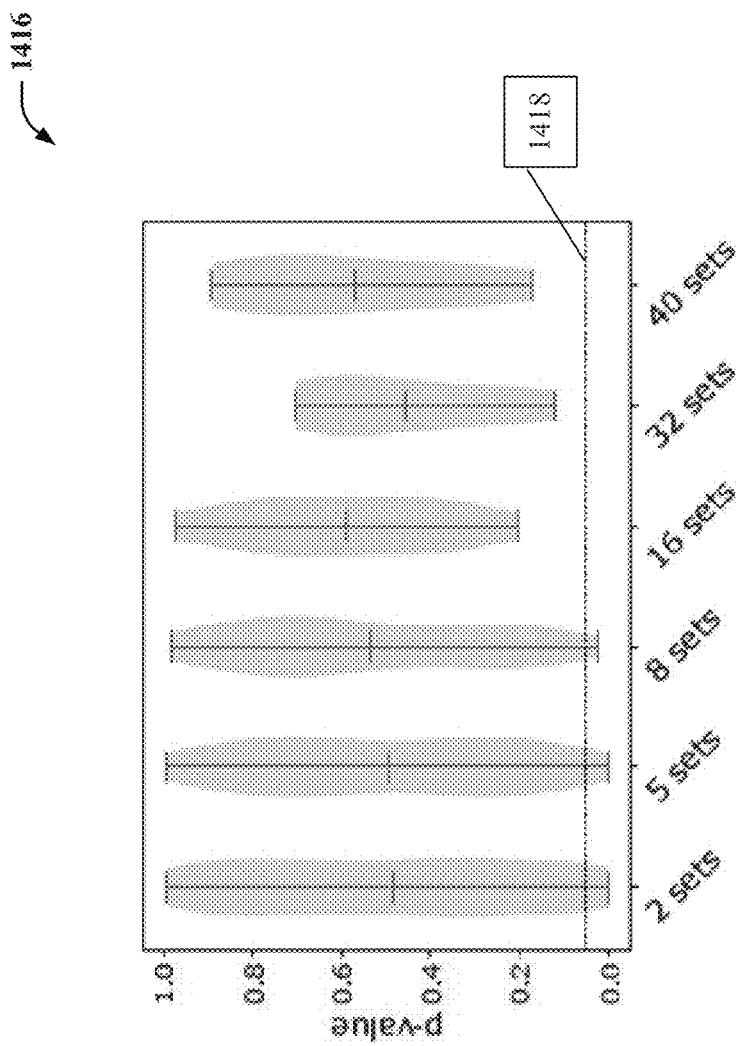
FIG. 14C illustrates violin plot results of t-tests for different system choices in accordance with one or more embodiments described herein.

Turning now to FIGS. 14A-14C and Appendix F, ergodicity of $T_1(\omega_q, T_i)$ time series can be discussed in greater detailed. FIG. 14A illustrates a schematic graph 1400 pertaining to qubit $T_1$ responses to shift in qubit frequencies in accordance with one or more embodiments described herein. Repetitive description of like elements and/or processes employed in respective embodiments is omitted for sake of brevity.

Appendix F—Ergodicity of $T_1(\omega_q, T_i)$ Time Series

FIG. 14A illustrates a k=5 systems (i.e., subsets) formed from the $Q_{13}$ time series, wherein plots 1404, 1406, 1408, 1410 and 1412 are representative of the individual systems. The $T_1(T_i)$ measurements are re-indexed to form equal sized subsets with a new maximum index, m. of $m_{max}$=61. An ensemble, a set of 5 points in this case, is formed from the subsets for each m time index. For example, vertical line 1402 can represent one ensemble $\{T_{1,k}(T_m=20)\}$.

A $T_1$ time series can be considered to behave ergodically if the time series $T_1(T_i)$ converges to a $\langle T_1 \rangle$ (e.g., after sufficient time lag) and the pair correlations are well behaved (e.g., decay at long lag). Ergodicity can not be guaranteed, drift or $1/f^\alpha$ behavior being illustrative reasons to doubt whether a reliable long time estimator of a physical property can be obtained. Since breaking of ergodicity can signal physical phenomena of interest such as switching between phases (i.e., isolated systems of an ensemble) with distinct mean values including special cases of spectral diffusion, establishment of whether the $T_1$ time series behaves ergodically can represent a significant step in clarifying the dynamics of the $T_1$ fluctuations.

The ergodic assumption is that given sufficient time a system will visit through all the accessible states (i.e., values) available to it. Such a sufficiently long time series trajectory can then be divided into k independent subsets to form an ensemble of k new systems that can represent the statistical behavior of the original system at any given time index, m of the k systems as illustrated in FIG. 14A. The new time series of the systems can be re-indexed, m, with equal lengths. An ensemble average can be defined by selecting from the same time index for all equally sized subsets according to the following equations.

$$\{T_1(T_m)\} = \frac{1}{k}\sum_k T_1(T_m)^{(k)} \bigg| m = \text{constant}. \qquad \text{Equation 22}$$

and for an ergodic system,

Equation 23: $\{T_1(T_m)\} = \langle T_1 \rangle \cong \langle T_1 \rangle_T$ when averaging across the ensemble of newly defined systems for any time index i. The approximately 9 month $T_1$ time series for ergodic behavior was tested. Autocorrelation of the different qubit time series shows some correlation over 1-2 days (i.e., first several measurements), as described in Appendix D. We examine a range of ensembles of size, $2 \leq k_{max} \leq 40$ containing $160 \geq m_{max} \geq 5$ time points, respectively.

Turning now to FIGS. 14B and 14C, FIG. 14B illustrates ensemble average dependence on time index for 5 subset and 32 subset partitions, in accordance with one or more embodiments described herein. FIG. 14C illustrates violin plot results of t-tests for different system choices in accordance with one or more embodiments described herein. Repetitive description of like elements and/or processes employed in respective embodiments is omitted for sake of brevity.

Ensemble averages are distributed around the time average $\langle T_1 \rangle_T$ as illustrated in graph 1416 of FIG. 14B. A likelihood of $\{T_1(T_m)\}$ being statistically indistinguishable from $\langle T_1 \rangle_T$ can be tested using a t-test comparison of the mean values of the two $T_1$ estimators. Results for $Q_{13}$ as an example of the analysis are illustrated in FIG. 14C. FIG. 14C illustrates graph 1416 that describes violin plot results of t-tests for different system choices, $k_{max}$. More systems in the ensemble, $k_{max}$, correspond to shorter time series. The dotted line 1418 can indicate a p-value of 0.05. In general the ensemble means can be statistically indistinguishable from the means generated over about 9 months, that is, $\{T_1\} \sim \langle T_1 \rangle_T$. Similar results can be observed for the remaining odd qubits.

Statistical tests of independence of the subsets were also investigated. The overall conclusions were not changed when subsets were rejected from the ensemble based on failing statistical independence tests (i.e., the non-parametric Wald-Wolfowitz runs test) as the majority of subsets were found independent to the limits of the sensitivity of the runs test.

Turning now to FIGS. 15, 16A, and 16B, and Appendix G, ergodicity of ensemble averaging of $T_1(\omega, t_i)$ can be discussed in greater detailed. FIG. 15 illustrates a graph 1500 demonstrating autocorrelation of a qubit for a negative Stark shift in accordance with one or more embodiments described herein. Repetitive description of like elements and/or processes employed in respective embodiments is omitted for sake of brevity.

Appendix G—Ergodicity of Ensemble Averaging of $T_1(\omega, t_i)$

Graph 1500 illustrates autocorrelation of $Q_3$ at t=0. The autocorrelation is for negative Stark shift only. The autocorrelation is normalized and mean value detrended. The inset graph illustrates a schematic of the formation of an ensemble average. $\{T_1\}$, marked by line 1502, from a set of $T_1(\omega_q+\omega_j, t_i)$ spaced by a frequency $\chi$ to minimize correlation between the $T_1$ values and sampling a range, $\Delta\omega$.

As discussed in Appendix B, the $T_1$ time series of the qubits was found to be generally weakly stationary as well as behaving ergodically (Appendix F). The time series $T_1(\omega_q+\omega_j, t_i)$ can also be expected to behave as a weakly stationary ergodic time series as there is nothing uniquely distinctive about the frequency $\omega_q$. Further, the sums and averages of neighboring time series can be expected to be weakly stationary and ergodic.

For frequencies close to $\omega_q$, $\lim_{\omega_j \to 0} \langle T_1(\omega_q+\omega_j) \rangle \to \langle T_1 \rangle_T$ can be assumed. Equation 24 can represent an accurate $\langle T_1 \rangle_T$ estimator that can be formed from an ensemble of neighboring $T_1(\omega_q+\omega_j, t_i)$ values.

$$\{T_1(t_i)\} = \frac{1}{S}\sum_{j=0}^{S} T_1(\omega_q + (j\chi - \Delta\omega), t_i \approx \langle T_1(\omega_q) \rangle_T, \quad \text{Equation 24}$$

where S can represent the number of frequencies at which $T_1$ is sampled to form an ensemble estimator; $\chi$ can represent the frequency spacing of sampling in a single scan (e.g., paragraphs starting at or FIG. 15 inset); and $\Delta\omega$ can represent the maximum frequency range sampled, parameterized by $\chi$ as $$\Delta\omega = \frac{(S-1)}{2}\chi$$

(e.g., paragraphs starting at [00196]).

To develop a heuristic for $\chi$, a minimum frequency spacing $w\omega_j - \omega_{j+1}$ can be chosen that produces approximately independent $T_1(\omega_q+\omega_j, t_i)$s in the ensemble average of $\{T_1(t_i)\}$ (i.e., weak correlation with neighboring $T_1(\omega_q+\omega_{j\pm1}, t_i)$). The correlation between frequencies calculated to identify a $\chi$ that reduces the correlation below about 0.2. An illustrative example of the autocorrelation of Stark shifted frequencies, $\langle T_1(\omega, 0)T_1(\omega+\omega_{tag}, 0) \rangle$, for $Q_3$ is shown in FIG. 15. The autocorrelation can show a fall off to weak correlation over about 1-2 MHz centered around a value of $\omega_{tag}$ approximately equal to 0 for a single time index. Similar magnitude fall offs were observed for all qubits examined. This can suggest a heuristic spacing of $\chi \cong 1-2$ MHz to obtain weakly correlated $T_1(\omega_q+w_j)$ with $T_1(\omega_q)$.

Further, FIGS. 16A and 16B illustrate schematic graphs 1600 and 1610, respectively, pertaining to qubit $T_1$ responses to shift in qubit frequencies in accordance with one or more embodiments described herein.

Graph 1602 illustrates dependence of mean estimator error on $\Delta\omega$ using a frequency spacing of $\chi=2$ MHz. The $\Delta\omega$ shown are ±2 MHz (at 1605), ±4 MHz (at 1606), +6 MHz (at 1607), +10 MHz (at 1608) and ±15 MHz (at 1609). Graph 1604 illustrates probability, out of 75 t-tests, that $\{T_1\}$ and $\langle T_1 \rangle_T$ are found indistinguishable as a function of range $\Delta\omega$ using a frequency step. $\chi=2$ MHz. The As are +2 MHz (1625), +4 MHz (1626), +6 MHz (1627), ±10 MHz (1628) and +15 MHz (1629).

The sensitivity of the error in the $\{T_1\}$ estimator to changing $\Delta\omega$ using $\chi=2$ MHz can be empirically tested. The $\{T_1\}$ estimator error for each qubit can be defined as as, $$\frac{|\{T_1(t_i)\} - \langle T_1 \rangle_T|}{\langle T_1 \rangle_T}.$$

The error dependence, averaged over the 75 time steps for different $\Delta\omega$ (i.e., different $\chi$), is illustrated in graph 1602 of FIG. 16A. Notably the qubits have different dependencies on increasing $\Delta\omega$. No single $\Delta\omega$ can be optimal for every qubit. The differences between qubits can help explain the complex $\langle R(\Delta\omega) \rangle_{t_{o \to n}}$ dependence illustrated in FIG. 8B. The underlying cause for the differences can perhaps be related to the details of the local spectral diffusion for each qubit. The nearly 1:1 relationship can be further supported by measurements on other devices (Appendix K).

Subsequently, the equivalency $\{T_1\} \cong \langle T_1 \rangle_T$ can be evaluated. The 75 $\{T_1\}$ distributions for each qubit can be compared to the $\langle T_1 \rangle_T$ time series distributions using a t-test. Many of the 75 time indexed $\{T_1(t_i)\}$s can be statistically indistinguishable but many are not. The probability of $\{T_1\}$ being indistinguishable from $\langle T_1 \rangle_T$ is shown in graph 1604 of FIG. 16A.

FIG. 16B illustrates a histogram of $T_1$ measured at frequency steps of 2 MHz over $\Delta\omega=\pm15$ MHz for $Q_7$ at graph 1612, plot 1616. Overlaid are the $T_1(T_i)$ measurements from the approximately 9 month time series. Normal fits for both distributions are shown in solid lines. Graph 1614 illustrates $\{T_1\}$ as a function of $\langle T_1 \rangle_T$ for each qubit. One sigma standard deviations of the distributions are shown as error bars for each $\{T_{1j}\}$. $\Delta\omega=\pm 6$ MHz and $\chi=2$ MHz.

Figure 17A:
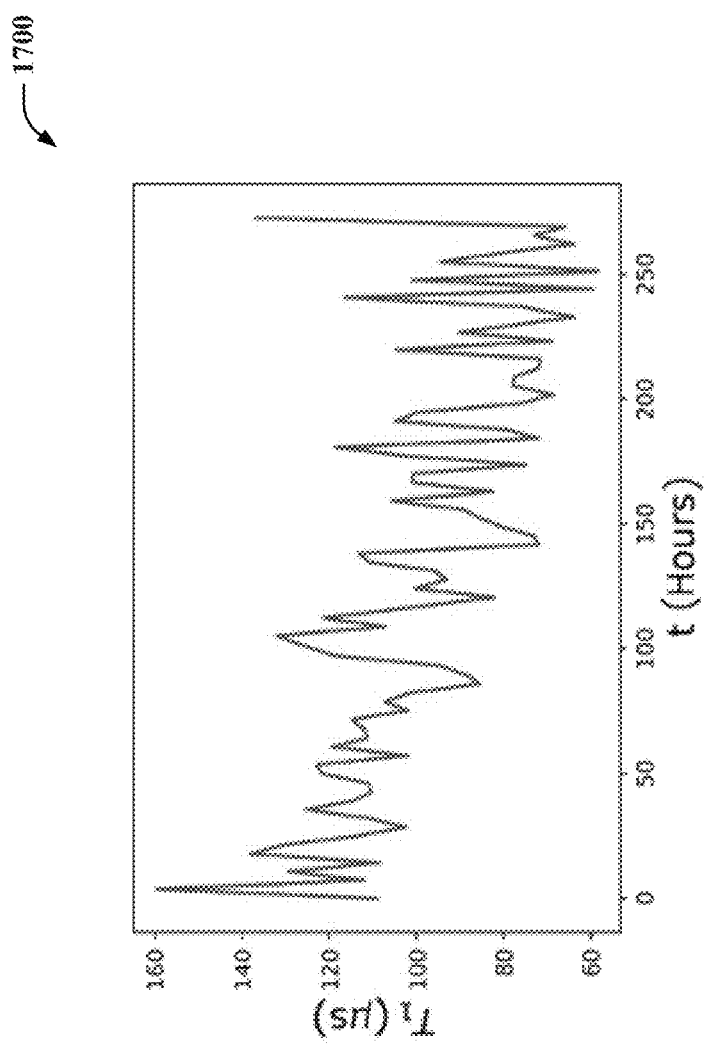
FIG. 17A illustrates $T_1$ time series calculated from $P_1$ spectroscopy for a qubit at zero frequency shift in accordance with one or more embodiments described herein.

The proximity of the estimator can be illustrated by showing the combined distribution of the 75 means for $Q_7$ of graph 1612 over about 270 hours. The means, $\{T_1(t_i)\}$ and $\langle T_1 \rangle_T$, can be within a few μs, less than a σ, but the null hypothesis (i.e., indistinguishable) can be rejected because the distributions can be sufficiently different. It can be possible for the overall $\{T_1\}$ distribution to converge accumulating over a longer time. About 270 hours can be insufficient for all the $T_1(\omega_q+\omega_j, t_i)$ time series to unambiguously converge around a mean value as illustrated in FIG. 17A in appendix 19. Using longer periods of time to measure $\langle T_1(\omega_q+\omega_j) \rangle$ can therefore potentially lead $\{1\}$ to be more strictly ergodic.

Empirically, $\Delta\omega \leq 10$ MHz can produce $\{T_1(t_i)\}$ distributions that can be more likely to pass the t-test. The R values can also be slightly better ranging from 0.89 to 0.91, reflecting that regardless of choice we find $\{T_1\} \cong \langle T_1 \rangle_T \pm \sigma$. For illustration, the $\langle T_1 \rangle_T$, $\{T_1(t_i)\}$ pairs for $\Delta\omega=\pm 6$ MHz and $\chi=2$ MHz can be illustrated in plot 1618 of graph 1614, which has a Pearson R=0.91. A very reliable 1:1 relationship can be observed in many other qubits measured on specific devices see Appendix K.

Thus, the equivalency $\{T_1\}$ with $\langle T_1 \rangle_T$ can be summarized as. $\{T_1\} \cong \langle T_1 \rangle_T \pm \sigma$. More statistically rigorous comparison by t-test can indicate that $\{T_1(\Delta\omega, \chi)\}$ can be more quasi-ergodic than strictly ergodic as it can produce indistinguishable estimates of $\langle T_1 \rangle_T$ for less than 100% of the ensembles. The quasi-ergodic results were found for $\chi$ and $\Delta\omega$ that were heuristically chosen and applied to all qubits. Individually optimized $\chi$ and $\Delta\omega$ can reduce disagreement and can be expected to become fully ergodic, certainly in the limit of $\Delta\omega, \chi \to 0$ converging trivially on the single time series $T_1(\omega_q, t_i)$. Optimal choices to achieve full ergodocity, while minimizing the number of measurements (e.g., total time to obtain the $T_1$ estimator), are left for future work. It can be speculated that this can include forming an ensemble average with a physical model guided weighting of the $j^{th}$ elements of $\{T_1(\omega_q+\omega_j)\}$. For immediate application of this approach, similar magnitude $\Delta\omega$ and $\chi$ values can be applied to other devices with the expectation that similar magnitude R values will be obtained as the R value is not strongly sensitive to the detailed choice of $\Delta\omega$ and $\chi$ (appendix 22).

Figure 17B:
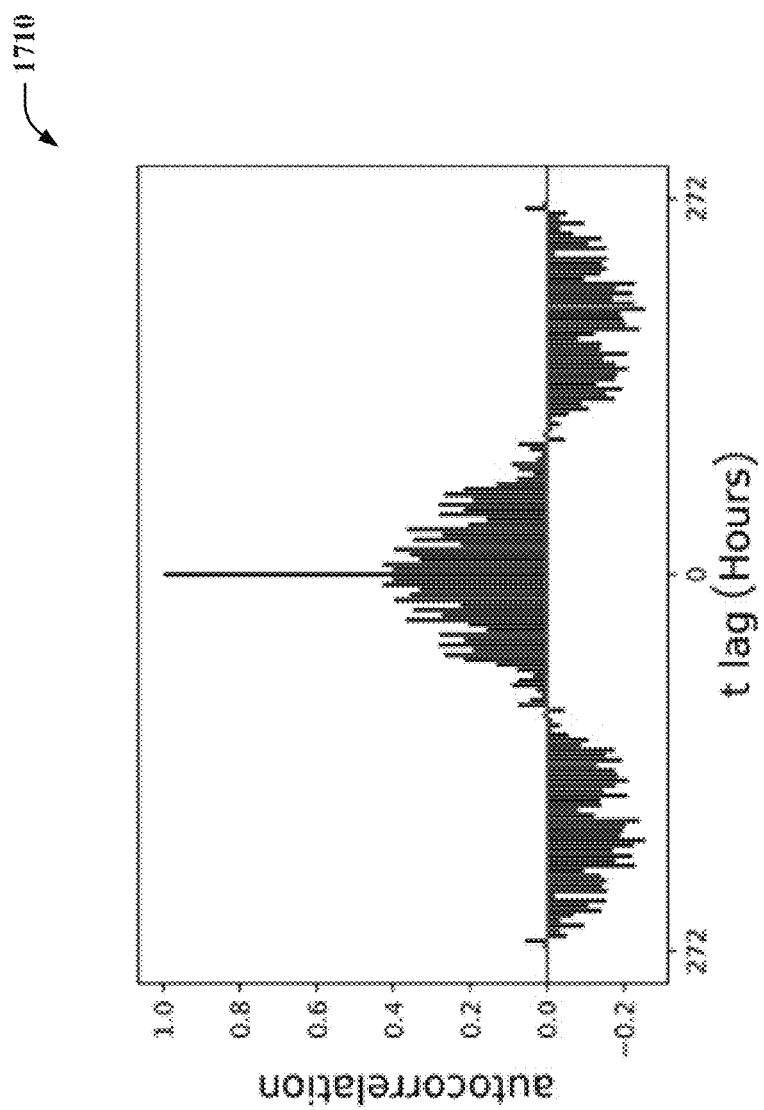
FIG. 17B illustrates autocorrelation of the qubit time series $T_1$ in accordance with one or more embodiments described herein.
Figure 17C:
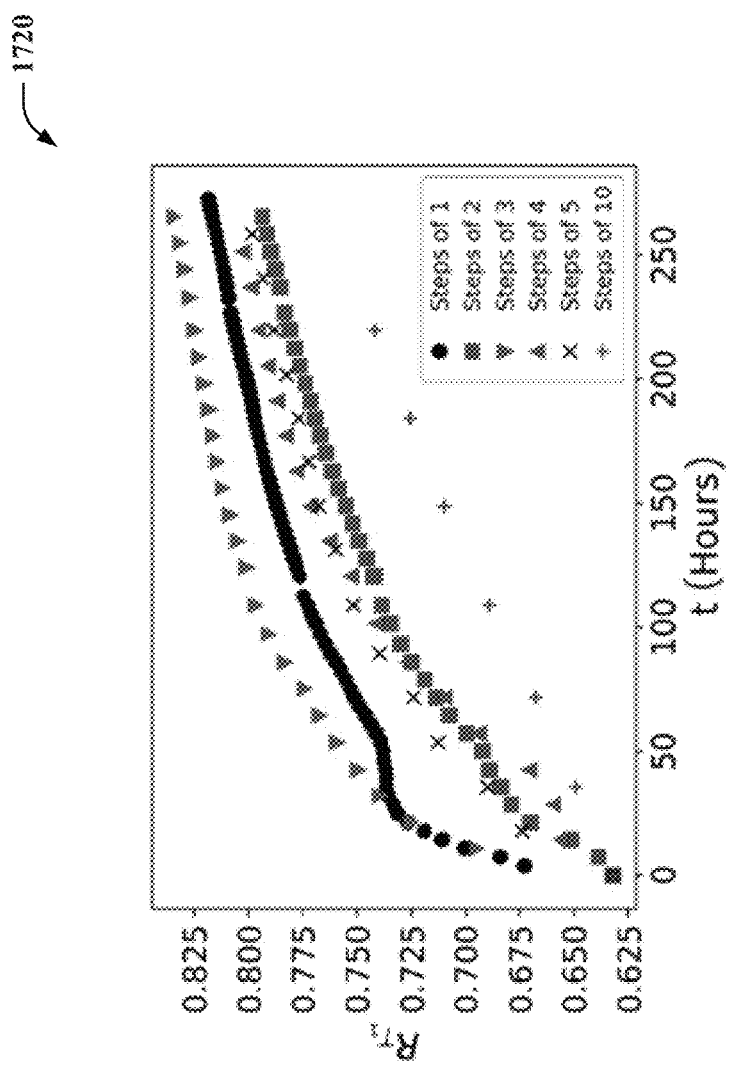
FIG. 17C illustrates Pearson R correlation between the odd qubits $T_1$ in accordance with one or more embodiments described herein.

Turning now to FIGS. 17A-17C and Appendix H, $R_{T_1}$ time dependence estimate from spectroscopy can be discussed in greater detailed. FIG. 17A illustrates $T_1$ time series calculated from $P_1$ spectroscopy for a qubit at zero frequency shift in accordance with one or more embodiments described herein. FIG. 17B illustrates autocorrelation of the qubit time series $T_1$ in accordance with one or more embodiments described herein. FIG. 17C illustrates Pearson R correlation between the odd qubits $T_1$ in accordance with one or more embodiments described herein. Repetitive description of like elements and/or processes employed in respective embodiments is omitted for sake of brevity.

Appendix H—RTI Time Dependence Estimate From Spectroscopy

FIG. 17A illustrates $T_1$ time series calculated from $P_1$ spectroscopy for $Q_{15}$ at zero frequency shift in graph 1700. FIG. 17B illustrates in graph 1710, autocorrelation of the $Q_{15}$ time series shown in graph 1700 of FIG. 17A detrended with the mean and using padded zeros at the end of the time series to maintain a constant number of elements for all negative and positive lags (i.e., see online documentation for numpy.correlate). FIG. 17C illustrates Pearson R correlation between the odd qubits $T_1$ from spectroscopy and $\langle T_1 \rangle_T$ in graph 1720. The autocorrelation is done for every time points or intervals as indicated in the legend.

Autocorrelation of $T_1$ from the data of FIGS. 6 and 9 at $\Delta\omega_q=0$ MHz. The $T_1$ time series illustrated in graph 1700 for each of the qubits can be deduced per equation 2 with τ=50 μs being the $T_1$ delay time, and $P_1(\Delta\omega_q=0)$ is the measured probability of being in the $|1\rangle$ state at time t at the bare qubit frequency.

Autocorrelation of the time series in many of the qubits can show decaying correlation over the first 10-30 hours followed by weaker autocorrelation at longer times consistent with the longer $T_1$ series from the data set of about 9 months. This is illustrated by FIG. 17B. The autocorrelation is detrended with the mean and normalized to its estimated variance. Some qubits appear to have longer term drifts (Appendix D).

The Pearson R correlations can be calculated to the odd qubit $\langle T_1 \rangle_T$ in FIG. 17C. The correlations are illustrated for time series for different intervals of time available in the data set. This is to highlight the effects of correlation. For example, if the interval in time is doubled in an uncorrelated time series, it can double the time to achieve the same R value on average. However, if there are strong correlations, increasing the interval times can decrease the time needed to achieve the same R value. Achieving an R value of about 0.8 can require order of days or longer if the best interval is unknown. The dependence on interval times can vary some depending on the frequency used for the $P_1$ data. The autocorrelation can hamper achieving strong correlation (i.e., for an R value of about 0.8) in times shorter than 1-2 days.

Figure 18:
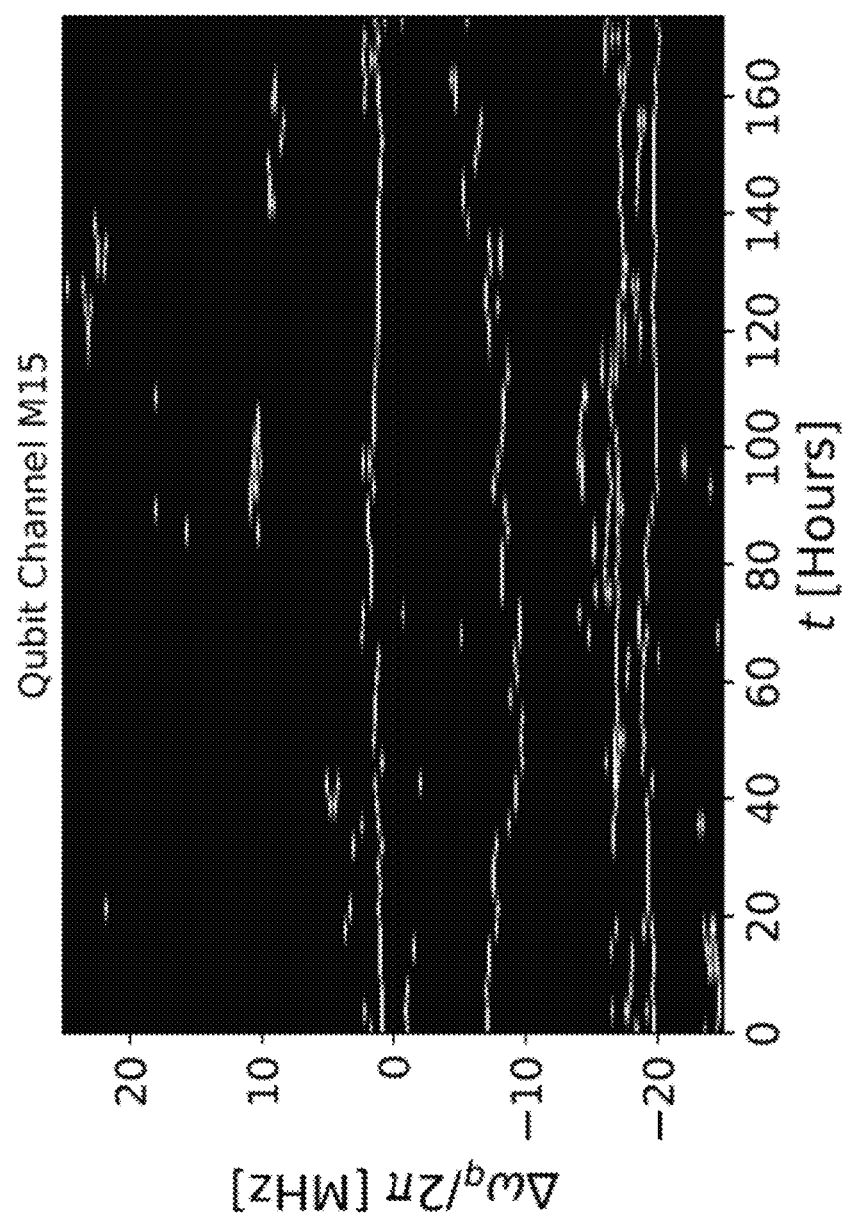
FIG. 18 illustrates a graph demonstrating peak locations of two-level systems (TLSs) using a binary filtered replot of a qubit in accordance with one or more embodiments described herein.
Figure 19:
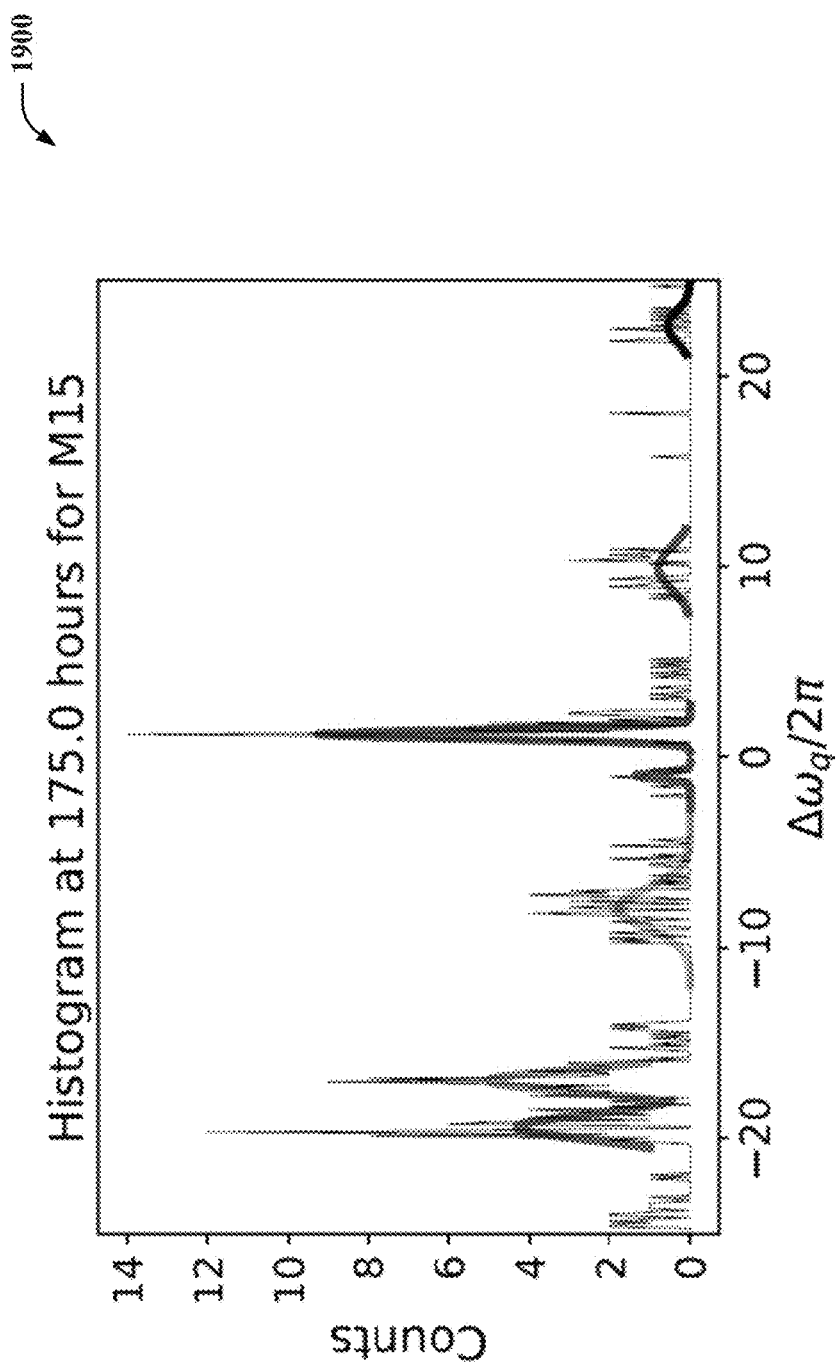
FIG. 19 illustrates a graph demonstrating a histogram of two-level system (TLS) positions from FIG. 18 in accordance with one or more embodiments described herein.

Turning now to FIGS. 18 and 19, and Appendix I, time dependence of TLS linewidths can be discussed in greater detailed. FIG. 18 illustrates a graph 1800 demonstrating peak locations of TLSs using a binary filtered replot of a qubit in accordance with one or more embodiments described herein. Repetitive description of like elements and/or processes employed in respective embodiments is omitted for sake of brevity.

Appendix I—Time Dependence of TLS Linewidths

FIG. 18 illustrates peak locations of TLSs using a binary filtered replot of $Q_{15}$ with a $P_1=0.315$ threshold at a delay of 50 μs.

Time dependence of TLS position in frequency being a topic of interest, a linewidth (i.e., a width of distribution of distribution of TLS positions over time) can be, for example, suggested to depend on the volume density of thermal fluctuators (TF). TFs can be defined as low energy TLSs (i.e., $E_{TLS} \leq kT$). They are so named because their configurations can dynamically change in time due to thermal excitation, resulting in a bath coupling to the higher energy TLSs (e.g., $E_{TLS} \sim \hbar\omega_q$) that can produce a TLS spectral diffusion. A linewidth time dependence can, therefore, be expected to depend on the TF density and coupling strength. A reference and comparison to previous TLS linewidth characterization is discussed herein and TLS linewidths for $Q_{15}$ are presented.

The spectroscopy can produce a discrete function of $P_1$ bins, $P_1(\omega,\tau,t)$. To track the time evolution of the TLS position, each minima of a significant dip in $P_1$ can be putatively associated with a TLS. A position of each min $(P_1(\omega,\tau,t))$ can be found and the location for each time slice can be recorded. Only the TLS position is recorded if min($P_1$) is below a threshold, $P_{th}$, of 0.315 to remove spurious markers of TLS location due to smaller fluctuations in $P_1$ (i.e., strong focus is on coupled TLSs). The threshold of $P_{th}$=0.315 can correspond to a $T_1$<43 μs. The threshold can be chosen by visual inspection to best minimize spurious points. The resulting TLS tracks are illustrated in FIG. 18. White can indicate a min($P_1(\omega,\tau,t)$). Similar qualitative behavior can be observed in other qubits, for example, during, spectroscopy of odd qubits, as discussed in one or more embodiments herein (Appendix A).

Further, FIG. 19 illustrates a graph 1900 demonstrating a histogram of two-level system (TLS) positions from FIG. 18 in accordance with one or more embodiments described herein. The distribution of TLS positions are fit to Gaussians. The range over which the fit was done is indicated by the truncation points of the Guassians.

A linewidth can be crudely estimated by a cumulative histogram of the TLS positions as a function of time. The resulting histogram for $Q_{15}$ is illustrated in FIG. 19. Time dependence of spectral diffusion linewidths can be fit with a normal distribution, althought other functional forms can also be predicted. To obtain a simple quantitative description of the linewidth and time dependence, a phenomenological model of a normally distributed peak position can be followed, fitting each linewidth with a Gaussian and reporting the standard deviations, σ, in Table 4. Assuming a standard one-dimensional model as in equation 25, diffusivities $D_{1d}$ can be observed.

Equation 25: $C(t)=Ne^{((\Delta\omega_q-\mu)^2/4\sigma(t)^2)}$, where C can represent counts, t can represent time, σ can represent the standard deviation of the distribution, μ can represent the center frequency, N can represent a fitting constant and for one-dimensional diffusion, $\sigma(t)=\sqrt{2D_{1d}t}$. The spectral diffusion can visually appear to be of the same order of magnitude for $Q_{15}$ as the other qubits, however, the values in Table 4 are representative of the order of magnitude of Ds for the device. $D_K$ can be calculated (e.g., by using $\sigma(t)=2D_Kt^{0.5}$) to provide rapid comparison to the extracted diffusivity and modeling in the respective experiment. While diffusivities can be associated to individual features that can be tracked over time, in an effective ensemble diffusivity, a single value fit to consolidated linewidths of a specific number of TLSs (e.g., thirteen TLSs) can be estimated.

Simulations of TLS spectral diffusion can offer a suggestive and appealing link between TF volume densities and $D_K$. Despite differences in analysis, $D_K$s can, for the most diffusive TLSs, be over an order of magnitude smaller (e.g., 2.5 MHz $(hr)^{0.5}$), which can be be interpreted as lower thermal fluctuator densities. However, this can be a dubious conjecture. Doubts can include: the model assumption of a time dependence of $\propto\sqrt{t}$; the related model assumption of an unbounded random walk of the TLS; and differences in the details of the temperature, between two experimental setups, which can potentially lead to differing numbers of active fluctuators. Different time dependencies can indeed be expected (e.g., for different time regimes or dominant bath couplings). Perhaps more significantly, the linewidths can likely be truncated due to distance attenuated coupling mechanisms in the bath (e.g., dipole coupling to thermal fluctuators). The assumption of ever increasing σ(t) can lead to significant disagreement (i.e., for cases of longer time intervals of collection). Therefore, the experiments discussed herein do not presently put substantial weight on the comparison of extracted diffusivities until a more complete understanding of the linewidth time dependence can be established.

Table 4: Estimated standard deviations for each of the TLS peak distributions after 175 hours and diffusivities following ref. $D_K$ or a one-dimensional diffusivity $D_{1d}$.

TABLE 4

| Position (MHz) | σ (MHz) | $D_K$ (MHz hr$^{-0.5}$) | $D_{1d}$ (MHz² hr$^{-1}$) |
|---|---|---|---|
| −19.3 | 0.65 | 2.4 × 10$^{-2}$ | 1.1 × 10$^{-3}$ |
| −16.9 | 0.55 | 2.6 × 10$^{-2}$ | 0.8 × 10$^{-4}$ |
| −7.9 | 1.06 | 3.9 × 10$^{-2}$ | 3.1 × 10$^{-3}$ |
| −0.97 | 0.16 | 6.1 × 10$^{-3}$ | 7.3 × 10$^{-5}$ |
| 1.2 | 0.23 | 8.6 × 10$^{-3}$ | 1.4 × 10$^{-4}$ |
| 9.9 | 1.03 | 3.1 × 10$^{-3}$ | 3.0 × 10$^{-3}$ |
| 22.6 | 0.78 | 3.0 × 10$^{-2}$ | 1.7 × 10$^{-3}$ |

Additional challenges to the accuracy of linewidth analysis of individual TLSs, beyond the limits of validity of the one-dimensional model, can comprise dips that can overlap in ambiguous ways and potential uncertainty in assignment of positions related to other TLS-like features that migrate through the frequency region of interest. For example, FIG. 18 illustrates at least one other weaker dip that weaves between the two prominent ones in the −15 to −20 MHz range.

Turning now to Appendix J, measurement details of the 20 qubit device can be discussed in greater detailed.

Appendix J—Qubit Measurement Details

The 20 qubit device was a deployed system with cloud access. A daily calibration was done, which included $T_1$ measurement. A database recorded calibration measurements and the measurement times. Some additional measurements were added to the database due to custom checks and recalibration of qubits that were outside of the daily calculations. The database was queried for approximately 10 months (2019 Sep. 13 to 2020 Jul. 15).

The $T_1$ measurement was done for 41 time points logarithmically spaced up to 500 μs using 300 shots per time point. A simple exponential fit was made to the decay. The TLS spectroscopy was done using 501 frequency points per direction of Stark shift with 1000 repeated iterations for each point. The repetition time was 1 ms. This time can be substantially reduced with faster reset of the initial state.

Figure 20:
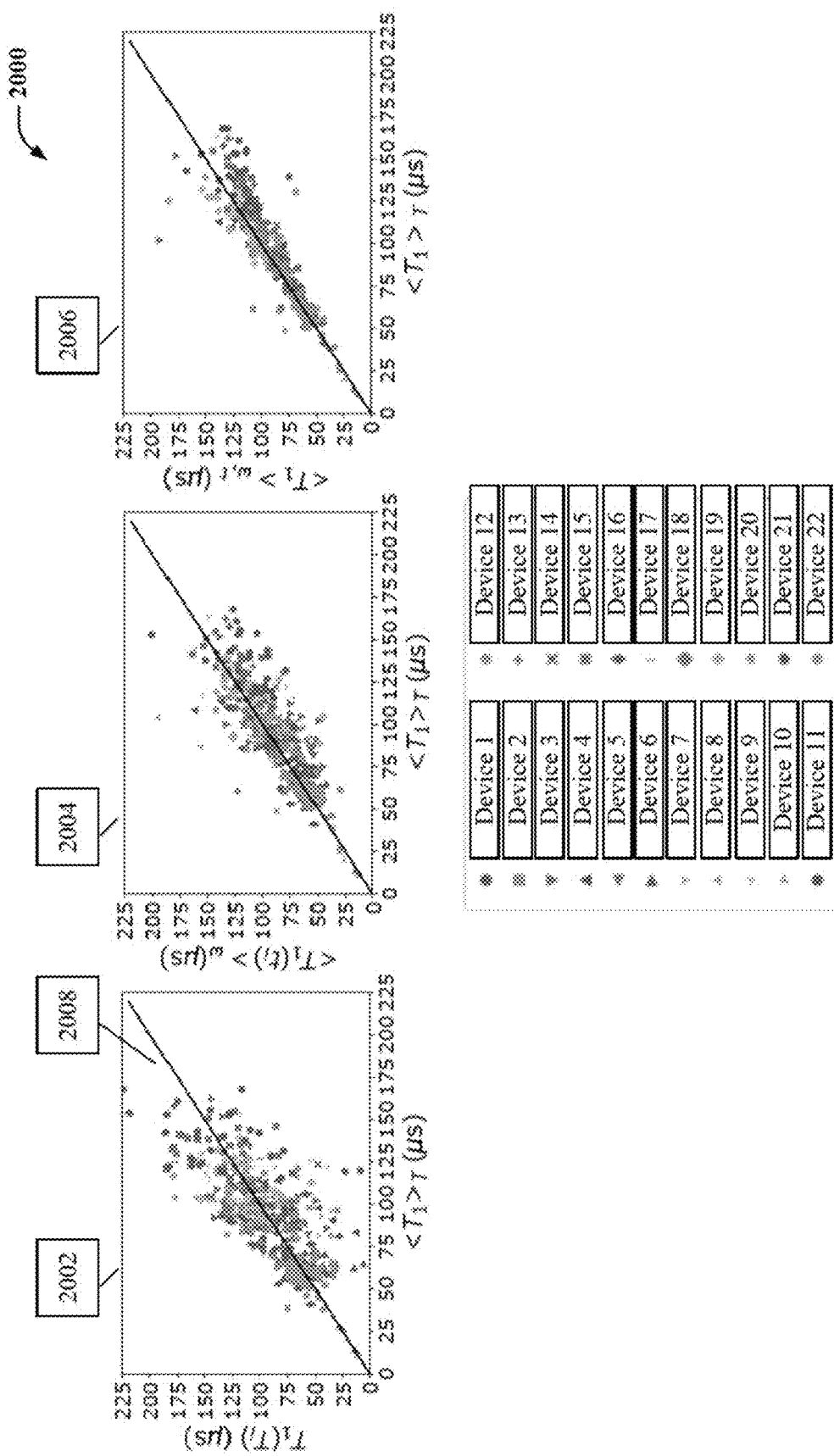
FIG. 20 illustrates a set of graphs demonstrating comparison of long time averages for 458 qubits to a single $T_1$ measurement in accordance with one or more embodiments described herein.

Turning now to FIG. 20 and Appendix K, supporting evidence for 1:1 correlation between $\langle T_1\rangle_{\omega,t}$ and $\langle T_1\rangle_T$ can be discussed in greater detailed. FIG. 20 illustrates a set of graphs 2000 demonstrating comparison of long time averages for 458 qubits to a single $T_1$ measurement in accordance with one or more embodiments described herein. Repetitive description of like elements and/or processes employed in respective embodiments is omitted for sake of brevity.

Appendix K—Supporting Evidence of 1:1 Correlation Between $\langle T_1\rangle_{\omega,t}$ and $\langle T_1\rangle_T$ FIG. 20 can illustrate scatter plots of $\langle T_1\rangle_T$ compared to different estimators for 458 qubits from devices listed in table. Graph 2002 illustrates a comparison of $\langle T_1\rangle_T$ to a single $T_1(T_i)$ measurement for each qubit randomly selected from the $T_1$ time series. Graph 2004 illustrates $\langle T_1(T_i)\rangle_\omega$ estimated from $P_1(\omega_q+\omega_j, t_i)$ measurements for a spectroscopy scan at a randomly selected time, $t_i$, in the spectroscopy time series. Graph 2006 illustrates $\langle T_1 \rangle_{\omega,t}$ averaging over all scans available. The duration of the time series for each device is illustrated in table 5. The Pearson Rs for the three cases are 0.72, 0.82 and 0.91, respectively.

Additional evidence that $\langle T_1 \rangle_{\omega,t}$ is a 1:1 estimator of $\langle T_1 \rangle_T$ can be provided by compiling long time averages $\langle T_1 \rangle_T$ for 458 qubits and comparing them to a single $T_1$ measurement in graph 2002 to provide an illustrative example of statistical spread and resulting R value. A 1:1 guide 2008 is overlaid and a Pearson R of 0.72 is measured for the single $T_1$ estimator of $\langle T_1 \rangle_T$ for this instance. The length of the time series of daily $T_1$ measurements depends on the amount of time the device was deployed. The total time duration over which the $T_1$ measurements were done are indicated in table 5.

In contrast, graph 2004 illustrates $\langle T_1(t_i, n=1) \rangle_{\omega,t}$ measured from a single spectroscopy scan of each of the qubits randomly selected in the spectroscopy time series of measurements taken approximately every 6 hours. For the spectroscopy measurements, the $\omega_s$=+80 MHz and drive amplitude was swept to a fixed amplitude in both the negative and positive shifts, resulting in a total $\Delta\omega$ of about 25 MHz. Each qubit shifts slightly differently due to differences such as line attenuation. The R value between $\langle T_1(t_i) \rangle_\omega$ and $\langle T_1 \rangle_T$ was 0.82. Visually, a tighter concentration around a one-to-one correspondence with $\langle T_1 \rangle_T$ can be observed from the $\langle T_1 \rangle_{\omega,t}$ estimator than relying on single $T_1$ measurements, consistent with observations made in the main text.

Convergence of $\langle T_1(n) \rangle_{\omega,t}$ with $\langle T_1 \rangle_T$ was also examined averaging over the duration of available ~6 hour repeated spectroscopy measurements for each device. The time series durations for the spectroscopy, tmax, are indicated for each device in table 5. The R value improves to 0.91. The source of residual disagreement likely comes in part from the lack of custom optimization of $\Delta\omega$ and best choice of weighting of $T_1$ ($\omega_q+\omega_j$, $t_i$).

Table 5: Device numbers, number of qubits and the length of time series for the $T_1$ measurements, $T_{max}$, and Stark spectroscopy, $t_{max}$. The $T_1$ measurements are taken every 24 hours and the spectroscopy measurements are taken approximately every 6 hours.

TABLE 5

| Device | Qubits | $T_{max}$ (days) | $t_{max}$ (days) |
|---|---|---|---|
| 1 | 5 | 453 | 169 |
| 2 | 5 | 437 | 169 |
| 3 | 27 | 452 | 220 |
| 4 | 27 | 449 | 169 |
| 5 | 5 | 220 | 192 |
| 6 | 65 | 145 | 108 |
| 7 | 7 | 362 | 169 |
| 8 | 27 | 350 | 168 |
| 9 | 27 | 236 | 180 |
| 10 | 5 | 216 | 192 |
| 11 | 5 | 222 | 192 |
| 12 | 27 | 366 | 168 |
| 13 | 5 | 123 | 101 |
| 14 | 7 | 138 | 118 |
| 15 | 27 | 132 | 107 |
| 16 | 27 | 130 | 78 |
| 17 | 7 | 68 | 45 |
| 18 | 7 | 76 | 55 |
| 19 | 27 | 278 | 198 |
| 20 | 27 | 55 | 30 |
| 21 | 27 | 73 | 51 |
| 22 | 65 | 402 | 191 |

Figure 21A:
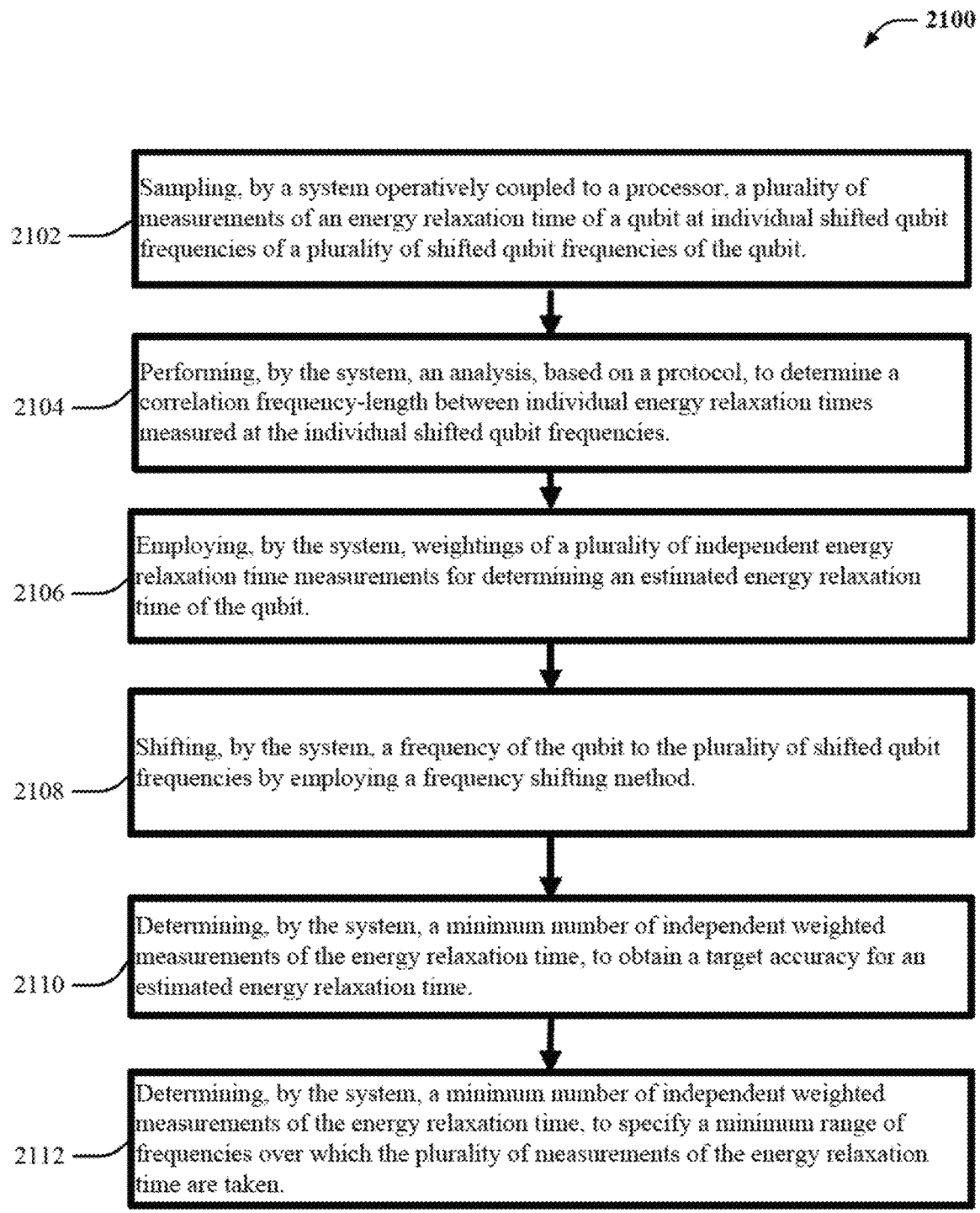
FIG. 21A illustrates a process flow for facilitating a process to determine an estimated energy relaxation time of a qubit, in accordance with one or more embodiments described herein.

Next, FIG. 21A illustrates a flow diagram of an example, non-limiting method 2100 that can enable analysis of qubit coherence parameters of a quantum system, in accordance with one or more embodiments described herein, such as the non-limiting system 200 of FIG. 2. While the non-limiting method 2100 is described relative to the non-limiting system 200 of FIG. 2, the non-limiting method 2100 can be applicable also to other systems described herein, such as the non-limiting system 100 of FIG. 1. Repetitive description of like elements and/or processes employed in respective embodiments is omitted for sake of brevity.

At 2102, the non-limiting method 2100 can comprise sampling, by a system (e.g., sampling component 248) operatively coupled to a processor, a plurality of measurements of an energy relaxation time of a qubit at individual shifted qubit frequencies of a plurality of shifted qubit frequencies of the qubit.

At 2104, the non-limiting method 2100 can comprise performing, by the system (e.g., analysis component 247), an analysis, based on a protocol, to determine a correlation frequency-length between individual energy relaxation times measured at the individual shifted qubit frequencies.

At 2106, the non-limiting method 2100 can comprise employing, by the system (e.g., weighting component 244), weightings of a plurality of independent energy relaxation time measurements for determining an estimated energy relaxation time of the qubit.

At 2108, the non-limiting method 2100 can comprise shifting, by the system (e.g., shifting component 212), a frequency of the qubit to the plurality of shifted qubit frequencies by employing a frequency shifting method.

At 2110, the non-limiting method 2100 can comprise determining, by the system (e.g., measurement component 242), a minimum number of independent weighted measurements of the energy relaxation time, to obtain a target accuracy for an estimated energy relaxation time. At 2112, the non-limiting method 2100 can comprise determining, by the system (e.g., measurement component 242), a minimum number of independent weighted measurements of the energy relaxation time, to specify a minimum range of frequencies over which the plurality of measurements of the energy relaxation time are taken.

Figure 21B:
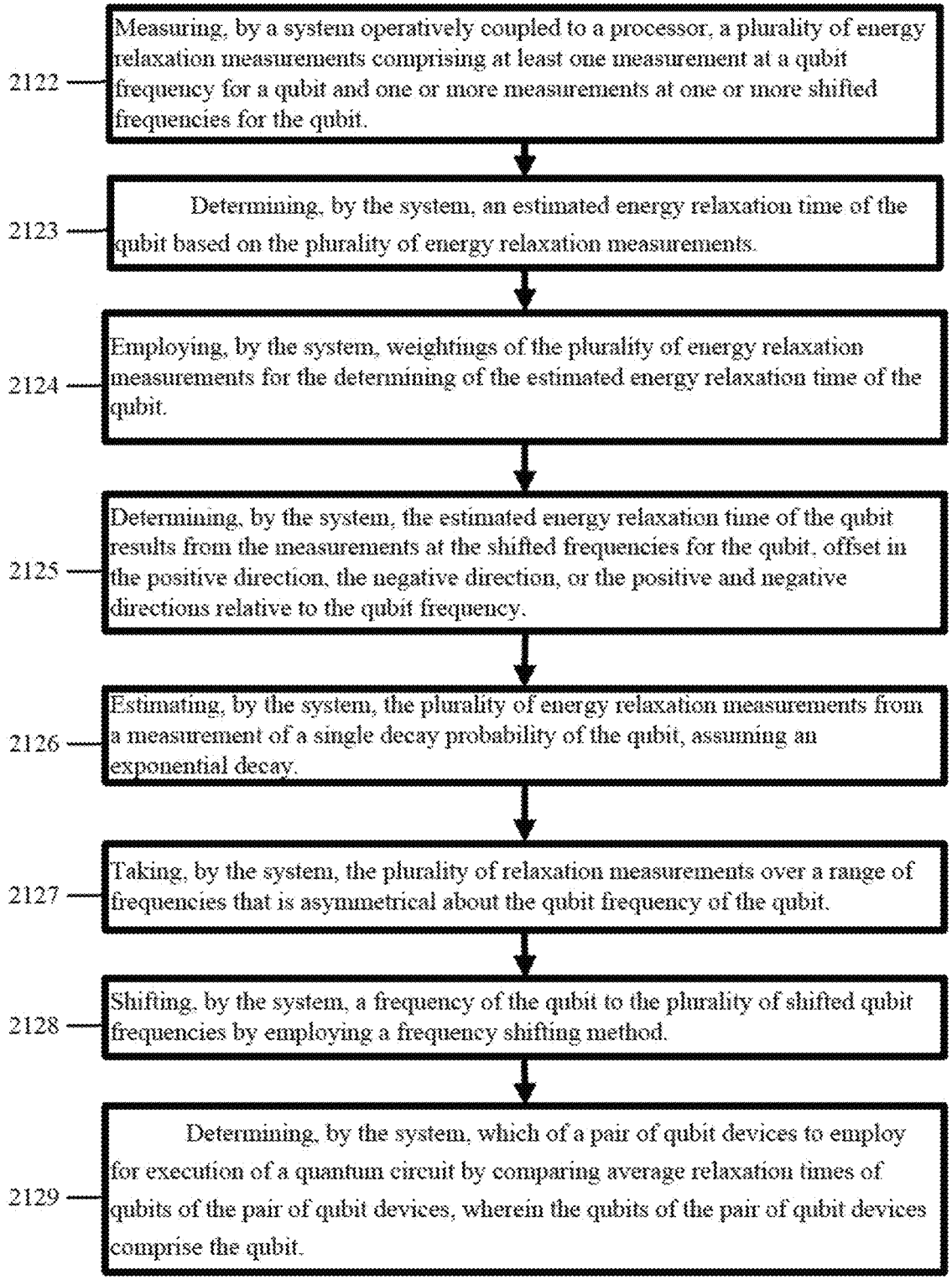
FIG. 21B further illustrates a process flow for facilitating a process to determine an estimated energy relaxation time of a qubit, in accordance with one or more embodiments described herein.

FIG. 21B further illustrates a process flow for facilitating a process to determine an estimated energy relaxation time of a qubit, in accordance with one or more embodiments described herein. FIG. 21B illustrates a flow diagram of an example, non-limiting method 2120 that comprises steps that can be alternately or additionally executed relative to the non-limiting method 2100. Repetitive description of like elements and/or processes employed in respective embodiments is omitted for sake of brevity.

At 2122, the non-limiting method 2120 can comprise measuring, by a system (e.g., readout component 214 and/or measurement component 242) operatively coupled to a processor, a plurality of energy relaxation measurements comprising at least one measurement at a qubit frequency for a qubit and one or more measurements at one or more shifted frequencies for the qubit.

At 2123, the non-limiting method 2120 can comprise determining, by the system (e.g., estimation component 246), an estimated energy relaxation time of the qubit based on the plurality of energy relaxation measurements.

At 2124, the non-limiting method 2120 can comprise employing, by the system (e.g., weighting component 244), weightings of the plurality of energy relaxation measurements for the determining of the estimated energy relaxation time of the qubit.

At 2125, the non-limiting method 2120 can comprise determining, by the system (e.g., estimation component 246), the estimated energy relaxation time of the qubit results from the measurements at the shifted frequencies for the qubit, offset in the positive direction, the negative direction, or the positive and negative directions relative to the qubit frequency.

At 2126, the non-limiting method 2120 can comprise estimating, by the system (e.g., estimating component 246), the plurality of energy relaxation measurements from a measurement of a single decay probability of the qubit, assuming an exponential decay.

At 2127, the non-limiting method 2120 can comprise taking, by the system (e.g., measurement component 242), the plurality of relaxation measurements over a range of frequencies that is asymmetrical about the qubit frequency of the qubit. At 2128, the non-limiting method 2120 can comprise shifting, by the system (e.g., shifting component 212), a frequency of the qubit to the plurality of shifted qubit frequencies by employing a frequency shifting method.

At 2129, the non-limiting method 2120 can comprise determining, by the system (e.g., measurement component 242), which of a pair of qubit devices to employ for execution of a quantum circuit by comparing average relaxation times of qubits of the pair of qubit devices, wherein the qubits of the pair of qubit devices comprise the qubit.

In one or more embodiments, the probability can be of the qubit being found in another excited state, other than the excited state to which the qubit was initially driven prior to application of the second pulse, after a specified time after cessation of the second pulse.

For simplicity of explanation, the computer-implemented and non-computer-implemented methodologies provided herein are depicted and/or described as a series of acts. It is to be understood that the subject innovation is not limited by the acts illustrated and/or by the order of acts, for example acts can occur in one or more orders and/or concurrently, and with other acts not presented and described herein. Furthermore, not all illustrated acts can be utilized to implement the computer-implemented and non-computer-implemented methodologies in accordance with the described subject matter. In addition, the computer-implemented and non-computer-implemented methodologies could alternatively be represented as a series of interrelated states via a state diagram or events. Additionally, the computer-implemented methodologies described hereinafter and throughout this specification are capable of being stored on an article of manufacture to enable transporting and transferring the computer-implemented methodologies to computers. The term article of manufacture, as used herein, is intended to encompass a computer program accessible from any computer-readable device or storage media.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

Generally, the one or more systems, devices, computer program products and/or computer-implemented methods of use provided herein can employ a qubit shifted in frequency, such as by flux tuning, by an Autler-Townes off-resonant tone (AT tone), by DC electric field, by mechanical strain, and/or by another suitable method to probe a frequency space about excitation frequencies of the qubit. Results of the probing can be employed to determine probabilities of the qubit being at one or more excited states at various times and/or at various shifted frequencies of the qubit. Further, results of the probing can be employed to forecast estimated true relaxation times of a qubit at one or more frequencies based on the frequency neighborhood about the desired one or more frequencies. Understanding of variance in the probabilities can allow for a better understanding of whether or not to employ the qubit, and or a respective qubit device comprising the qubit, such as relative to one or more other qubits and/or qubit devices. These one or more systems, device, computer program products and/or computer-implemented methods of use can be employed relative to plural qubits of a qubit device. It is noted that while the operations described herein can be employed absent application of flux bias to the qubits (e.g., absent flux tuning of the qubits) to determine the aforementioned information and results, such operations can function by instead employing flux bias, mechanical strain and/or DC electric field to shift a qubit frequency.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to determination of coherence parameters of a qubit of a physical qubit layout. Systems, computer-implemented methods and/or computer program products facilitating performance of these processes are of great utility in the field of quantum computing and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively probe frequency space of a qubit as the one or more embodiments described herein can enable this process. And, neither can the human mind nor a human with pen and paper probe frequency space of a qubit, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing one or more of the one or more operations, such as quantum and/or non-quantum operations, described and/or not specifically described herein.

Figure 22:
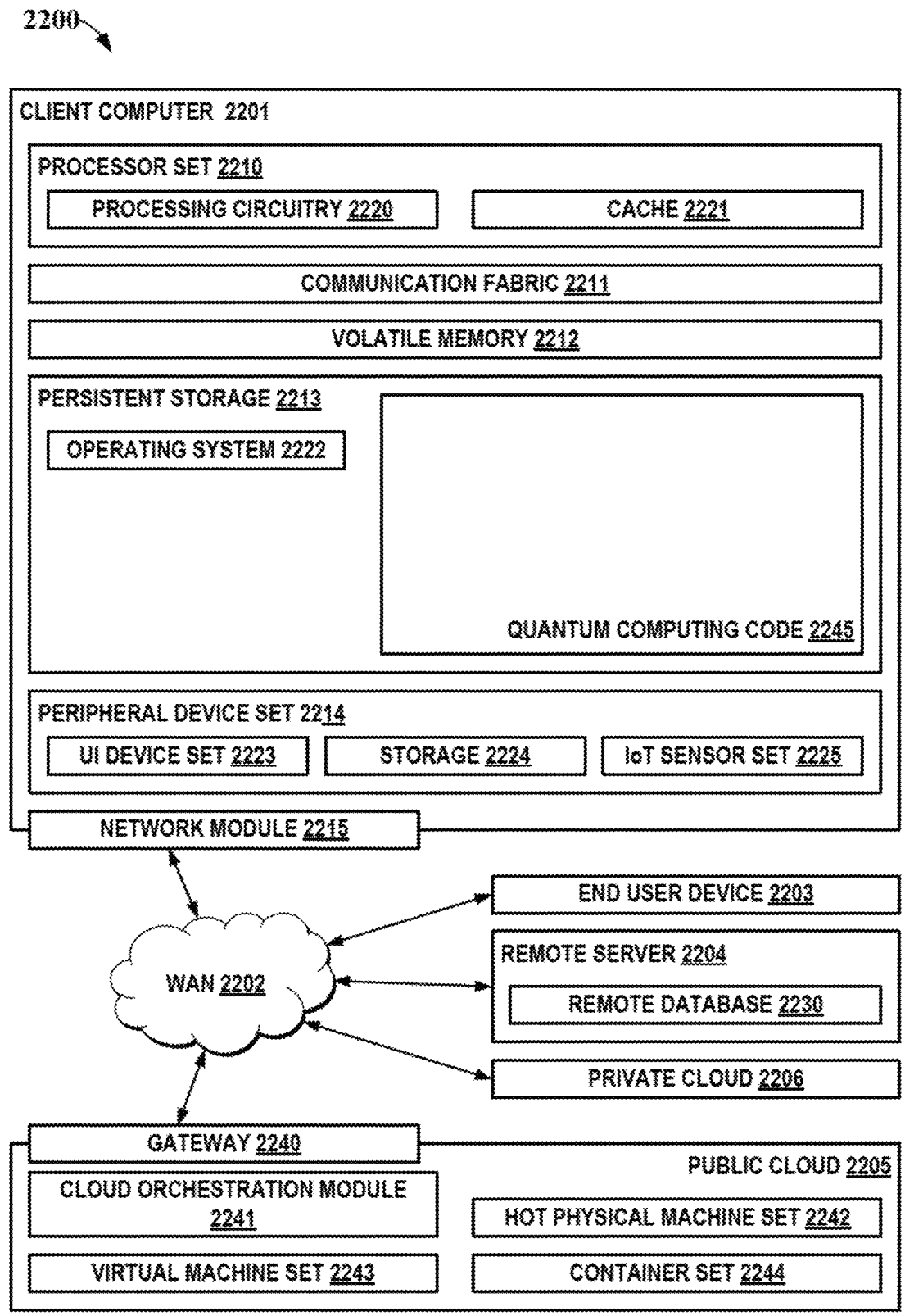
FIG. 22 illustrates a block diagram of an example, non-limiting, operating environment in which one or more embodiments described herein can be facilitated.

Turning next to FIG. 22, a detailed description is provided of additional context for the one or more embodiments described herein at FIGS. 1-21.

FIG. 22 and the following discussion are intended to provide a general description of a suitable operating environment 2200 in which one or more embodiments described herein at FIGS. 1-21 can be implemented.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 2200 contains an example of an environment for the execution of at least some of the computer code involved in performing the inventive methods, such as qubit $T_1$ estimation code 2245. In addition to block 2245, computing environment 2200 includes, for example, computer 2201, wide area network (WAN) 2202, end user device (EUD) 2203, remote server 2204, public cloud 2205, and private cloud 2206. In this embodiment, computer 2201 includes processor set 2210 (including processing circuitry 2220 and cache 2221), communication fabric 2211, volatile memory 2212, persistent storage 2213 (including operating system 2222 and block 2245, as identified above), peripheral device set 2214 (including user interface (UI), device set 2223, storage 2224, and Internet of Things (IOT) sensor set 2225), and network module 2215. Remote server 2204 includes remote database 2230. Public cloud 2205 includes gateway 2240, cloud orchestration module 2241, host physical machine set 2242, virtual machine set 2243, and container set 2244.

COMPUTER 2201 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 2230. As is well understood in the art of computer technology, and depending upon the technology, performance of a computer-implemented method may be distributed among multiple computers and/or between multiple locations. On the other hand, in this presentation of computing environment 2200, detailed discussion is focused on a single computer, specifically computer 2201, to keep the presentation as simple as possible. Computer 2201 may be located in a cloud, even though it is not shown in a cloud in FIG. 22. On the other hand, computer 2201 is not required to be in a cloud except to any extent as may be affirmatively indicated.

PROCESSOR SET 2210 includes one, or more, computer processors of any type now known or to be developed in the future. Processing circuitry 2220 may be distributed over multiple packages, for example, multiple, coordinated integrated circuit chips. Processing circuitry 2220 may implement multiple processor threads and/or multiple processor cores. Cache 2221 is memory that is located in the processor chip package(s) and is typically used for data or code that should be available for rapid access by the threads or cores running on processor set 2210. Cache memories are typically organized into multiple levels depending upon relative proximity to the processing circuitry. Alternatively, some, or all, of the cache for the processor set may be located "off chip." In some computing environments, processor set 2210 may be designed for working with qubits and performing quantum computing.

Computer readable program instructions are typically loaded onto computer 2201 to cause a series of operational steps to be performed by processor set 2210 of computer 2201 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 2221 and the other storage media discussed below. The program instructions, and associated data, are accessed by processor set 2210 to control and direct performance of the inventive methods. In computing environment 2200, at least some of the instructions for performing the inventive methods may be stored in block 2245 in persistent storage 2213.

COMMUNICATION FABRIC 2211 is the signal conduction paths that allow the various components of computer 2201 to communicate with each other. Typically, this fabric is made of switches and electrically conductive paths, such as the switches and electrically conductive paths that make up busses, bridges, physical input / output ports and the like.

Other types of signal communication paths may be used, such as fiber optic communication paths and/or wireless communication paths.

VOLATILE MEMORY 2212 is any type of volatile memory now known or to be developed in the future. Examples include dynamic type random access memory (RAM) or static type RAM. Typically, the volatile memory is characterized by random access, but this is not required unless affirmatively indicated. In computer 2201, the volatile memory 2212 is located in a single package and is internal to computer 2201, but, alternatively or additionally, the volatile memory may be distributed over multiple packages and/or located externally with respect to computer 2201.

PERSISTENT STORAGE 2213 is any form of non-volatile storage for computers that is now known or to be developed in the future. The non-volatility of this storage means that the stored data is maintained regardless of whether power is being supplied to computer 2201 and/or directly to persistent storage 2213. Persistent storage 2213 may be a read only memory (ROM), but typically at least a portion of the persistent storage allows writing of data, deletion of data and re-writing of data. Some familiar forms of persistent storage include magnetic disks and solid state storage devices. Operating system 2222 may take several forms, such as various known proprietary operating systems or open source Portable Operating System Interface type operating systems that employ a kernel. The code included in block 2245 typically includes at least some of the computer code involved in performing the inventive methods.

PERIPHERAL DEVICE SET 2214 includes the set of peripheral devices of computer 2201. Data communication connections between the peripheral devices and the other components of computer 2201 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 2223 may include components such as a display screen, speaker, microphone, wearable devices (such as goggles and smart watches), keyboard, mouse, printer, touchpad, game controllers, and haptic devices. Storage 2224 is external storage, such as an external hard drive, or insertable storage, such as an SD card. Storage 2224 may be persistent and/or volatile. In some embodiments, storage 2224 may take the form of a quantum computing storage device for storing data in the form of qubits. In embodiments where computer 2201 is required to have a large amount of storage (for example, where computer 2201 locally stores and manages a large database) then this storage may be provided by peripheral storage devices designed for storing very large amounts of data, such as a storage area network (SAN) that is shared by multiple, geographically distributed computers. IoT sensor set 2225 is made up of sensors that can be used in Internet of Things applications. For example, one sensor may be a thermometer and another sensor may be a motion detector.

NETWORK MODULE 2215 is the collection of computer software, hardware, and firmware that allows computer 2201 to communicate with other computers through WAN 2202. Network module 2215 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 2215 are performed on the same physical hardware device. In other embodiments (for example, embodiments that utilize software-defined networking (SDN)), the control functions and the forwarding functions of network module 2215 are performed on physically separate devices, such that the control functions manage several different network hardware devices. Computer readable program instructions for performing the inventive methods can typically be downloaded to computer 2201 from an external computer or external storage device through a network adapter card or network interface included in network module 2215.

WAN 2202 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 2203 is any computer system that is used and controlled by an end user (for example, a customer of an enterprise that operates computer 2201), and may take any of the forms discussed above in connection with computer 2201. EUD 2203 typically receives helpful and useful data from the operations of computer 2201. For example, in a hypothetical case where computer 2201 is designed to provide a recommendation to an end user, this recommendation would typically be communicated from network module 2215 of computer 2201 through WAN 2202 to EUD 2203. In this way, EUD 2203 can display, or otherwise present, the recommendation to an end user. In some embodiments, EUD 2203 may be a client device, such as thin client, heavy client, mainframe computer, desktop computer and so on.

REMOTE SERVER 2204 is any computer system that serves at least some data and/or functionality to computer 2201. Remote server 2204 may be controlled and used by the same entity that operates computer 2201. Remote server 2204 represents the machine(s) that collect and store helpful and useful data for use by other computers, such as computer 2201. For example, in a hypothetical case where computer 2201 is designed and programmed to provide a recommendation based on historical data, then this historical data may be provided to computer 2201 from remote database 2230 of remote server 2204.

PUBLIC CLOUD 2205 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 2205 is performed by the computer hardware and/or software of cloud orchestration module 2241. The computing resources provided by public cloud 2205 are typically implemented by virtual computing environments that run on various computers making up the computers of host physical machine set 2242, which is the universe of physical computers in and/or available to public cloud 2205. The virtual computing environments (VCEs) typically take the form of virtual machines from virtual machine set 2243 and/or containers from container set 2244. It is understood that these VCEs may be stored as images and may be transferred among and between the various physical machine hosts, either as images or after instantiation of the VCE. Cloud orchestration module 241 manages the transfer and storage of images, deploys new instantiations of VCEs and manages active instantiations of VCE deployments. Gateway 2240 is the collection of computer software, hardware, and firmware that allows public cloud 205 to communicate through WAN 202.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 2206 is similar to public cloud 2205, except that the computing resources are only available for use by a single enterprise. While private cloud 2206 is depicted as being in communication with WAN 2202, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 2205 and private cloud 2206 are both part of a larger hybrid cloud.

What is claimed is:

1. A system, comprising:
   a memory configured to store computer executable components; and
   a processor configured to execute at least one of the computer executable components that:
   samples, using a quantum processor, a plurality of measurements of an energy relaxation time of a qubit at individual shifted qubit frequencies of a plurality of shifted qubit frequencies of the qubit; and
   performs an analysis, based on a protocol, to determine a correlation frequency-length between individual energy relaxation times measured at the individual shifted qubit frequencies, wherein the correlation frequency-length represents a minimum spacing between consecutive shifted qubit frequencies of the individual shifted qubit frequencies such that a first energy relaxation time measured at a first shifted qubit frequency of the consecutive shifted qubit frequencies and a second energy relaxation time measured at a second shifted qubit frequency of the consecutive shifted qubit frequencies, are independent by a defined threshold.

2. The system of claim 1, wherein the at least one of the computer executable components further:
   determines an estimated energy relaxation time of the qubit by employing weightings of a plurality of independent energy relaxation time measurements.

3. The system of claim 2, wherein the weightings are respectively a function of the individual shifted qubit frequencies.

4. The system of claim 1, wherein a range of frequencies over which the plurality of measurements of the energy relaxation time are taken is asymmetrical about a qubit frequency of the qubit.

5. The system of claim 1, wherein the at least one of the computer executable components further:
   shifts a frequency of the qubit to the plurality of shifted qubit frequencies by employing a frequency shifting method.

6. The system of claim 1, wherein a minimum number of independent weighted measurements of the energy relaxation time is determined to obtain a target accuracy for an estimated energy relaxation time.

7. The system of claim 1, wherein a minimum number of independent weighted measurements of the energy relaxation time is determined to specify a minimum range of frequencies over which the plurality of measurements of the energy relaxation time are taken.

8. A computer-implemented method, comprising:
   sampling, by a system operatively coupled to at least one processor, using a quantum processor of the at least one processor, a plurality of measurements of an energy relaxation time of a qubit at individual shifted qubit frequencies of a plurality of shifted qubit frequencies of the qubit; and
   performing, by the system, an analysis, based on a protocol, to determine a correlation frequency-length between individual energy relaxation times measured at the individual shifted qubit frequencies, wherein the correlation frequency-length represents a minimum spacing between consecutive shifted qubit frequencies of the individual shifted qubit frequencies such that a first energy relaxation time measured at a first shifted qubit frequency of the consecutive shifted qubit frequencies and a second energy relaxation time measured at a second shifted qubit frequency of the consecutive shifted qubit frequencies, are independent by a defined threshold.

9. The computer-implemented method of claim 8, further comprising:
   employing, by the system, weightings of a plurality of independent energy relaxation time measurements for determining an estimated energy relaxation time of the qubit.

10. The computer-implemented method of claim 9, wherein the weightings are respectively a function of the individual shifted qubit frequencies.

11. The computer-implemented method of claim 8, wherein a range of frequencies over which the plurality of measurements of the energy relaxation time are taken is asymmetrical about a qubit frequency of the qubit.

12. The computer-implemented method of claim 8, further comprising:
   shifting, by the system, a frequency of the qubit to the plurality of shifted qubit frequencies by employing a frequency shifting method.

13. The computer-implemented method of claim 8, further comprising:
  determining, by the system, a minimum number of independent weighted measurements of the energy relaxation time, to obtain a target accuracy for an estimated energy relaxation time.

14. The computer-implemented method of claim 8, further comprising:
  determining, by the system, a minimum number of independent weighted measurements of the energy relaxation time, to specify a minimum range of frequencies over which the plurality of measurements of the energy relaxation time are taken.

15. A computer program product for determining an estimated energy relaxation time of a qubit, the computer program product comprising a computer readable storage medium having program instructions embodied therewith, the program instructions executable by at least one processor of a system to cause the system to:
  sample, using a quantum processor of the at least one processor, a plurality of measurements of an energy relaxation time of the qubit at individual shifted qubit frequencies of a plurality of shifted qubit frequencies of the qubit; and
  perform an analysis, based on a protocol, to determine a correlation frequency-length between individual energy relaxation times measured at the individual shifted qubit frequencies, wherein the correlation frequency-length represents a minimum spacing between consecutive shifted qubit frequencies of the individual shifted qubit frequencies such that a first energy relaxation time measured at a first shifted qubit frequency of the consecutive shifted qubit frequencies and a second energy relaxation time measured at a second shifted qubit frequency of the consecutive shifted qubit frequencies, are independent by a defined threshold.

16. The computer program product of claim 15, wherein the program instructions are further executable by the at least one processor to cause the system to:
  employ weightings of a plurality of independent energy relaxation time measurements for determining the estimated energy relaxation time of the qubit.

17. The computer program product of claim 16, wherein the weightings are respectively a function of the individual shifted qubit frequencies.

18. The computer program product of claim 15, wherein a range of frequencies over which the plurality of measurements of the energy relaxation time are taken is asymmetrical about a qubit frequency of the qubit.

19. The computer program product of claim 15, wherein the program instructions are further executable by the at least one processor to cause the system to:
  shift a frequency of the qubit to the plurality of shifted qubit frequencies by employing a frequency shifting method.

20. The computer program product of claim 15, wherein the program instructions are further executable by the at least one processor to cause the system to:
  determine a minimum number of independent weighted measurements of the energy relaxation time, to obtain a target accuracy for the estimated energy relaxation time; and
  determine the minimum number of independent weighted measurements of the energy relaxation time, to specify a minimum range of frequencies over which the plurality of measurements of the energy relaxation time are taken.

* * * * *